United States Patent [19]

Zelinski et al.

[11] 3,786,436

[45] Jan. 15, 1974

[54] MEMORY EXPANSION ARRANGEMENT IN A CENTRAL PROCESSOR

[75] Inventors: Paul Z. Zelinski, Elmhurst; Leo V. Jones, Chicago, both of Ill.

[73] Assignee: GTE Automatic Electric Laboratories, Incorporated, Northlake, Ill.

[22] Filed: Mar. 14, 1973

[21] Appl. No.: 341,226

[52] U.S. Cl. .......... 340/172.5
[51] Int. Cl. .......... G06f 9/20
[58] Field of Search .......... 340/172.5

[56] References Cited

UNITED STATES PATENTS 3,533,075 10/1970 Johnson et al. .......... 340/172.5
3,657,705 4/1972 Mekota, Jr. et al. .......... 340/172.5

*Primary Examiner*—Harvey E. Springborn
*Attorney*—Bernard E. Franz

[57] ABSTRACT

A page register in the central processor comprises 3N bistable devices, N each for an instruction field, a branch field, and a data field, to extend addresses by N bits beyond the capacity of the operand portion of the format of instructions. A "load page register" instruction uses the operand to designate load the branch field and/or the data field, or transfer the instruction field to the data field; and also supplies the values for loading the branch and/or data field. A "last page reference" register is also provided to which the instruction and data fields are transferred from the page register during execution of each instruction, while the address in a program counter is transferred to a "last program count" register, to be stored in memory when a "branch and store program" linkage instruction is executed.

12 Claims, 17 Drawing Figures

COMPUTER CENTRAL PROCESSOR CCP

COMPUTER CENTRAL PROCESSOR CCP

DATA PROCESSOR UNIT DPU

MEMORY EXPANSION ARRANGEMENT IN A CENTRAL PROCESSOR

BACKGROUND OF THE INVENTION

1. Field of the Invention

This invention relates to a memory expansion arrangement in a central processor, and more particularly to an arrangement for increasing the number of words available in the main high speed memory of a computer.

2. Description of the Prior Art

In the design of computer systems the maximum size of the memory is determined and sufficient bits in an address field of the instructions is allocated to designate addresses up to the maximum value. It frequently happens that at a later time the estimate of the maximum size for memory proves to be insufficient. It is then impractical to increase the number of bits in the address field of instructions. Therefore many different "paging" techniques have been devised which permit the memory to be divided into blocks or fields, with identical addresses being used in the different blocks. See for example U.S. Pat. Nos. 3,553,653 issued Jan. 5, 1971 to A. Krock and 3,387,283 issued June 4, 1968 to M. C. Snedaker.

SUMMARY OF THE INVENTION

The object of the invention is to divide a main memory into sections designated pages, with an effective arrangement to select the proper page for instructions, branching and data.

According to the invention, in a computer processor in which the operand address of instructions has M bit positions to designate the word on a page, a page register is provided to supply N additional address bits for selecting a page; with the page register comprising N bistable devices for an instruction field, N bistable devices for a branch for and N bistable devices for a data field; and the instruction set includes a "load page register" instruction in which the operand designates which field or fields to load, and the value to be loaded in each selected field of the page register. The operand may also designate that the instruction field is to be loaded into the data field.

A further feature of the invention relates to a "last page reference" register to which the instruction and data fields are transferred from the page register for every instruction, while the address in a program counter is transferred to a "last program count" register, to be stored in memory when a "branch and store program" linkage instruction is executed. Further features are described in the detailed description.

DESCRIPTION OF THE PREFERRED EMBODIMENT

Figure 1:
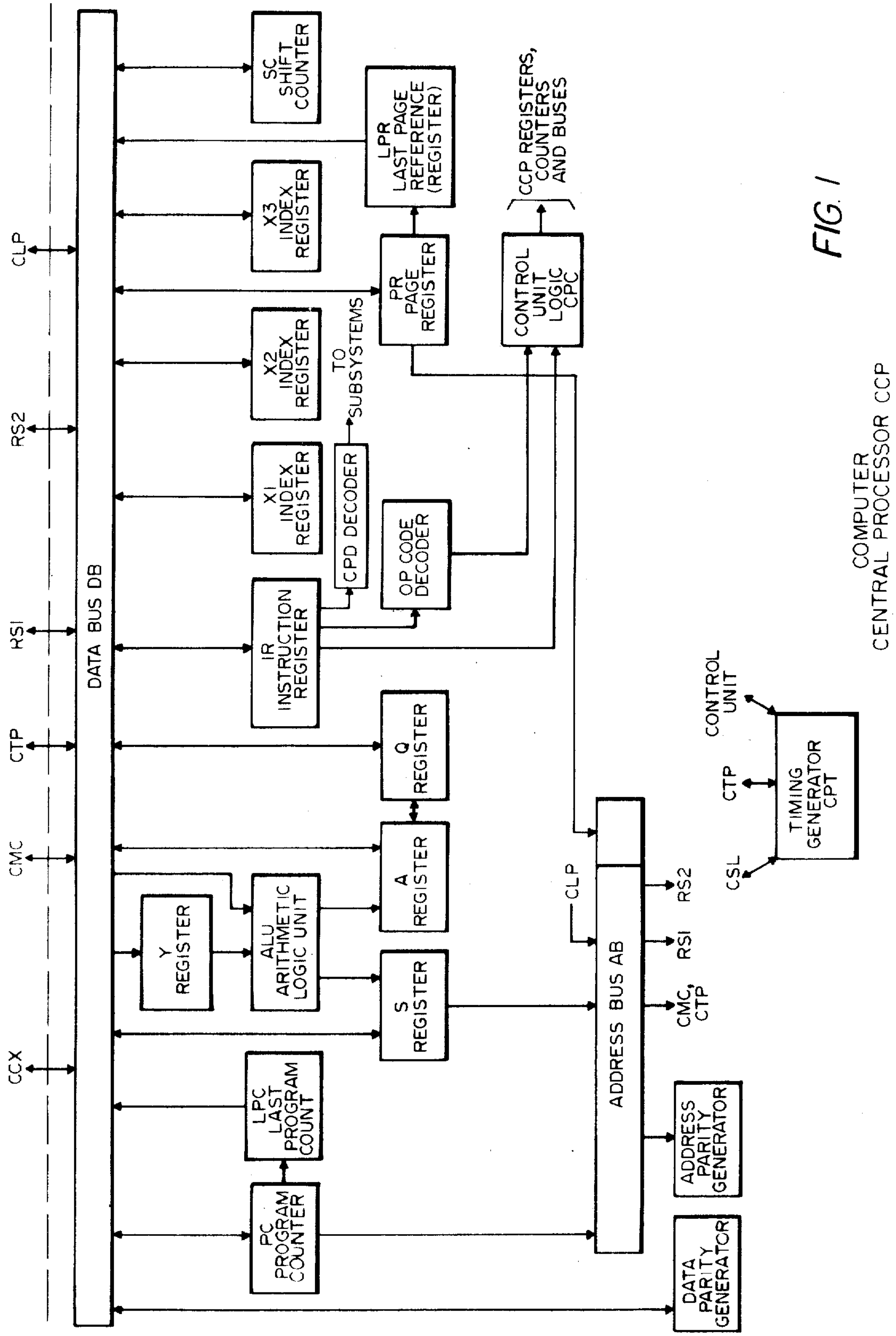
FIG. 1 is a block diagram in a computer central processor showing a data bus and an address bus interconnecting a plurality of registers.

As shown in FIG. 1 a computer central processor CCP comprises a data bus DB, an address bus AB, a plurality of registers, an arithmetic logic unit ALU, control unit logic CPC, and a timing generator CPT.

Figure 2:
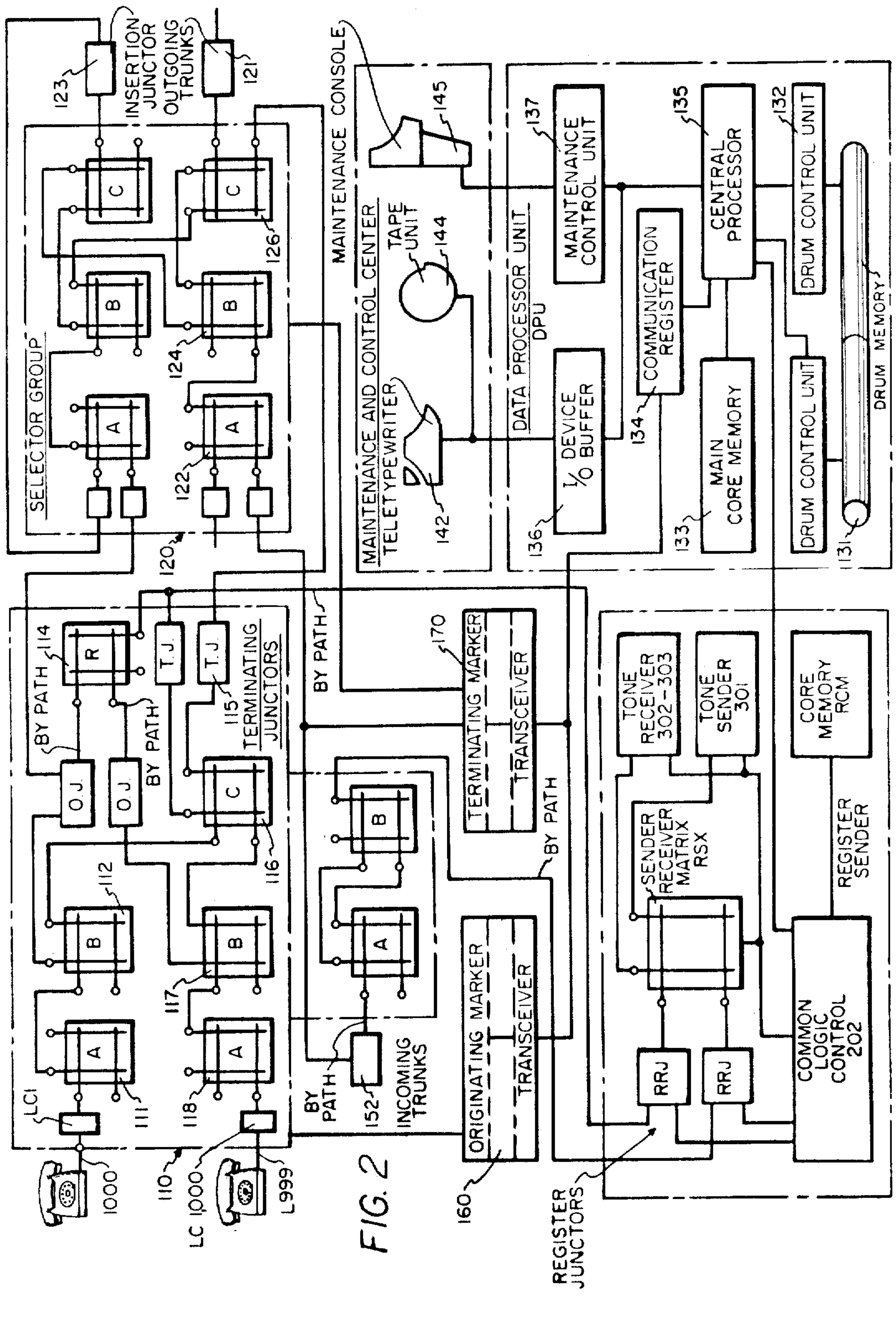
FIG. 2 is a block diagram of a communication switching system in which the computer central processor is a portion of a data processing unit incorporated in the common control of the system.

Referring to FIG. 2, the computer central processor CCP is a portion of the central processor 135, which is part of a data processor unit DPU in the common control of a communication switching system. The common control also includes a register-sender subsystem shown in FIG. 2 as comprising common logic control 202 with a core memory RCM, register junctors RRJ, a sender receiver matrix RSX, tone receivers 302–303 and tone senders 301. A call originated at a local line which comprises the telephone lines connected to line circuits LC1–LC1000 is connected through a line group switching group to a register junctor RRJ. For example, a call originated at line circuit LC1 is connected through an A matrix 111, a B matrix 112, an originating junctor OJ, and an R matrix 114, to one of the register junctors RRJ. The register-sender subsystem returns dial tone via the register junctor, after which the dialed digits in either dial pulse form or tone form are received and processed via the common logic 202 and stored in the core memory RCM. The digits are processed in the register-sender subsystem and the data processor unit subsystem after which a terminating path is completed from the originating junctor through the selector group through the A, B and C stages to a terminating junctor 115 of a line group if it is a local terminating call or to an outgoing trunk 121 if it is an outgoing call to another office. For a local call the route is extended through C, B and A matrices to the called line.

In the data processing unit DPU the central processor 135 operates with a main core memory 133, and also makes use of a drum memory 131 via drum control units 132. A communication register 134 provides for communication of data between the central processor and tranceivers in the markers for the switching network. A maintenance control unit 137 connects the central processor 135 to a maintenance console 145; and an input-output device buffer 136 connects the central processor to other devices such as a teletypewriter 142 of tape unit 144 in a maintenance and control center.

Figure 3:
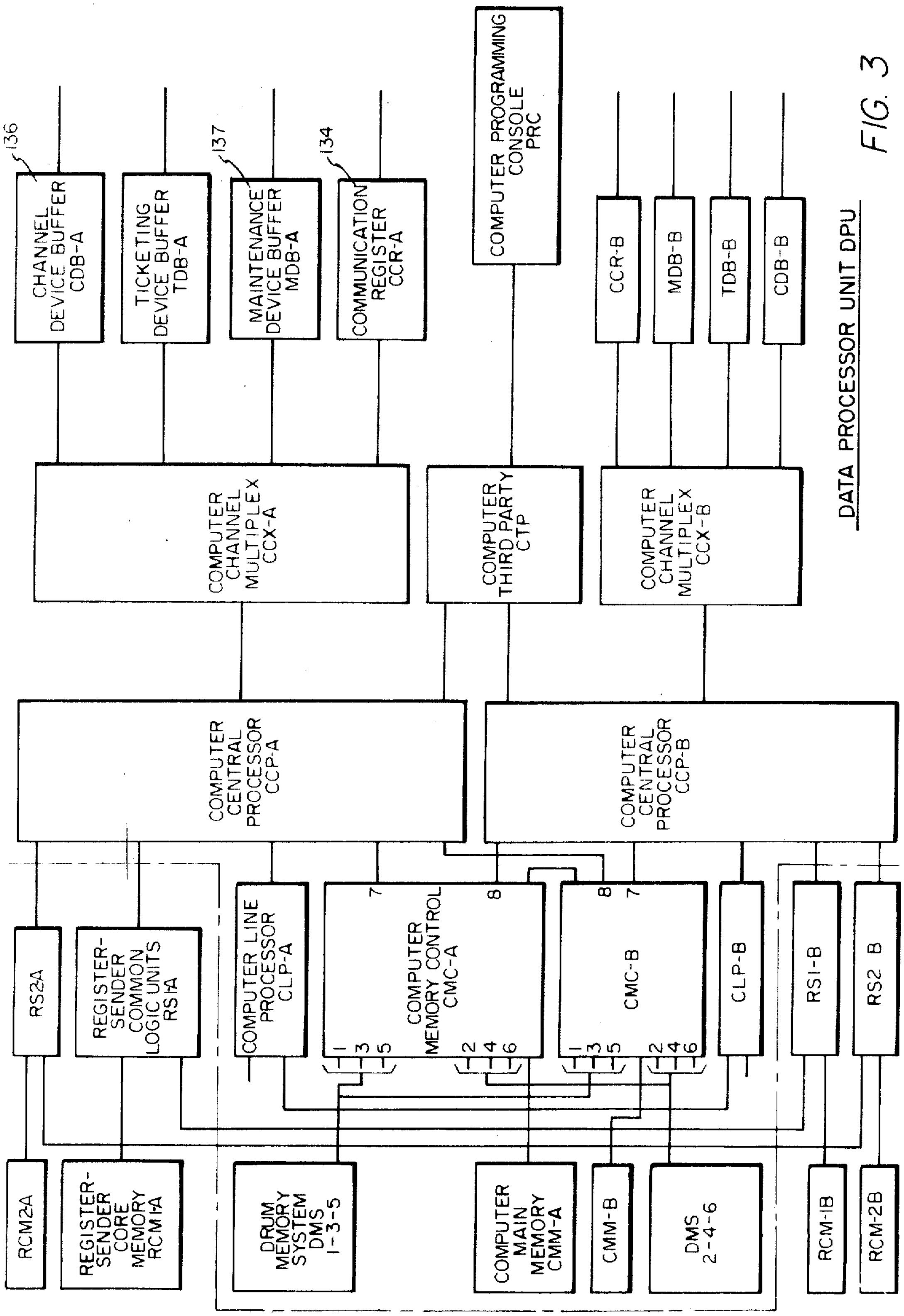
FIG. 3 is a block diagram showing how the computer central processor interfaces with other units of the data processing unit and of a register sender subsystem which together form the common control of the switching system.

The common control apparatus of the switching system is shown in FIG. 3 in a block diagram which shows the duplication of units, and how they interface with the computer central processor CCP. The computer central processor is duplicated comprising units CCP-A and CCP-B. A computer third party CTP provides for maintenance and control functions, including coupling of the processors to a computer programming console PRC. The register-sender subsystem in a maximum configuration comprises two duplicated register-sender units, namely register-sender unit RS1A and its duplicate RS1-B. and unit RS2A and its duplicate RS2B.

The apparatus in FIG. 3 other than the register-sender subsystems and the console PRC comprise the data processor unit DPU.

Each of the computer central processors has its own core memory and computer memory control, for example core memory CMM-A and memory control CMC-A for the computer central processor CCP-A, and the duplicate units CMM-B and CMC-B for processor CCP-B. There is also a drum memory system with up to six units in the maximum configuration. The computer memory control has eight ports for each of the duplicate units. The computer memory control CMC-A uses ports 1, 3 and 5 principally for access to the drum memory systems 1, 3 and 5 and may also use ports 2, 4 and 6 for access to the drum memory systems 2, 4 and 6; while the memory control unit CMC-B uses ports 2, 4 and 6 for principal access to the drum memory systems 2, 4 and 6 and may also use ports 1, 3 and 5 for access to the drum memory system 1, 3 and 5. Each of the memory controls uses port 7 for access to its own computer central processor, and may use port 8 for access to the other processor. The memory control unit controls the transfer of data between the main core memory CMM and one of the ports for transfer to a drum memory or the central processor.

The computer line processors provide for processing of interrupts from other units in the data processing unit, the register-sender subsystem, and the markers. This unit is duplicated with computer line processor CLP-A coupled to the computer central processor CCP-A and the computer line processor CLP-B coupled to the computer central processor CCP-B, with interconnections between the two computer line processors.

The computer channel multiplex unit CCX-A connected to the computer central processor CCP-A, and unit CCX-B to unit CCP-B provides for input-output functions with various device buffers and the communication registers. The communication register comprising duplicated units CCR-A and CCR-B provides for communication with the markers as shown in FIG. 2. The channel device buffer CDB-A and its duplicate CDB-B provides for input-output to a local maintenance teletypewriter, a high speed paper tape punch, and a data set for remote teletypewriters; while its duplicate CDB-B provides for input-output to a local office administration teletypewriter and a high speed paper tape reader. The ticketing device buffer TDB-A and its duplicate TDB-B (not shown in FIG. 2) provide for coupling to a magnetic tape unit and scanner. The maintenance device buffer MDB-A and its duplicate MDB-B provide for input-output from a pushbutton control panel and displays, power monitors and alarms, and maintenance routine logic.

The registers shown in FIG. 1 are used primarily for arithmetic operations and address modification.

The A register, the main arithmetic accumulator, is a 24-bit register used in data transfer between the central processor and the register-sender, and between the central processor and the channel multiplexer via the data bus, as well as for all arithmetic operations. The A register can be shifted both logically and arithmetically.

The arithmetical operations are performed by the arithmetic logic unit ALU in conjunction with the A, Q, S and Y registers.

The Q register is a 24-bit register used in conjunction with the A register for shift and rotate operations. It is also used as an auxiliary arithmetic register for multiply and divide operations. It is used to hold the multiplier and the lower order bits of the product in a multiply process. For division, it is used for the low order bits of the divident. It accumulates the quotient and finally holds the resultant remainder.

The S register is a 24-bit register used during arithmetic operations and during address modification when placing a main memory address on the address bus.

The Y register is a 24-bit register used during arithmetic and logical operations. It is one of the inputs to the arithmetic logic unit ALU. It cannot be accessed by the program.

The instruction register IR is a 24-bit register that receives all instructions (coded information for the operation to be performed, address field, and the method of addressing) from the main memory via the computer memory control and the data bus.

The three index registers X1, X2 and X3 are 15-bit registers used for address modification, and as a counter.

The page register PR is a 6-bit register used to specify bits 15 and 16 of the address bus. It operates in conjunction with the program counter to address a location within a memory page. The page register is made up of three sections: the "instruction field" (bits $\phi$ and 1), the "branch field" (bits 2 and 3), and the "data field" (bits 4 and 5).

The last program count register LPC is a 15-bit register used to store return linkage to the running program during processing. It is continually updated by the program counter.

The last page reference register LPR is a 4-bit register used as an extension of the last program count register. It is continually updated by the page register. The last page reference register is made up of two sections: the "last instruction field" (bits $\phi$ and 1), and the "last data field" (bits 2 and 3). The "last data field" is loaded from the "data field" of the page register. The "last instruction field" is loaded for the "instruction field" of the page register.

The central processor includes a program counter and a shift counter.

The program counter PC is a 15-bit binary counter used to sequentially count the address of instructions. The program counter holds the address within a page of the next instruction to be retrieved from core memory. It is used with the page register to locate this address. This counter is incremented (increased by one) for each instruction to establish program sequence.

The shift counter SC is a 6-bit counter used to control the number of shifts during shifting operations.

SYMBOLISM FOR GATES, BISTABLE DEVICES AND EQUATIONS

The common logic circuits of the system are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these would be limited by loading requirements well known in the art. Latches are indicated in the drawing by square functional blocks with inputs designated S and R for set and reset respectively; the circuits being in practice implemented generally by two NAND gates with the output of each connected to an input of the other, which makes the circuit a bistable storage device. The block symbol for the latch implies inverters at the inputs so that it is set and reset with signals at the "one" level. The logic also uses bistable devices in the form of JK flip-flops implemented with integrated circuits, indicated in the drawings by rectangles having the J and K inputs indicated by a small semicircle, a clock input indicated by C, and set and reset inputs indicated by S and R. Not all of the inputs for these devices are shown in the drawings. The J and K inputs are each acutally AND gates having three external inputs, but the unused inputs which are actually terminated in some manner are not shown on the drawings. The S and R inputs are effective at the zero level, the J and K inputs at the one level, and the C input on a trailing edge.

While some discrete transistor circuits are used for interfacing with relay circuits, most of the electronic circuits of the system of FIG. 2 are implemented with integrated circuits of the Sylvania SUHL TTL high level logic family or equivalents. The NAND gates used to implement AND and OR functions include types SG 43, SG 63, SG 132, and SG 143. The AND-OR functions are also implemented with chips having AND gates feeding a NOR gate such as types SG 53 and SG 113. JK flip-flops may be type SF 53.

Boolean expressions are used to designate signal leads in the drawings, and in equations and miscellaneous references in the specification. In the expressions for basic Boolean elements, capital letters, numbers, spaces and hyphens are used. The expressions for elements may also include parentheses enclosing two numbers separated by a hyphen, indicating the first and last of a group of bit positions of gates enabled by a control signal. For example the expression IR(ϕ–5)-DSO is a single Boolean element. In combinations of elements, the period (.) is used for the AND function, the plus sign (+) for the OR function, and the apostrophe (') for negation. In a string of elements separated by periods and plus signs without parentheses or brackets, the AND operations are performed first and then the OR functions; for example A+B.C+D is the same as A+(B.C)+D. Parentheses and brackets are used in the usual manner indicating operations in inner parentheses are performed first, then those in outer parentheses or brackets, etc. On the drawings the minus sign (−) at the beginning of an expression indicates negation of the entire expression following it, and not merely the first element if there is more than one. The period may be omitted before or after parentheses which implies the AND function; but it cannot otherwise be omitted between elements, since a space can occur within an element.

In the equations, storage devices are indicated by using separate equations for the various inputs. For simple NAND gate type latches the set and reset inputs are indicated by (S) and (R). For JK flip-flops the inputs are indicated by (J), (K), (C), (S)' and (R)'. The apostrophe for the set and reset inputs indicates that the zero level is effective, namely the negation of the expression after the equal sign (=). The trailing edge of the entire expression is effective for the clock input. The combination of the three leads for J and K inputs is indicated by a single equation.

Throughout the description and drawings, it is implied of all circuits and signals relate to unit A of duplicated units, unless specifically indicated by a suffix −A or −1 for unit A, or a suffix −B or −2 for unit B.

TIMING FOR THE COMPUTER CENTRAL PROCESSOR

Figure 4:
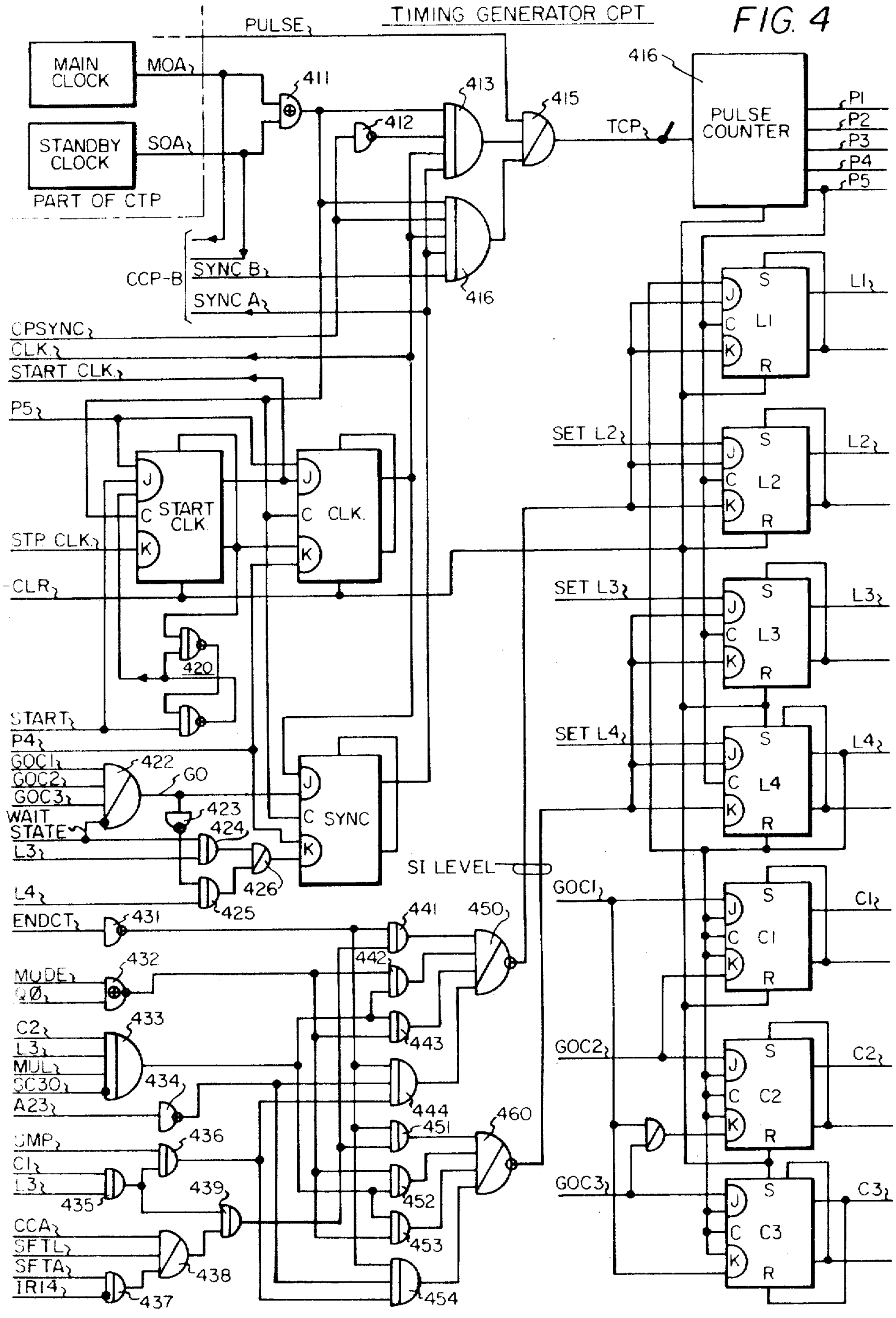
FIG. 4 is a functional block diagram of the processor timing control.

The timing generator CPT is shown in part in FIG. 4. There are additional control circuits not shown which will be described by Boolean equations.

The timing generator is designated to provide the timing increments upon which the instruction set of the central processor is structured. The basic timing intervals are the cycle which is 2 microseconds long, the level which is 500 nanoseconds long, and the pulse which is 100 nanoseconds long.

The timing is dependent upon a source providing a constant train of pulses at a 10 megahertz rate with a duty cycle of approximately 50 percent. This is provided by clock circuits which are a part of the third party circuit CTP. There is provided a main clock having its output train of pulses on lead MOA and a standby clock having its output train of pulses on a lead SOA. The third party circuit includes logic for monitoring the outputs of the clocks and insuring that one and only one of them is supplying output at all times. The two output leads are connected to the timing generators of both of the duplicate computer central processors CCP-A and CCP-B. FIG. 4 is the timing generator CPT of the processor CCP-A. Logic represented by exclusive or gate 411 gates the train of pulses from whichever of the leads MOA or SOA they are occurring and supplies them to other logic circuits of the timing generator as the basic clock control.

The timing generator includes three main storage devices that are continually pulsed by the clock train from gate 411. These storage devices are required to permit an orderly shutdown of the timing generator, as well as an orderly processing during operation of the timing generator. These storage devices comprise JK flip-flops START CLK, CLK and SYNC. The clock inputs C of all three are connected to the output of gate 411. The two outputs of flip-flop START CLK feed respectively into the J and K inputs of flip-flop CLK. The purpose of flip-flop CLK is to prime flip-flop SYNC, to prime the basic timing pulse TCP and to prime the data bus and address bus of the computer central processor. The function of the flip-flop SYNC is to act as a primer for the basic timing pulse TCP, and as such is controlled by feedback from the main memory system by the register-sender memory system.

The basic timing pulses on lead TCP are normally supplied from one of the AND gates 413 or 414, but may also be supplied via the lead PULSE from the third party circuit. These three sources are gated via OR gate 415 to the lead TCP. The train of clock pulses from gate 411 is supplied as an input to both 413 and 413 and 414 as well as the three flip-flops previously mentioned. If the two processors are operating in a synchronization a signal on lead CYSYNC enables gate 414, whereas if the processors are not operating in synchronization the zero level signal on this lead via inverter 412 enables gate 413. If the processors are not in synchronization the coincidence of signals from flip-flops CLK and SYNC along with the signal from gate 412 enables gate 413 to gate the clock pulses via gate 415 to lead TCP; whereas if the processors are operating in synchornization it is required in addition that the duplicated processor have its synchronization flip-flop set to supply a signal on lead SYNC B, enabling gate 414 to supply the pulses via gate 415 to lead TCP.

The pulse counter shown as a single block 416 comprises five JK flip-flops, not shown, whose outputs are respectively P1 through P5. These five flip-flops are connected as a ring counter with the one and zero outputs of each connected respectively to the J and K inputs of the following flip-flop, the P5 outputs being connected to the P1 inputs; and the clock inputs are supplied from lead TCP for all five flip-flops. The counter is advanced on the trailing edge of each clock pulse, thus the outputs appear for 100 nanoseconds on each of the output leads in turn.

The level counter comprises four JK flip-flops L1 through L4. The clock inputs of these four flip-flops are supplied from lead P5, so that the level counter may advance once each 500 nanoseconds on the trailing edge of pulse P5. The output of a gate 450 is connected to the J and K inputs of flip-flops L1 and L2, while the output of a gate 460 is connected to the J and K inputs of flip-flops L3 and L4. In addition flip-flop L1 has another J input from L4, and the flip-flops L2, L3 and L4 have J inputs from leads SET L2, SET L3 and SET L4 respectively.

The cycle counter comprises JK flip-flops C1, C2 and C3. The lead L4 is connected to the clock as well as the J and K inputs of all three of these flip-flops, so that the cycle counter may be advanced once each 2 microseconds on the trailing edge of the pulse on lead L4. In addition the flip-flops have J inputs connected respectively to leads GOC1, GOC2 and GOC3, and a K input of flip-flop C1 is connected to lead GOC2, a K input of flip-flop C2 is connected to an OR gate having inputs from leads GOC1 and GOC3, and a K input of flip-flop C3 is connected to lead GOC1. The signal on lead —CLR is used to set flip-flops P5, L4 and C3 and to reset the other flip-flops.

There are a number of JK flip-flops not shown which are a part of the timing generator, that are combinations of cycles, levels and pulses. It is necessary to supply these signals from storage devices, because if they were implemented with AND gates providing AND and OR functions their outputs would not be stable during the intended interval. Unless otherwise stated the clock inputs for these flip-flops are from lead TCP. The first has J inputs from leads L1, P2, and a lead —C2-(MUL+DIV); and K inputs from leads L2 and P5; and provides an output L1(P3+P4+P5)+L2. The next flip-flop has J inputs from leads —C2(MUL+DIV), P4 and L2, and K inputs from leads P5 and the output of a gate providing the function (L3+L4); and has an output providing the function (L2.P5+L3). The next flip-flop has J inputs from leads L1, P4 and the lead —C2-(MUL+DIV), and K inputs from leads (L3+L4) and P1; and provides the output function (L1.P5+L2+L3.L1). The next flip-flop has J inputs from leads (L3+L4, P3) and —C2(MUL+DIV), and J inputs from leads L4 and P5; providing an output L3(P4+P5) the next flip-flop has a clock input from P4 so that it changes state on the trailing edge of pulse interval P4, a J input from lead L1, and a K input from lead L4; providing the output function (L2+L3). The next flip-flop has a clock input from lead P5, a J input from lead L2, providing the output function (L1+L2). The last flip-flop has a J input from lead P2 and a K input from lead P5; providing the output function (P3+P4+P5).

the length of instructions for the time required to process an instruction can vary with the type of instructions. Some instructions require only one cycle to process while others require two cycles. One instruction and traps require three cycles. Certain instructions although only two cycles circulate within a cycle as in shift instructions. Because of these differences controls are provided that allow the timing generator to go from cycle 1 to cycle 2 to cycle 3; or to set level 2, or to set level 3 or set level 4. Since some instructions require the contents of memory and cannot continue processing until the memory has retrieved the contents, or some instructions write into memory, and cannot continue until the write function is complete, a wait control is implemented to reset the flip-flop SYNC which in turn suspends the timing generator from proceeding until a feedback is received from memory. The feedback signals from the main memory via memory control include DAP7 and DLP7 designating respectively data available and data loaded at port 7; while the feedback signals from the register-sender subsystem are RSDAL and RSDLL for data available and data loaded respectively. The timing generator control logic is given by the following equations.

GOC1 =DAP7[IR23+PCASO(C2'+ZELO1')+XEC]+PREGOC1

GOC2 =C24INST.C1.L4.DAP7 +C1. L4.DAP7.C23INST.CCA'.SMP'.BSP'.(PRA+CPD.TSTCPD)'+(BSP+STC).MMDLL +C1.(CCA+SMP) +C1.(DIV+TRAP) +RSDAL.(PRA+CPD.TSTCPD)

GOC3 =(DIV+ZELO1).C2.L4

RS DLL =RSSEL'.CRS1.RS1DLL +RSSEL.CRS2.RS2DLL +RSSEL'.CRS1'.RS1DLL +RSSEL.CRS2'.RS2DLL

RS DAL =RSSEL'.CRS1.RS1DAL +RSSEL'.CRS1'.RS1DAL +RSSEL.CRS2.RS2DAL +RSSEL.CRS2'.RS2DAL

SET L2 =C2.L3.MUL.SC3$\phi$'(MODE.Q$\phi$'λ +MODE'.Q$\phi$)+ C2.L3.DIV.SC31'+L1(C2'+Q0+31')

SET L3 =C1.L1.MUL.Qϕ'+L2(C1'+(SMP'+A23')(ENDCT'+(CCA+SFTA+SFTL)')

SET L4 =L3(C2'+SC3ϕ) (C2'+DIV1+SC31) +C1.-L2(SMP.A23+ENDCNT(CCA+SFTA+SFTL)

START =TP POWER ON(RUN+INC+STEP+EXP B)+TP INC+ TP STEP+TP RUN

STP CLK =P3(INC+TP INC)+P3.PC−ASO.L4.((TP POWER ON) (STEP+ADDRESS MATCH+EXPB)+HLT+TP STEP)

WAIT STATE =C1.(STX+STA+STQ).MMDLL' +L3' +C1.PAR.RSDLL' +C2.MMDLL'(ADM+AOM+XAM+RPA+SOM)

BUS SOURCES

Figure 5:
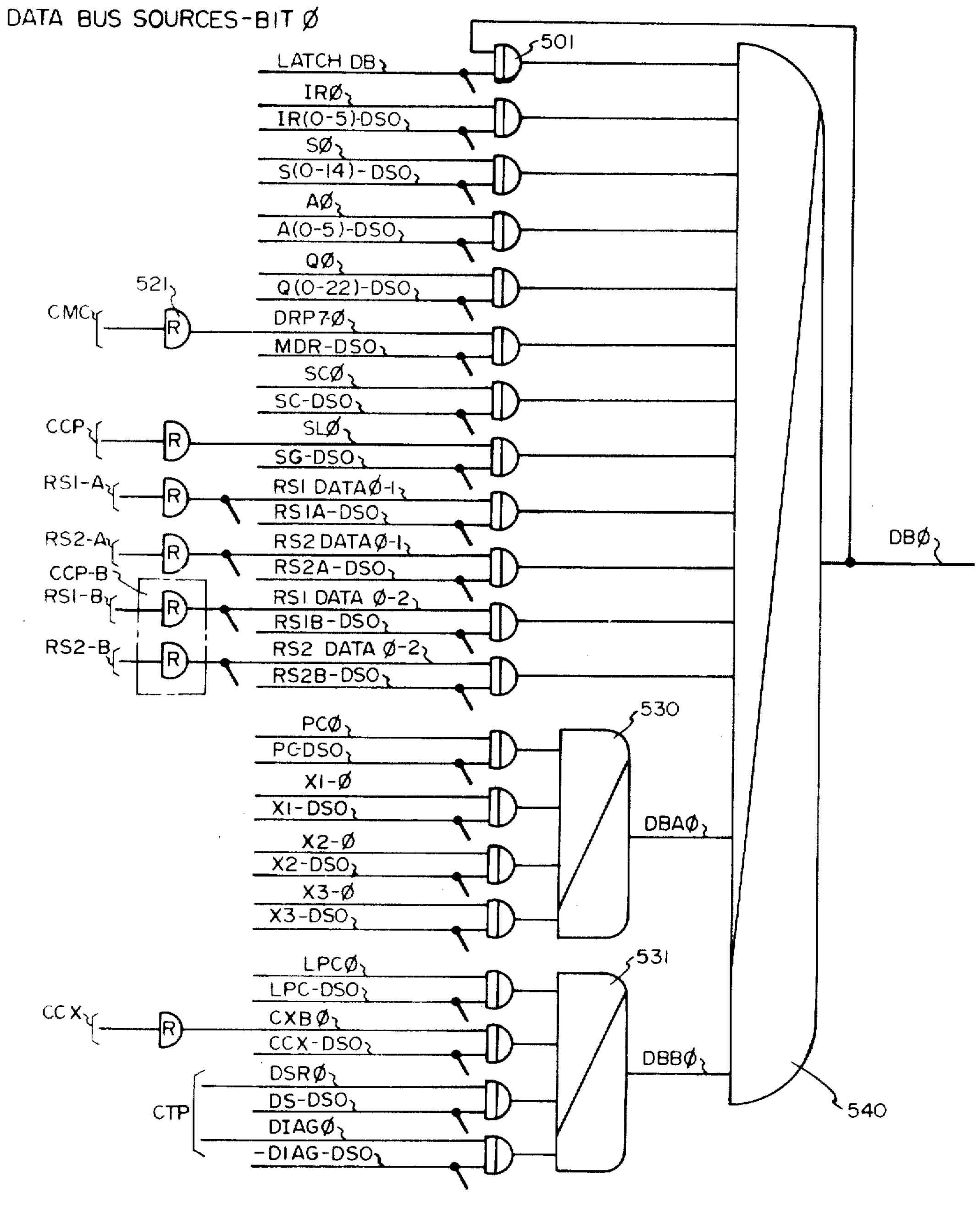
FIG. 5 is a functional block diagram showing the sources for data bit ∅.
Figure 6:
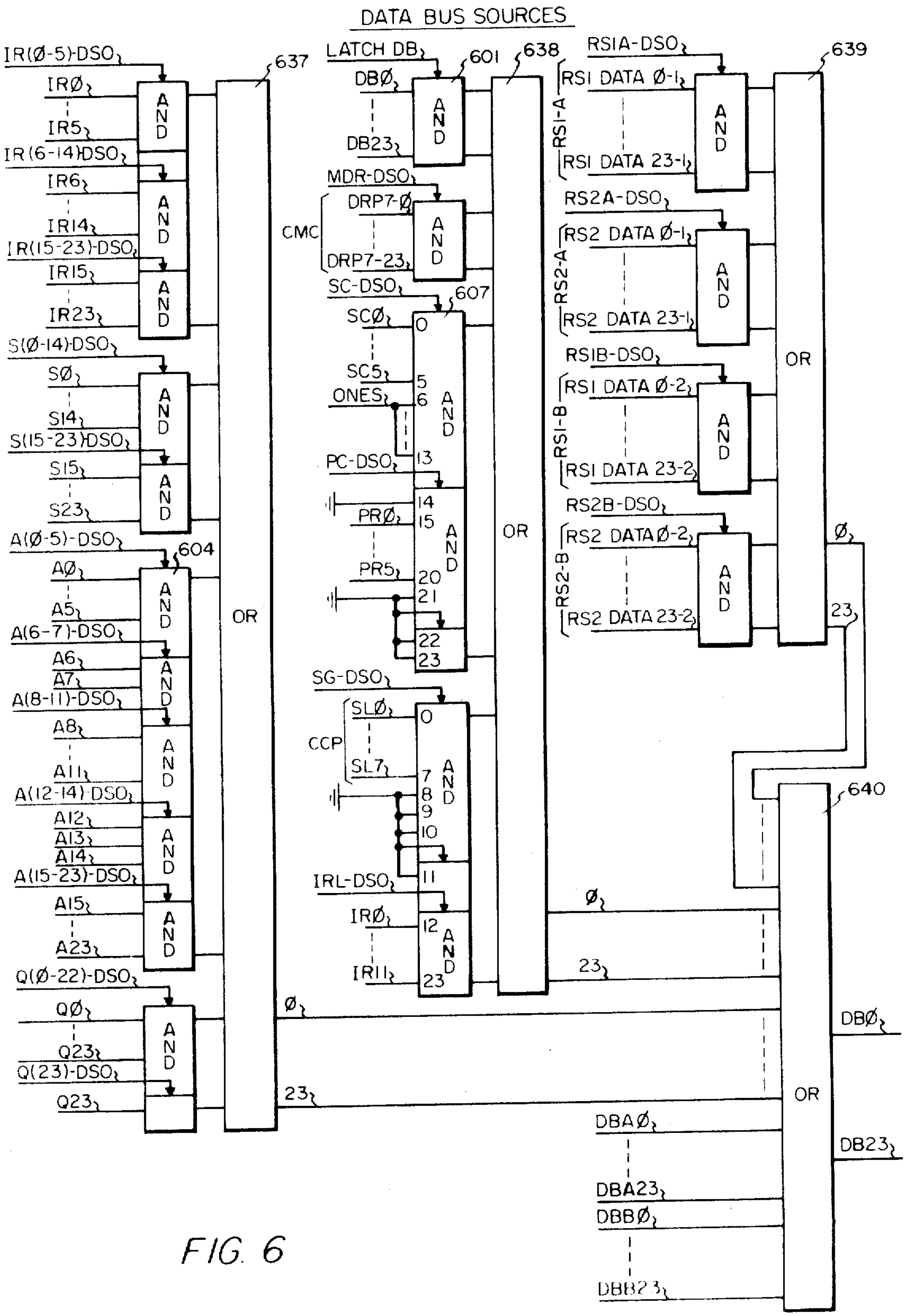
FIGS. 6 and 7 are functional block diagrams showing the data bus sources for all bit positions.

The data bus sources for the bit in position ϕ is shown in FIG. 5, while the sources for all bit positions are shown in FIG. 6. For each bit position of each source there is a two input AND gate with one input being the signal source for that bit position and the other input being an enabling control signal. For example AND gate 501 has a signal source lead DBϕ and an enabling control signal lead LATCH DB. In each bit position the outputs of all these AND gates are combined through OR gate circuitry to the single bit position lead for the bus. FIG. 5 shows some of the sources combined by OR gate 530 to lead DBAϕ and other sources combined through OR gate 531 to lead DBBϕ. The outputs of these two OR gates and the other AND gates are combined by circuits represented by the symbol 540 to lead DBϕ. Symbol 540 in actual practice of course comprises a plurality of gates combined to provide the OR function. To show signal sources received from other subsystems on different frames via cables, cable receivers such as 521 are shown in FIG. 5, with the subsystem designated by a mnemonic preceding a bracket. For example the signal on lead DRP7-0 is received from the computer memory control unit CMC. Signals received from the B units of the two register sender subsystems are received via cable receivers of unit CCP-B and supplied to both units CCP-A and CCP-B. Similarly the signals received from the A units of the register sender subsystems following the cable receivers of unit CCP-A are supplied to both the A and B units of the computer central processor CCP.

Figure 7:
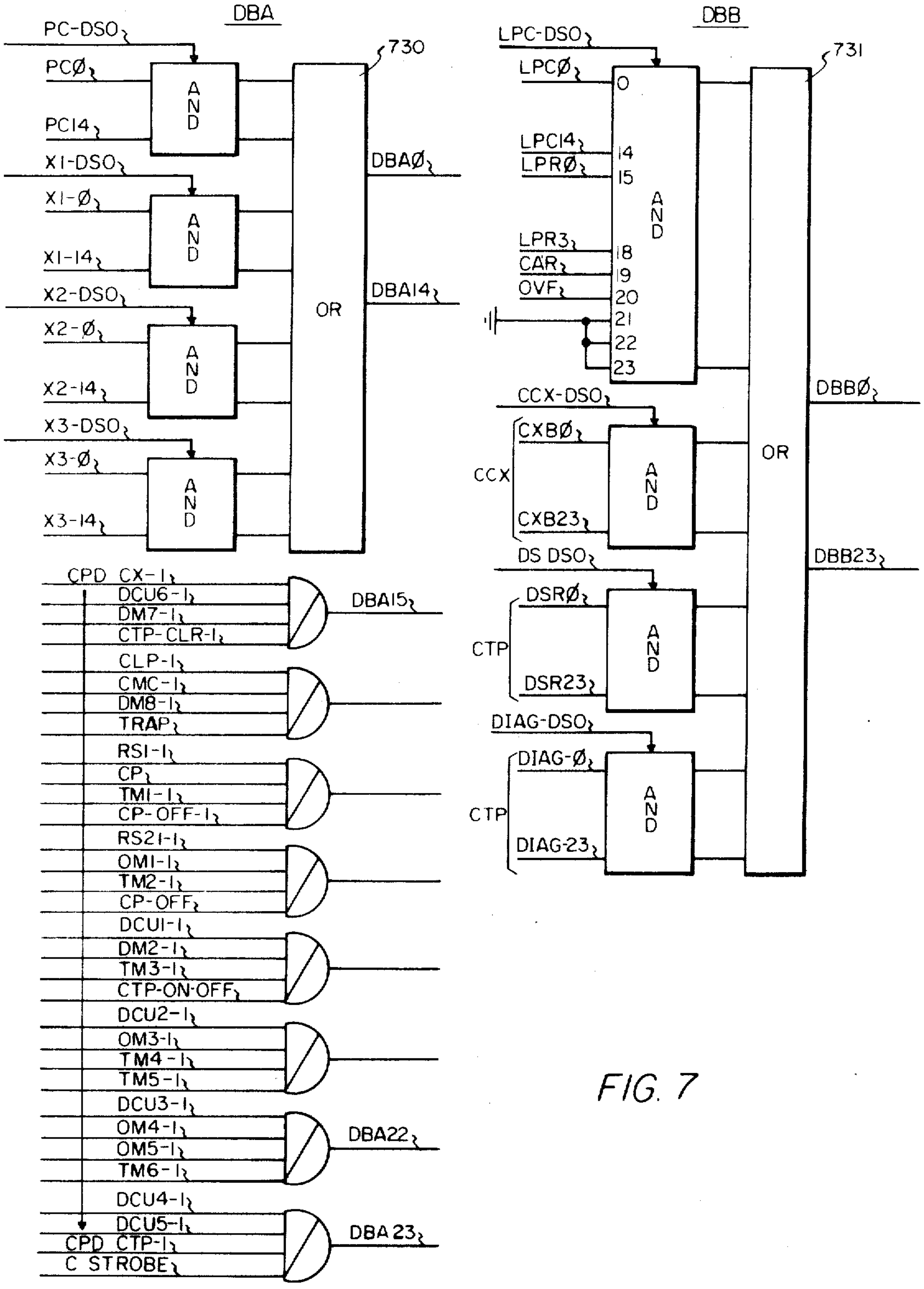
Figure 11:
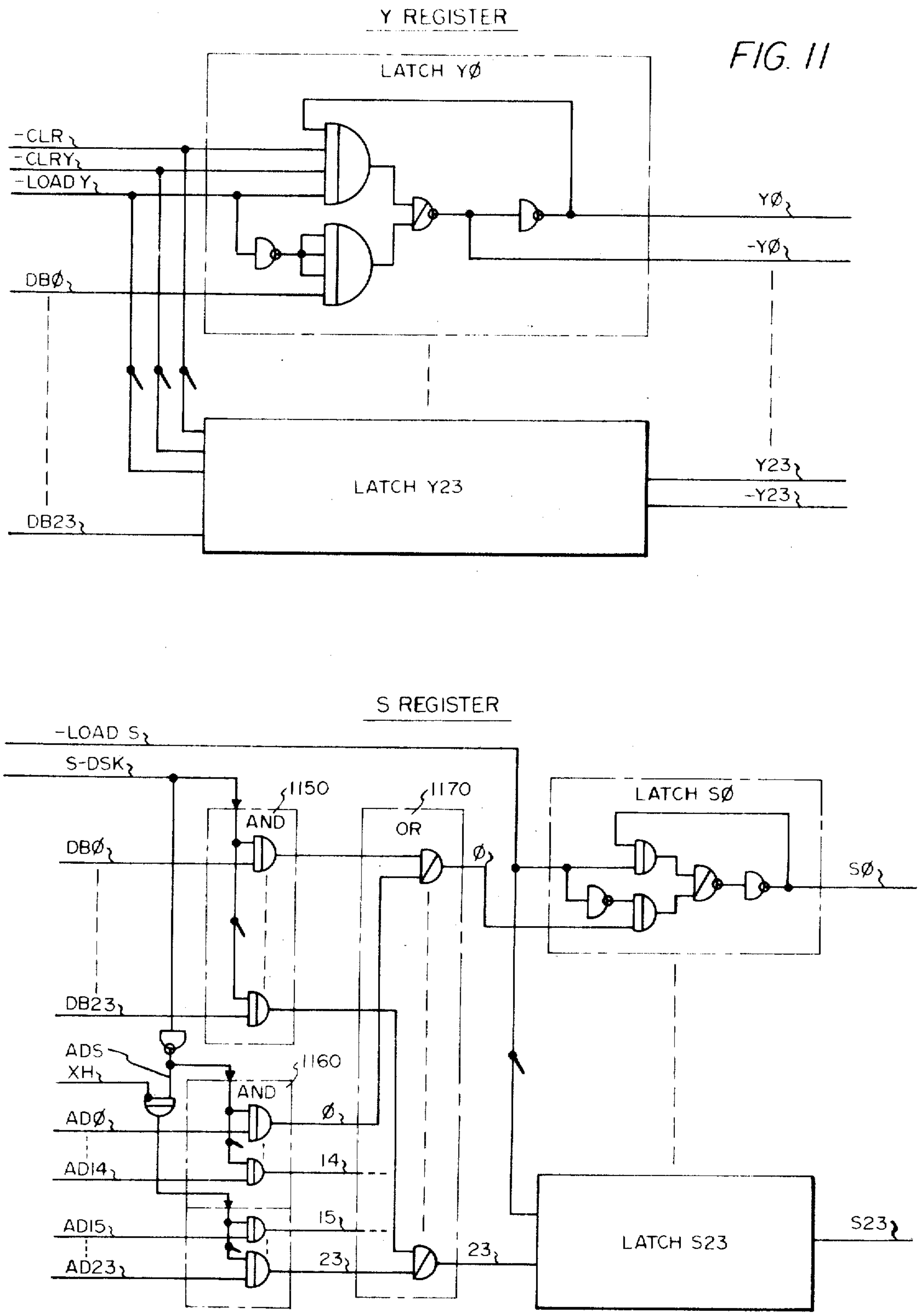
FIG. 11 is a functional block diagram of the Y and A registers.

In FIG. 6 and in several of the other figures, rectangular blocks designated AND are used to represent a set of AND gates having signal sources from the respective bit positions and a common enabling signal; and blocks designated OR are used to represent the set of OR logic for the several bit positions combining signals from the AND blocks. The arrangement of the gates within these blocks is shown at the bottom of FIG. 11 with block 1150 representing an AND block and 1170 representing an OR block. In some cases the bit positions are subdivided into groups with different enabling signals; for example in the block 604 the control signal A(ϕ-5)-DSO enables bit positions ϕ-5, the control signal A(6-7)-DSO enables the gates for bit positions 6 and 7, etc. The signal source leads for block 604 are all from the A register; but in some cases the signal sources for different bit positions will be from different registers or other sources. For example in block 607 the control lead SC-DSO enables bit positions ϕ-13 to gate the signals from bit position ϕ-5 from the shift counter SC with ones into bit positions 6–13, while the signal on lead PC-DSO enables bit positions 12–21 to gate a 0 into bit position 14, the signals from the page register PR in the bit positions 15–20, and a 0 into bit position 21. In bit positions 22 and 23 both the enable signal and the source leads are 0's so that the output from these positions is always 0. The signal ONES is derived from an electronic ground via an inverter. For 0's electronic ground is used directly. The OR gating corresponding to block 540 in FIG. 5 is represented in FIG. 6 by OR blocks 637, 638 and 639 feeding OR block 640 for convenience. The OR function gating corresponding to gates 530 and 531 is shown in FIG. 7 by blocks 730 and 731 respectively. The block 730 has only 15 bit positions for sources from the index registers and program counter which likewise have only 15 bit positions. The other signals for leads DBA15–DBA23 are derived from OR gates having four inputs each from control pulse directive CPD sources except that the last input of the gate for bit position DBA23 is the signal C STROBE.

As shown by AND gate 501 which is a part of the AND logic 601, the Data Bus leads DB-ϕ to DB-23 are connected back as input data sources. These AND gates are enabled by the signal LATCH DB, so that any ones appearing on the data bus are latched as long as the signal LATCH DB is true. However, it is possible to enable another source to gate additional 1's onto the data bus.

Figures 8, 9:
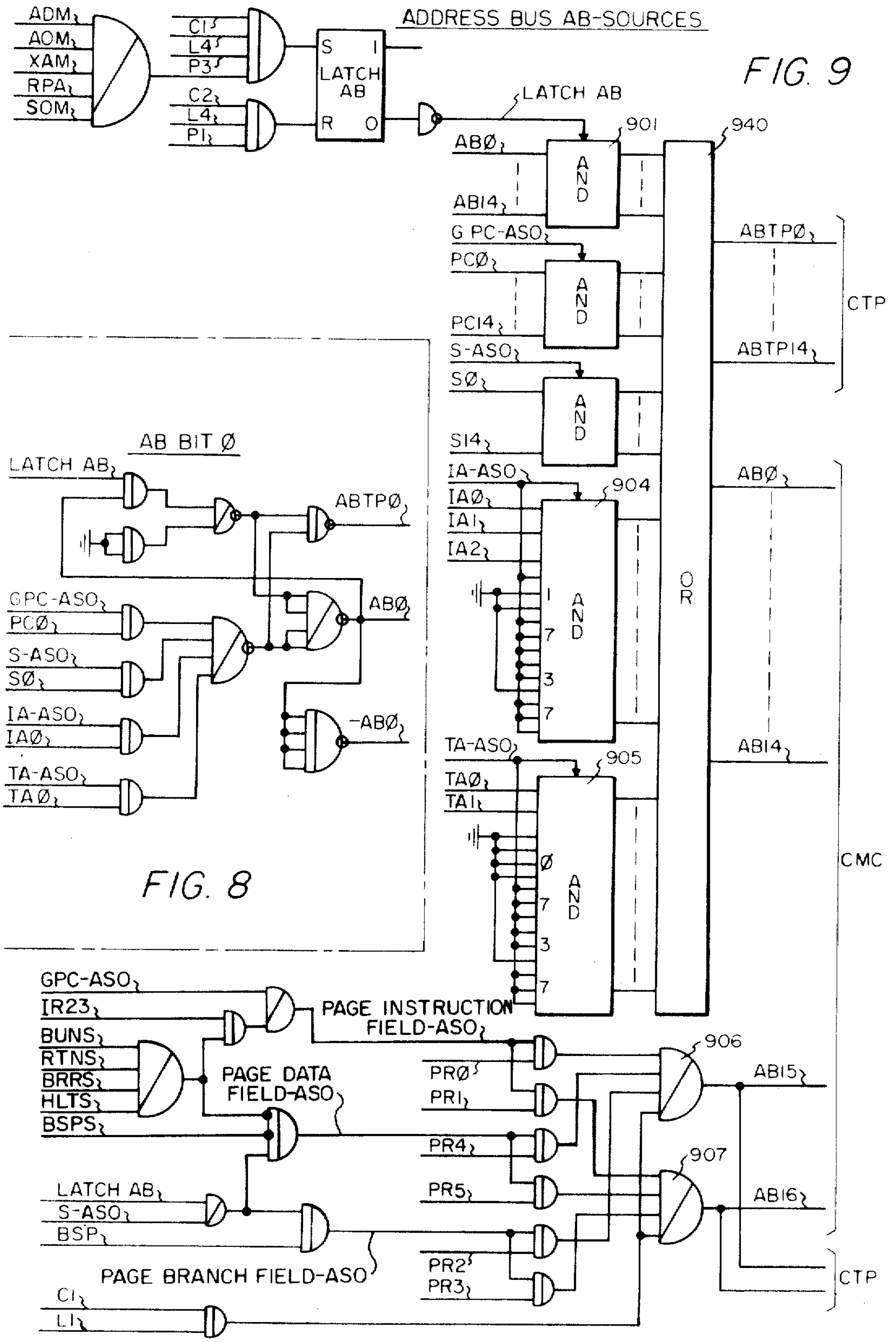
FIG. 8 is a functional block diagram showing the address bus sources for bit ∅.
FIG. 9 is a functional block diagram showing all of the address bus sources.

The sources for the address bus AB are shown in FIG. 8 with the actual logic for bit ϕ, and in FIG. 9 for 15 bit positions via the OR logic 940 plus two additional bit positions from the page register. Latching of the address bus is provided via AND logic 901 with bits ABϕ to AB14 as sources enabled by the signal LATCH AB. This latch signal is provided by a latch which is shown along with its setting and resetting logic.

The program counter is used as a source when the enabling signal GPC-ASO is true, and the S register is used as a source when the enabling signal S-ASO is true.

For interrupts the AND logic 904 is enabled by signal IA-ASO. Four of the five octal digits for the address source are provided by hardwired inputs so that the address is 7371X, where the value of X is determined by the three inputs 1A0, 1A1 and 1A2 which are received from the computer line processor CLP. For traps the address is provided by AND logic 905 enabled by a signal TA-ASO to provide a wired address 737ϕX, where the value of X depends on signals TA0 and TA1 derived from the computer third party CPT.

The paging bits of the address are supplied via OR gates 906 and 907 for bit positions AB15 and AB16 respectively, with the logic providing inputs from the page register as shown.

REGISTERS OF THE COMPUTER CENTRAL PROCESSOR

The registers shown in the block diagram of FIG. 1 are shown in more detail in FIGS. 10–15.

The instruction register IR comprises 24 storage devices in the form of latches. Each of the latches comprises an integrated circuit chip comprising two four-input AND gates such as 1011 and 1012 feeding a NOR gate such as 1013. The output from gate 1013 via an inverter 1014 supplies the output signal IRϕ, while the output from gate 1013 is the negative signal −IRϕ. Both the true and inverted signals may be taken from each of the latches. The instruction register is loaded from the data bus bits DBϕ–DB23. The load signal to the latches is supplied in inverted form shown as an input to the latches for positions IRϕ–IR11 as –LOAD. The loading of these latches depends on a time delay achieved in the inverters such as 1010. For example when the signal LOAD becomes true (–LOAD false) then via inverter 1010 the upper input of AND gate 1012 is enabled and if the source signal DBϕ is also true then the output of the latch becomes true. This output is fed back to the upper input of AND gate 1011. When LOAD goes false (–LOAD true) then gate 1011 is enabled to maintain the latch

TABLE A

Figure 10:
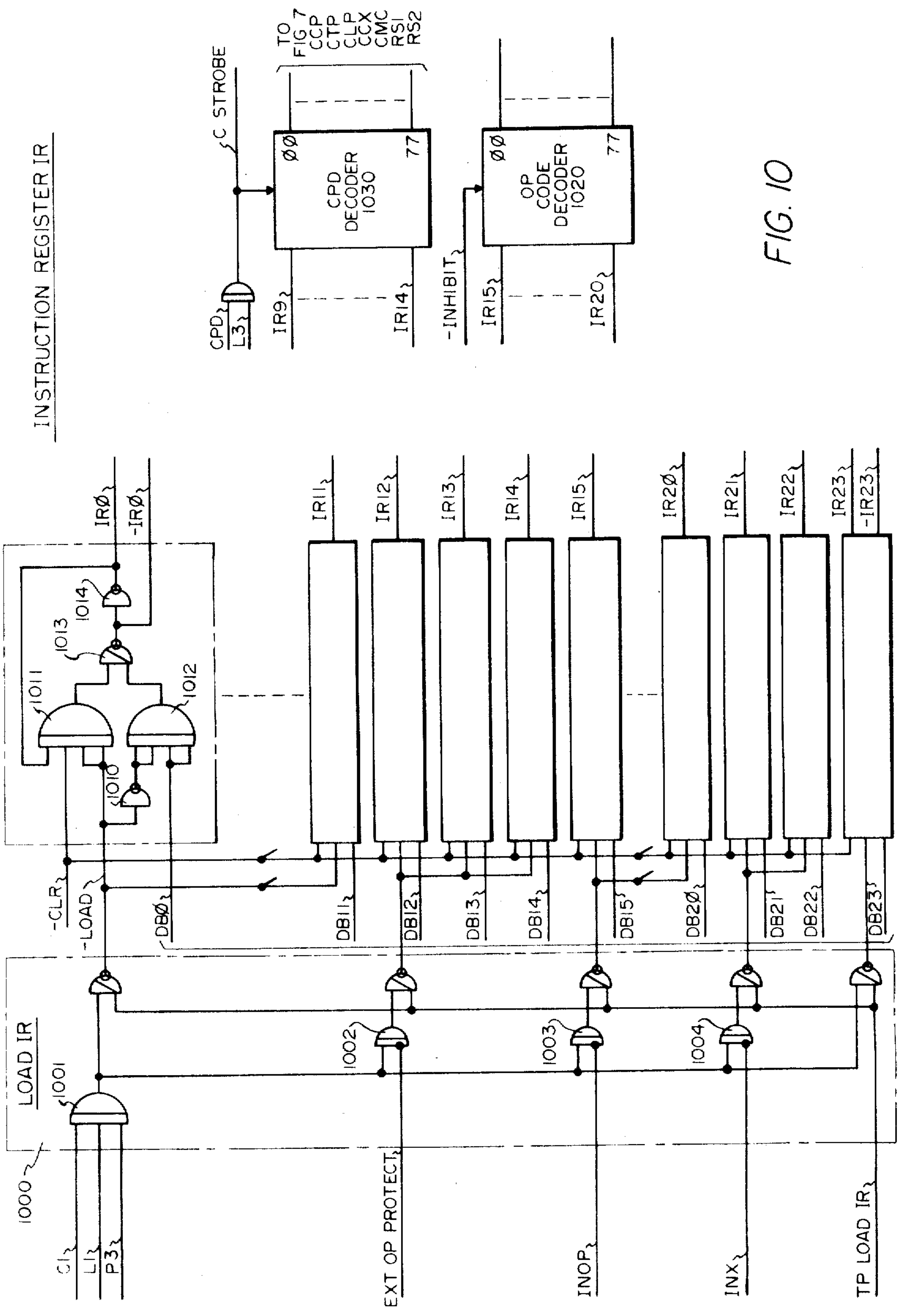
FIG. 10 is a functional block diagram of the instruction register.

| | | | | | | | |
|---|---|---|---|---|---|---|---|
| OP00 | — | OP20 | ADX | OP40 | ADD | OP60 | |
| 01 | ADI | 21 | SBX | 41 | SUB | 61 | PAR |
| 02 | SBI | 22 | CAX | 42 | MUL | 62 | BSP |
| 03 | HWL | 23 | CSX | 43 | DIV | 63 | — |
| 04 | HWS | 24 | IBP | 44 | AOM | 64 | LDQ |
| 05 | SEL | 25 | IBN | 45 | SOM | 65 | STQ |
| 06 | LSGA | 26 | STX | 46 | ADM | 66 | LPR |
| 07 | SSNT | 27 | — | 47 | XEC | 67 | HLT |
| 10 | RTN | 30 | BPX | 50 | ANA | 70 | SMNT |
| 11 | BUN | 31 | BNX | 51 | ORA | | SMNZ |
| 12 | SFTL | 32 | BZX | 52 | ERA | 72 | SANE |
| 13 | BZA | 33 | CCA | 53 | XAM | 73 | SANG |
| 14 | BNA | 34 | SFTA | 54 | LDA | 74 | LDC |
| 15 | BPA | 35 | BAO | 55 | STA | 75 | STC |
| 16 | BRR | 36 | RTR | 56 | CSA | 76 | SAMQ |
| 17 | CPD | 37 | MIS | 57 | RPA | 77 | SMNN |

set before the upper input of gate 1012 becomes false. The signal on lead –CLR is normally true, and when it goes false it clears all of the latches to zero. The LOAD IR logic is shown in simplified form within block 1000. During normal operation the AND gate 1001 is enabled in response to the condition C1.L1.P3, which normally is the necessary condition for loading all bit positions. The loading of bit positions IR12, IR13 and IR14 may be inhibited at gate 1002 by the signal EXT OP PROTECT, the loading of bit positions IR15–IR2ϕ may be inhibited at gate 1003 by the signal INOP, and the loading of bit positions IR21 and IR22 may be inhibited at gate 1004 by the signal INX. All bit positions may alternatively be loaded by the third party signal TP LOAD IR. FIG. 10 also shows the OP code decoder 1020 for the instruction set, and a control pulse directive decoder 1030. The control pulse directive decoder 1030 is enabled by the signal on lead C STROBE which is true in response to the condition CPD.L3. It decodes the value of the control pulse directive from the six bit positions IR9–IR14 which provide the output octal codes ϕϕ to 77. These outputs are supplied to the data bus as shown in FIG. 7, and also to the various subsystems to which they apply.

The outputs of the OP Code decoder 1020 represent the decoding of the six instruction register bits IR2ϕ–IR15 along with the signal INHIBIT'. The six IR bits are expressed as two octal digits. For example ADM=OP46=IR20 . IR19' . IR18' . IR17 . IR16 . IR15' . INHIBIT. The full decoding is shown in Table A. Note that codes OPϕϕ. OP27 and OP63 are invalid codes which via on OR function gating provide the signal IOP.

The Y register shown at the top of FIG. 11 comprises 24 latches similar to those used in the instruction output from all of the odd positions is in true form while that from even positions is an inverted form. With this arrangement the carry is propogated through all of the bit positions via only the single integrated circuit chip for each position, thus minimizing the propogation time.

When the signal ARITH is true the output is the sum of the contents of the Y register and data bus. When the signal EXO is true the output is the exclusive OR function of the Y register and data bus. When the signal on lead AND is true the output is the AND function of the Y register and data bus. To provide the OR function the signals on leads AND and EXO are supplied simultaneously. To provide the subtract function with 2's complement arithmetic the signals on lead INVERT and the carry input on lead Cϕ are provided. To simply invert a number in 2's complement form it is supplied into the Y register, with the data bus all zeros, and the signals INVERT and Cϕ are provided.

Figure 13:
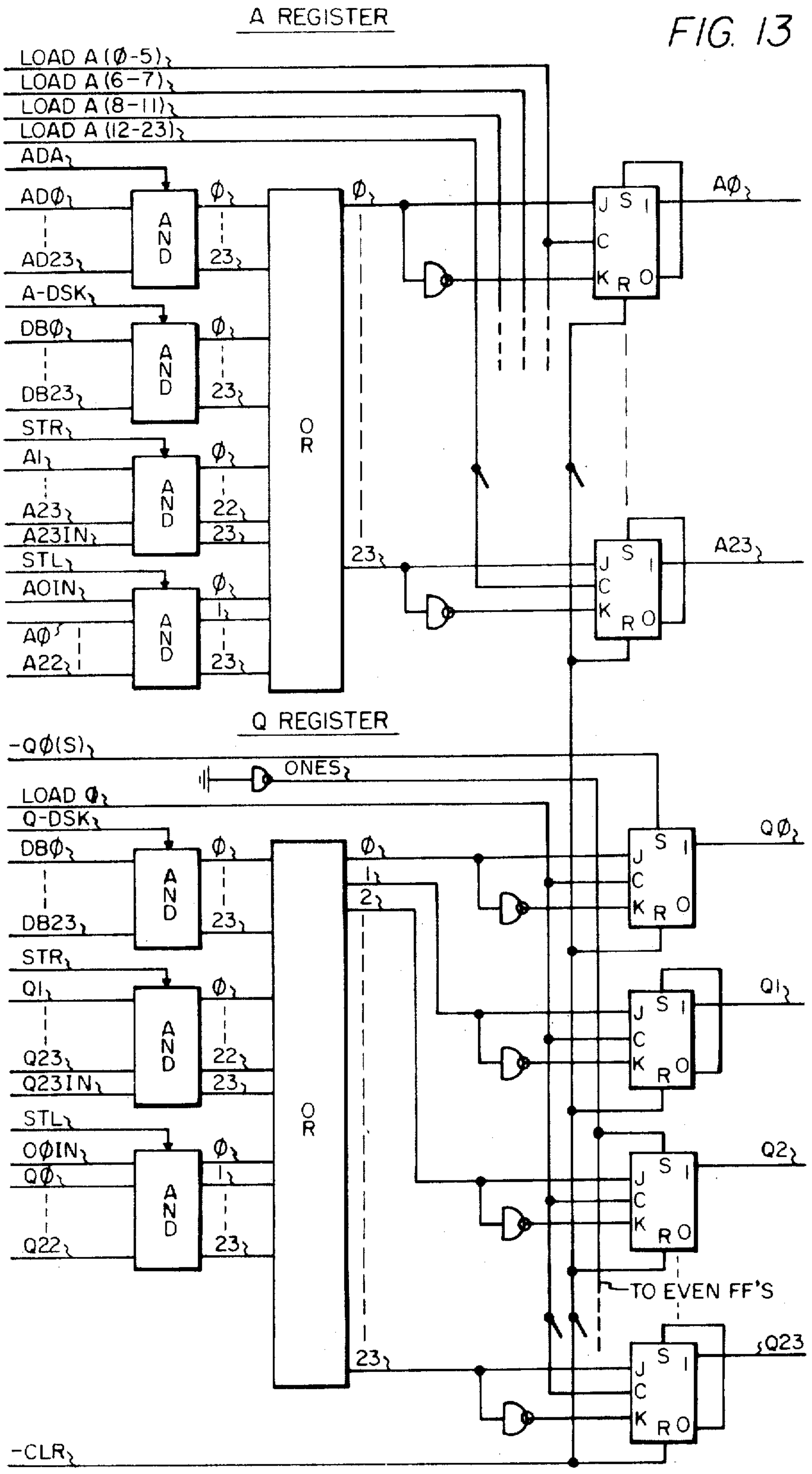
FIG. 13 is a functional block diagram of the A and Q registers.

The A register and Q register are shown in FIG. 13. These registers each comprise 24 JK flip-flops. These registers are loaded by supplying a load signal to the clock inputs and supplying the data to be loaded to the J inputs and inverted to the K inputs. The clock input for the Q register is LOAD Q, while for the A register the flip-flops are divided into four groups with separate load signals to the clock inputs as shown. Both registers may be set to all zeros by a signal on lead –CLR at zero level. Register A may be loaded from the arithmetic logic unit bits ADϕ–AD23 with an enabling signal ADA, may be the sink for the data bus bits DB0–DB23 with the enabling signal A-DSK, may be loaded from its own output shifted one bit position to the right and register. This register is also loaded from the data bus bit positions DBϕ–DB23 in response to an LOAD Y signal. The S register shown at the bottom of FIG. 11 also comprises 24 latches similar to those of the IR register, except that the AND gates have only two inputs. This register may be loaded from either the data bus or the arithmetic logic unit in response to a signal LOAD S. It is loaded from the data bus via AND logic 1150 when the signal on lead S-DSK is true indicating that the S register is the data sink. It is loaded from the arithmetic logic unit bits ADϕ–AD23 via AND logic 1160 in response to an enabling signal on lead ADS, which is true whenever the signal on lead S-DSK is false. The bit positions 15–23 are inhibited when the signal on lead XH is true to prevent loading from bits AD15–AD23. The outputs from the AND logic 1150 and 1160 are passed through OR logic 1170 to the data inputs of the S register. The arrangement of the gates within the blocks 1150, 1160 and 1170 is shown here, whereas in other figures only the blocks are shown to represent the same form of logic.

Figure 12:
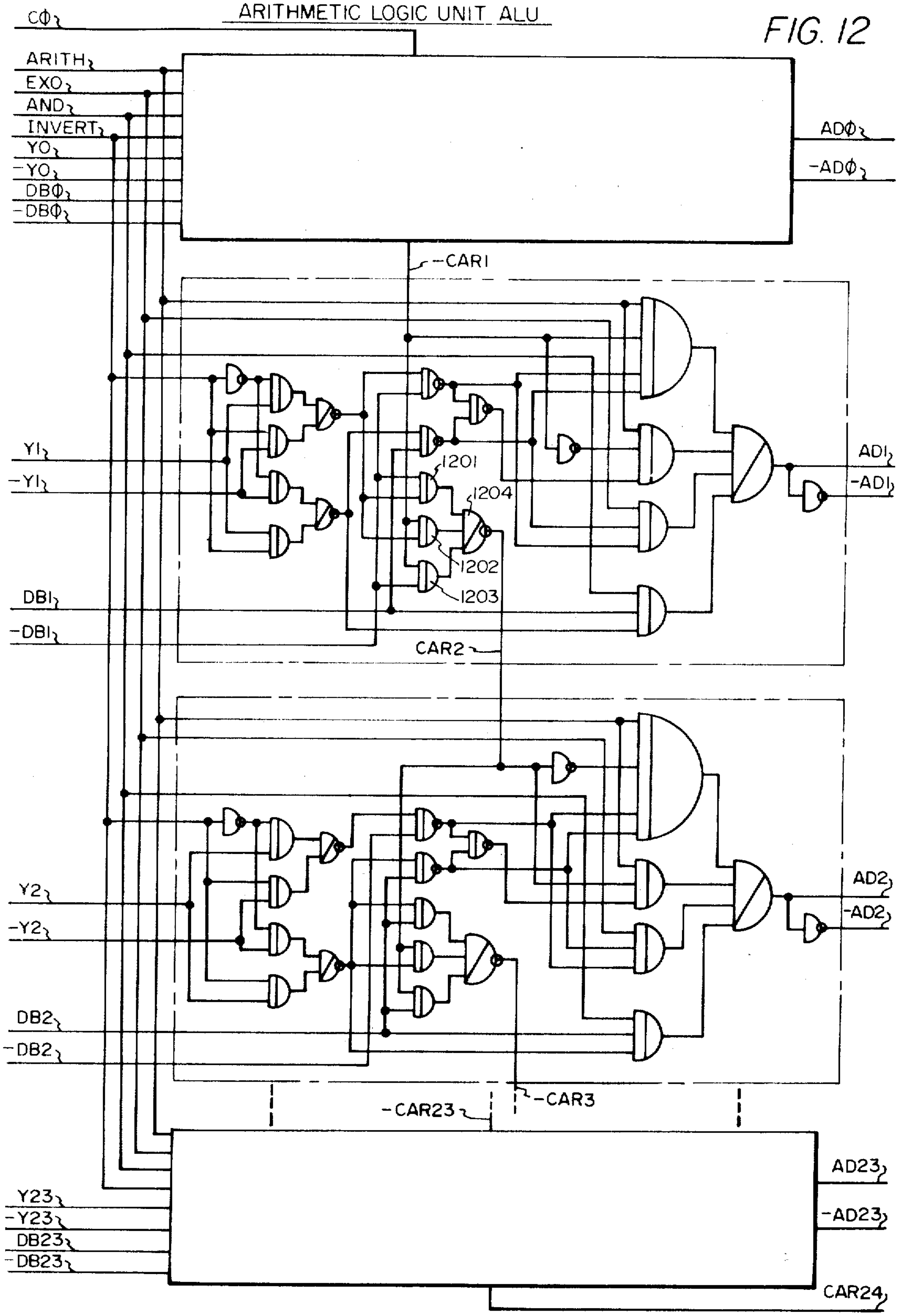
FIG. 12 is a functional block diagram of the arithmetic logic unit.

The arithmetic logic unit ALU is shown in FIG. 12. This is a 24 bit parallel adder. The circuit for bit positions AD1 and AD2 is shown in detail. The data inputs to the register are from the Y register and the data bus, and the output on leads ADϕ–AD23 is the result of the arithmetic operation. A feature of the adder is that the carry output from each bit position is from an integrated circuit chip which as shown for bit position AD1 comprises a two-input AND gates 1201, 1202 and 1203 feeding an NOR gate 1204. The chip actually contains four AND gates but one of them has its inputs connected to ground. The arrangement is such that the carry supplying the signal A23IN for the 23rd bit with an enabling signal STR, and may be loaded from itself shifted one bit to the left and supplying the signal AϕIN for bit position zero with an enabling signal STL. Similarly the Q register may act as a data sink for the data bus with an enabling signal Q-DSK, may be loaded from itself shifted one bit position right and a signal Q23IN in the 23rd bit position with an enabling signal STR, and may be loaded from itself shifted one bit position left with a signal $Q\phi IN$ in bit position zero with an enabling signal STL. The flip-flop $Q\phi$ may also be set by a zero level signal on lead $-Q\phi(S)$.

Figure 14:
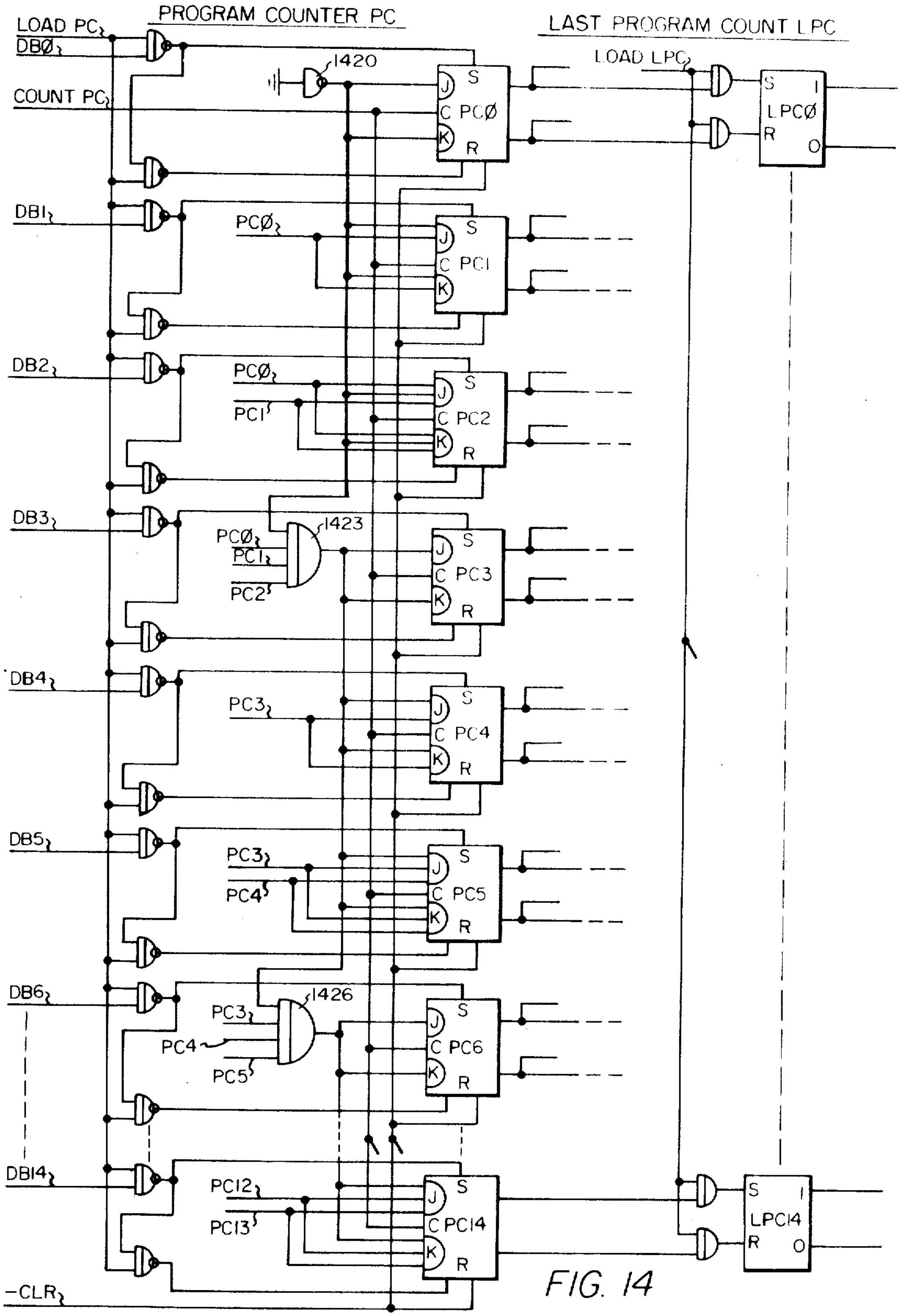
FIG. 14 is a functional block diagram of the program count and last program count registers.

The program counter PC and last program count register LPC are shown in FIG. 14. The program counter PC comprises 15 JK flip-flops connected as a binary counter, advancing one count each time a trailing edge of a pulse appears on lead COUNT PC connected to the clock inputs. The counter may also be loaded from the data bus in response to a signal on lead LOAD PC, the loading being effective via the asynchronous inputs S and R. The counter may also be cleared by a zero level signal on lead –CLR to the second reset input of each flip-flop. The first seven flip-flops and the last one have been shown in order to illustrate the binary counting logic at the J and K inputs. The logic is arranged in groups of three flip-flops which with each having an AND gate supplying J and K inputs of all three, for example gate 1423 supplies J and K inputs of flip-flops PC3, PC4 and PC5 with the inputs of gate 1423 being from the preceding three flip-flops PC/, PC1 and PC2, and one input from the AND gate of the preceding three flip-flops. The second flip-flop of each group, for example flip-flop PC4 also has J and K inputs from the preceding flip-flop, namely, PC3, while the third flip-flop of each group such as PC5 and has J and K inputs from both of the other flip-flops, namely PC3 and PC4. The output of gate 1423 is then supplied as an input to gate 1426 for the next group of three, etc. For the first group of three instead of an AND gate an inverter 1420 with input from ground is substituted.

The last program count register comprises 15 latches of the type each comprising two NAND gates. AND gates are provided to load the output of the program counter PC into the last program count register LPC in response to a signal on lead LOAD LPC.

Figure 15:
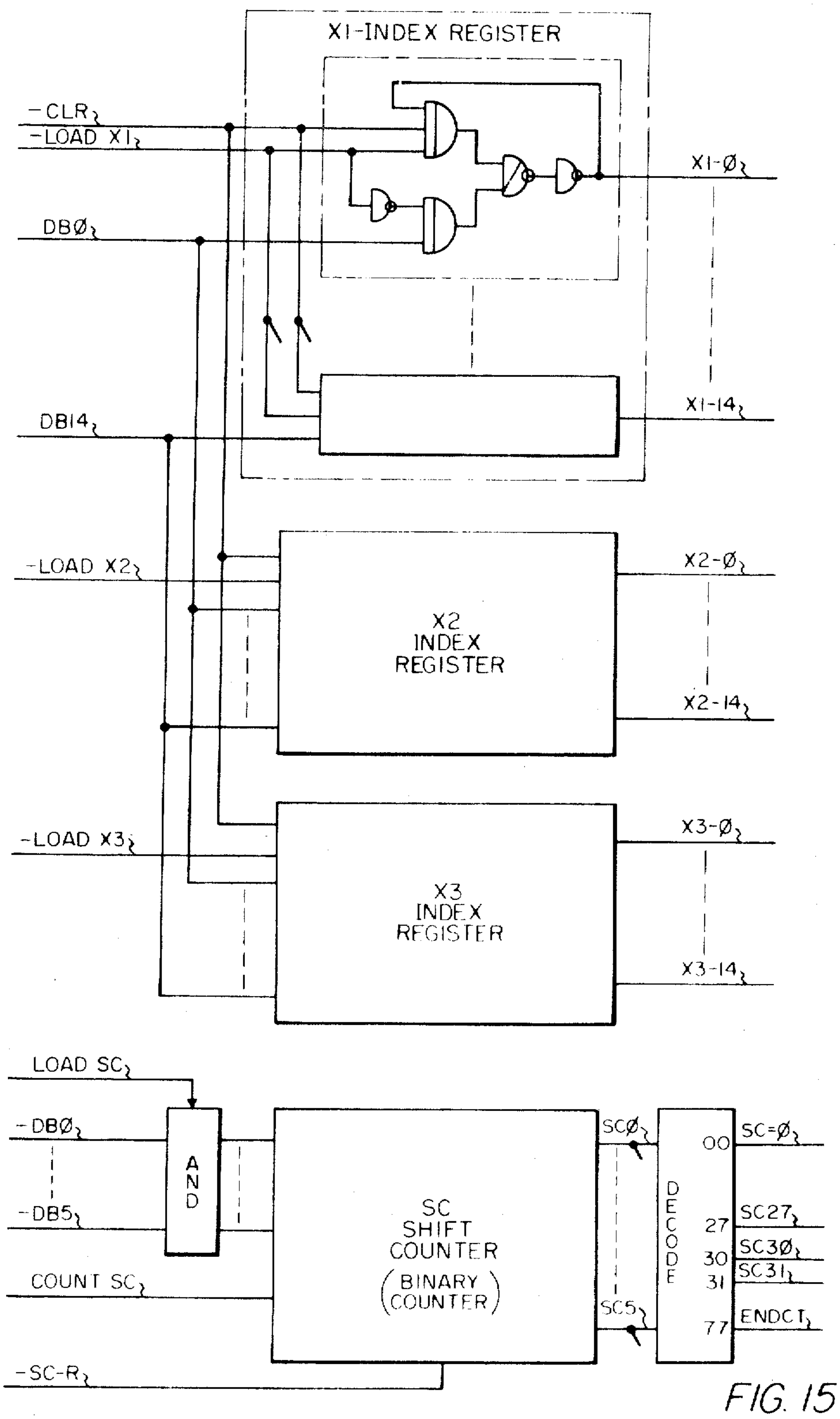
FIG. 15 is a block diagram of the index registers and a shift counter.

The three index registers X1, X2 and X3 shown in FIG. 15 each comprise 15 latches similar to those used in the instruction register and Y register. Each of these registers may be loaded in response to each individual load command from the 15 low order bits of the data bus. and Y The shift counter SC shown at the bottom of FIG. 15 is a six-bit counter with JK flip-flops generally similar to the program counter PC. The count is advanced once upon each occurrence of a trailing edge on lead COUNT SC. The counter may be loaded via AND logic from the inverted six low order bits of the data bus in response to the command LOAD SC. The output of the counter is decoded for certain values as shown, SC=0 for the state in which all the flip-flops are set to zero, SC27, SC30 and SC31 for corresponding octal values, and ENDCT for the octal value 77.

CONTROL LOGIC FOR THE COMPUTER CENTRAL PROCESSOR

The control unit logic block CPC in FIG. 1 represents the logic for supplying the control signals for transferring data and address information among the registers and buses. The definitions of the various signals, and the Boolean equations follow.

Definitions

| | |
|---|---|
| ACKN | ACKNOWLEDGED RECEIPT OF DATA FROM I/O |
| ADA | =OUTPUT OF ADDER TO RA |
| ADD1 | INDICATION THAT A CORRECTIVE ADDITION OF ONE MUST TACKED ON TO THE QUOTIENT |
| ADZ | =OUTPUT OF ADDER EQUALS ALL ZEROS. |
| AND | =LOGICAL AND |
| A-DSO | =REGISTER "A" AS A DATA SOURCE |
| A23IN | =DATA INTO BIT 23 OF REG.A |
| BCHI | =A STORED BRANCH INDICATOR |
| BDIS | PRCF BUTTON DISPLAY ENABLE |
| C STROBE | SIGNAL USED TO STROBE DATA BUS DURING CPD |
| CAR (S) | =CARRY,OUT OF BIT 23 OF ADDER,STORED |
| CCX-DSO | =CHANNEL MULTIPLEX AS A DATA SOURCE |

| | |
|---|---|
| CLR | =CLEARS TO AN INITIAL STATE THE FOLLOWING: RA,RO,Y,IR,X1,X2,X3,PC.SC,TP TRAP, START CLK,CLK,SYNC,MMREAD,MMWRITE LOCKOUT, CARRY,OVF,EVEN PARITY TEST STORAGE,LATCH AB, TST CPD,WMPB,PCINH,RSSEL,TRAP DISABLE, XH,LOAD LPC INHIBIT,BRH,INST,SW TO STDBY RT CLK,QZ,MADD,ADDI,INX,INTIN,INOP,SREJECT, |
| CØ | =CARRY INTO BIT 0 OF ADDER |
| COUNT SC | COUNT SHIFT COUNTER |
| CRS1 | SELECT REGISTER SENDER 1 UNIT A WHEN SET, AND RS 1 UNIT 1B WHEN RESET |
| C13 INST | =INDICATES AN INSTRUCTION THAT ACCESS MEMORY DURING CYCLE 1 LEVEL 3 |
| C23 INST | =INDICATES AN INSTRUCTION THAT ACCESS MEMORY DURING CYCLE 2 LEVEL 3 |
| DEPE | =DATA EVEN PARITY ERROR |
| DIVZ | INDICATES A DIVISION BY ZERO |
| DSTROBE | DATA STOBE TO CCX |
| DS-DSO | =PRCF DATA SWITCH REGISTER AS A DATA SOURCE |
| ENWD | =ENABLE WATCHDOG TIMER |
| EXO | =EXCLUSIVE"OR" |
| IEPE | =INSTRUCTION EVEN PARITY ERROR |
| INHIBIT | =INHIBIT OF OP CODE |
| INVERT | =INVERTS THE OUTPUT OF Y REG. 1'S COMPL. |
| INOP | INHIBITS LOADING OF OPERATION FIELD IN IR |
| INVOP | ERROR INDICATING AN INVALID OP CODE |
| INX | INDICATION OF A NON INDEXABLE INSTRUCTION |

| | |
|---|---|
| IRL-DSO | =INSTRUCTION REG BITS(12-23) AS A DATA SOURCE |
| IS SYNC | SYNC PULSE SENT TO THE CLP |
| LATCH AB | =LATCH ADDRESS BUS |
| LBF | LOAD BRANCH FIELD OF PAGE REGISTER |
| LDF | LOAD DATA FIELD OF PAGE REGISTER |
| LOAD AL | LOAD RA BITS 12-23 |
| LOAD AR | LOAD RA BITS 0-11 |
| LOAD LPC | LOAD LAST PROGRAM COUNT REGISTER |
| LOAD SC | =LOAD SHIFT COUNTER |
| LPC-DSO | =LAST PROGRAM COUNT AS DATA SOURCE |
| MADD | INDICATES THAT AN ADDITION PROCESS DURING MULTIPLICATION |
| MODE | INDICATES SUCCESSIONS OF '1'S"OR"0"S"IN MUL |
| OFV | =OVERFLOW |
| PBRM | PROTECT BIT OF REFERENCED MEMORY |
| PCINH | INHIBITS COUNTING OF PROGRAM COUNTER |
| PC | =PROGRAM COUNTER |
| PC-DSO | =PROGRAM COUNTER AS A DATA SOURCE |
| PEP7 | =PORT 7 ERROR THAT INDICATES AN ERROR HAS OCCURRED IN THE COMPUTER MEMORY CONTROL CIRCUIT RELATIVE TO PORT 7 WHICH IS ASSIGNED TO THE CENTRAL PROCESSOR. THE ERROR IS CAUSED WHEN THE CCP ADDRESSES A LOCATION OUTSIDE THE RANGE OF MEMORY, OR WHEN THE CCP ATTEMPS TO WRITE INTO READ ONLY MEMORY |
| QOIN | =DATA INTO BIT O OF RQ |
| Q23IN | =DATA INPUT TO REG.Q BIT 23 DURING A SHIFT |

| | |
|---|---|
| REI | =RESET ERROR INDICATORS |
| RS1B-DSO | =REGISTER SENDER 1 UNIT B AS DATA SOURCE |
| RS1A-DSO | =REGISTER SENDER 1 UNIT A AS DATA SOURCE |
| RS2A-DSO | =REGISTER SENDER 2 UNIT A AS DATA SOURCE |
| RSSEL | SELECTS REGISTER SENDER 2 WHEN SET AND REGISTER SENDER 1 WHEN RESET AS A SINK |
| RST MEM REQ | RESETS A MEMORY REQUEST FROM THIRD PARTY |
| RWD | =RESET WATCHDOG TIMER |
| SC(R) | =RESET SHIFT COUNTER |
| SC-DSO | =SHIFT COUNTER AS A DATA SOURCE |
| SET L2 | SET LEVEL 2 |
| SG-DSO | =SENSE GROUP AS A DATA SOURCE |
| SKIP ON SANG | =A LESS THAN OR EQUAL TO EA. SANG |
| SMP | =SHIFT AND MARK POSITION INSTRUCTION |
| SREJECT | =STORED REJECT INDICATING A REJECTION OF AN ARITHMETIC PROCESS DURING DIV. |
| START | START THE TIMING GENERATOR |
| STP CLK | STOP THE TIMING GENERATOR |
| STR | =SHIFT RIGHT GATING |
| SW TO STDBY RT | =SWITCH TO STANDBY REAL TIME CLOCK |
| S(0-14)-DSO | =REGISTER S BITS 0 THRU 14 AS A DATA SOURCE |
| TID | TRANSFER INSTRUCTION FIELD TO DATA FIELD |
| TOVF | =TEMPORARY OVERFLOW OF PARTIAL PRODUCTS DURING MULTIPLICATION. |
| TP DSTROBE | DATA STROBE TO THIRD PARTY |
| TST CPD | A MAINTENANCE SIGNAL THAT ALLOWS A CHECK FOR A LATENT FAULT ON THE INPUT TO THE CPD DECODE CIRCUIT |

| | |
|---|---|
| WMPB | STORED SIGNAL TO WRITE MEMORY PROTECT BIT |
| XHQ | INDICATION THAT AN INDEX IS BEING PROCESSED |
| ZELO1 | =TP TRAP + ERR TRAP |

EQUATIONS

| | |
|---|---|
| ACKN | =CCA.IR14.C2.L3+STC.C2.L1 |
| ADA | =STL'.A-DSK'(C2.L3(P3+P4+P5).MUL)'.<br>(C1.L3.IR12(SFTA+SFTL))' |
| ADDIN1 | =XAM+CSA+ANA+ORA+ERA+DIV+ADD+SUB |
| ADDIN2 | =ADD+SUB+DIV+CSA+SMP+MUL+SMNT+SMNZ |
| ADD1 (S) | =C2..L3.P4.DIV.SC31.SREJECT' |
| ADD1 (R) | =L4.P4.PC-ASO+CLR |
| ADS 1A (0-15) | =(C2.L3)'(C2.L1(RPA+SAM))' (RTR.L2)' |
| ADS 1B (16-23) | =(C2.L3)'(C2.L1(RPA+XAM))'(RTR.L2)'.XH' |
| ADX IN1 | =CSX+ADX+SBX+IBP+IBN+INDEX+IR23+MRI(LPR+HLT)' |
| ADZL | =AD12'.AD13'.AD14'.AD15'.AD16'.AD17'.AD18'<br>.AD19'.AD20'.AD21'.AD22'.AD23' |
| ADZR | =AD0'.AD1'.AD2'.AD3'.AD4'.AD5'.AD6'.AD7'<br>AD8'.AD9'.AD10'.AD11' |
| AOIN | =SFTA.IR14'.IR13.Q23+SFTL-IR14'.IR13'.Q23<br>+SMP.Q23+DIV.Q23+CCA.A23 |
| AND | =(SMNT+SMNZ+ANA+ORA)C2+SAMQ.C2.L3<br>+HWS.LR13'+SSNT+HWL.IR14' |
| ARITH | =EXO'.AND' |
| A-DSK | =CCA.C2+MUL.C1+(DIV+XAM)C2.L4+LDA+PRA+LSGA<br>+RTR+CPD TST |
| A-DSO | =(RTR(L2.IR6+L3.IR0.IR13)+L2(HWL+HWS)<br>+(C1.L4)(ADM+SANE+SANG+SAMQ) |

```
                +L2.P5'.BZA
                +C2.L1'(ANA+ORA+ERA)
                +C3(L2+L3)DIV
                +C2.CCA.IR14'.IR13.IR12
                +C2.L2(SMNT+SMNZ)+L3(PAR+STA)
                +C2.L1')ADD+SUB)
                +(L3+L4)(ADI+SBI)
                +C2(L2+L3)(MUL+DIV)
                +(C2.L3.XAM))(CLK+BP)
A(0-5)-DSO     =A-DSO+A(15)-DSO+A(12)-DSO+A(8)-DSO+A(6)=DSO
A(6-7)-DSO     =A-DSO+A(15)-DSO+A(12)-DSO+A(8)-DSO
A(8-11)-DSO    =A-DSO+A(15)-DSO+A(12)-DSO
A(12-14)-DSO   =A-DSO+A(15)-DSO
A(15-23)-DSO   =A-DSO
A23IN          =SFTL.Q0.IR14'.IR13'+SFTA.A23.IR14'.IR13'
                +MUL(MADD.TOVF+MADD'.A23)
                +SFTA.IR12.IR13.IR14'.A23
BCHI    (R)    =PC-ALO.L4.P5+CLR
BCHI    (S)    =L2.P3(OVF.BAO+DBZ.BZA+A23.BNA.A23'.BPA
                +DBZ.BZX+DB14'.BPX+DB14.BNX)+L2.P5.IBP.AD14'
                +L2.P5.IBN.AD14
BDIS           =CLK'.LDPC'.TP POWER ON(DMEME+ENMEME)'
BRH     (S)    =BRR.L1
BRH     (R)    =L1.Pr+CLR
BRS            =BRR(L2+L3)
C STROBE       =CPD.L3
CAR     (S)    =L4.P3.CAR24(ADD.C2+SUB.C2+ADI+SBI)
                +L3.P3.BRR.AD19
```

CAR (R) =L4.P3.CAR24'(ADD.C2+SUB.C2+ADI+SBI)
+CLR

CCX-DSO =(CLK+DBPB)(CCA.C2.IR14+STC(L3+L4)C1)
+BDIS.CCXPB
BCHI,TOVF,L1(P3+P4+P5)+L2,L2.P5+L3,
L2+L3,L1.P5+L2+L3.P1,L1+L2,L3(P4+P5)+L4,
P3+P4+P5.ALSO SETS TIMING GENERATOR TO
C3.L4.P5.&IS SENT TO THE CMC
IEPE,DEPE,INVOP,P7 ERR,DIVZ,ERR TRP STORED.

CLRY =(IBN+IBP)L1.P5+DIV.C3.L1.P3

CLR =TP CLR+M CLEAR.TP POWER

CO =DIV(ADDI.C3+SC=0'.C2+C2(A23'.Y23+A23.Y23'
+MUL.C2(01.SC27'+Q0.SC27)+IBP+IBN
+CSX+HWS+SBI+SBX+C2(AOM+CSA+SUB+SMP+SANE
+SANG)

COUNT PC =HWS.ADZR'.IR12.L3.P4+L2.P4.ADZ'.SSNT
+C2.L2.P4.ADZ'(SMNT+SMNZ)+C2.L2.P4.BSP
+EXPB'.PCINH'.C1.L1.P3.HWS.IR12'.ADZL'.L3.P4
+CLK'(DISMEM READ+ENMEM WRITE)
+ADZ'.SANE.C2.L2.P4+C2.L2.P4.SKIP ON SANG

COUNT SC =C1.L3.P2(CCA+SFTA+SFTL)+C2.L3.P2(DIV+MUL)

CRS1 (S) =CPD CP.DBN (BIT 0 IN CCPA BIT 2 IN CCPB)

CRSL (R) =CPS CP.DBN (BIT 1 IN CCPA BIT 3 IN CCPB)

CRS2 (S) =CPD CP.DB 4 (IN CCPA; DB 6 IN CCPB)

CRS2 (R) =CPD CP.DB 5 (IN CCPA; DB 7 IN CCPB

C13INST =ADI+SBI+RTR+MSI+HWL+SEL+SSNT+RTN+BUN
BAO+BZA+BNA+BPA+BRR+ADX+SBX+CAX+CSX
+BPX+BNX+BZX+LSQA+CPD+LPR+HLT

| | |
|---|---|
| C14INST | =STA+STQ+PAR+HWS+IBP+IBN+STX+SFTL+SFTA.IR14' |
| C23INST | =ADD+SUB+CCA+SMP+LDA+ANA+ORA+ERA+LDC+LDQ +CSA+BSP+SMNT+SMNZ+SANE+SANG+SMNN+PRA |
| C24INST | =STC+ADM+AOM+MUL+SOM+XAM+RPA+SAMQ |
| DBZ | =OUTPUT OF DATA BUS EQUAL ALL ZEROS |
| DB O | =IRO.IR(0-5)-DSO+SO.S(0-14)-DSO+AO.A(0-5)-DSO +QO.Q(0-22)-DSO+DBO.LATCH DB+DRP70.MDR-DSO +SCO+SC-DSO+SLO.SG-DSO+RS1DATA 0(1).RS1A-DSO +RS2DATA 0(1).RS2A-DSO+RS1DATA 0(2).RS1B-DSO +RS2DATA 0(2).RS2B-DSO+PC(0).PC-DSO+X1(0). X1-DSO+X2(0).X2-DSO+X3(0).X3-DSO+LPC(0).LPC-DSO+CXBO(1A).CCX-DSO+DSRO(2A).DS-DSO+DIAG(0) .DIAG-DSO +RTR.L3.IRO.IR13 |
| DEPE (S) | =C2.L1.P4.EP.(CCA.IR14+PRA+MDR-DSO +C1.L3.P4.EP.STC |
| DEPE (R) | =REI+CLR |
| DIAG-DSO | =BDIS.DIAGPB+TP DIAG-DSO(C1.L1.P5'.XH' IR23ST'+CLK')+(CLK+DBPB)(RTR.L2.IR5) |
| DIVZ (S) | =C2.L1.P3.DIV.DBZ |
| DIVZ (R) | =REI+CLR |
| DOVF | =AD23'.A23'.ADZ'+ADZ'+AD23'.A23'(Y23'+QZ')+ A23.AD23+A23.Y23.ADZ.QZ |
| DSTROBE | =C2.L3(CCA.IR14'+LDC) |
| DS-DSO | =CLK'.TP POWER ON(DSPR+LDPC+EMEME) +(C1.L1.P5'.XH'.IR23ST'+CLK') (EXPB.TP POWER ON) |
| ENWD | =MIS.L2.P3.IR11 |

```
ERROR TRAP ST(S)=C3.L4.TP TRAP'(ERROR TRAP ST)'(MRTO+7 ERR+
                 IEPE+DEPE+DIVZ+INVOP)(P5(CLOCKED))
ERROR TRAP ST(R)=REI+CLR
EVEN PARITY TEST
            (S) =MIS.L2.P3.IR7
EVEN PARITY TEST
            (R) =MIS.L2.P3.IR8+CLR
EXO             =C2(ORA+ERA)+C2.L1.SAMQ+L3.BRR+HWS.IR14'.IR13
                 +C2.L1'(ANA+ORA+ERA)+C2.L3.XAM
                 +RTR.L3.P3.IR6(IR12+IR13)+RTR.L4.P3.IR0
                 +HWL.IR13
IA-ASO          =PC-ASO.INTS.TA-ASO'
IEPE        (S) =C1.L1.P3.EP(EXPB+XH)'
IEPE        (R) =REI+CLR
INDEX           =(IR22+IR21)(IR19'+IR20.LPR'.HLT')
INHIBIT         =TA-ASO+TPINHIBIT OP+IR23+XH
INTIN           =DISABLES INTERRUPTS
INTIN    (S)    =MIS.L2.P2.IR0
INTIN    (R)    =MIS.L2.P3.IR1+CLR
INTS     (S)    =INT.CYCLE.INTBK.L2.P5(BSP+ACTIVE1+SEL+ENI+
Q                LPR)'
INTS     (R)    =C1.L1.P1+CLR
INT.CYCLE       =C14INST+C13INST+C2(C24INST+C23INST)
INVERT          =MUL.C2(Q1.SC27'+Q0.SC27)
                 +CSX+SBX+SBI+HWS.IR13'.IR14'
                 +C2(CSA+SUB+SMNT+SOM+SANE+SANG)
INV             =INVERT
INOP     (S)    =C1.L4.P3
```

```
INOP    (R)        =L4.P4.IR23'(PC-ASO+XEC)+CLR
INVOP   (S)        =C1.L2.P3.IOP.INHIBIT'
INVOP   (R)        =REI+CLR
INX     (S)        =C1.L4.P3.XINST
INX     (R)        =L4.P4.IR23'(PC-ASO+XEC)+CLR
IRO(S)             =LOAD IR(0-14 AND BIT 23)DB O.CLR'
IRO(R)             =LOAD IR(0-14 AND BIT 23)(1A).DB O'+CLR
IR-DSO             =C1.L2(ADI+SBI+BUN+BRR+HLT+RTN+LPR+CCA+SFTA
                    +SFTL)+IR12(1C)(L3+L4)(HWL+HWS)+CPD+SEL)L1'
                    +(L2.P5+L3)(BPX+BNX+BZX+BPA+BAO+BNA+BZA)
                    +L4(1A)(CAX+IBP+IBN)
IR(0-5)-DSO        =IR-DSO(CLK+DBPB)+(BDIS.IRPB+TP-IR-DSO)
                    +C1'(L2+L3)C2(1B).SMP.(CLK+DBPB)
IR(6-14)-DSO       =IR-DSO(CLK+DBPB)+(BDIS.IRPB+TP-IR-DSO)
IR(15-23)-DSO      =(BDIS.IRPB+TP-IR-DSO)
IRL-DSO            =(CLK+DBPB)IR12'(L3+L4)(HWL+HWS)
IS SYNC            =P3(L2.SSNT)'.L4'
GPC-ASO            =PC-ASO(INTS+TA-ASO)'
LATCH AB    (S)    =C1.L4.P3(ADM+AOM+XAM+RPA+SOM)
LATCH AB    (R)    =MMDLL+CLR
LATCH DB           =C2(L1(P3+P4+P5)+L2)(ADM+AOM+SANG+SOM+SANE
                    +PRA)+LDC.C2
LBF                =LPR.LR13
LDA             54 =IR20 .IR19'.IR18 .IR17 .IR16'.IR15'.INHIBIT'
LDC             74 =IR20 .IR19 .IR18 .IR17 .IR16'.IR15'.INHIBIT'
LDF                =LPR.IR12
LOAD A(0-5)        =LOAD A+LOAD AR+LOAD A6+LOAD A8
LOAD A(6-7)        =LOAD A+LOAD AR+LOAD A8
```

```
LOAD A(8-11)     =LOAD A+LOAD AR

LOAD A(12-13)    =LOAD A+LOAD AL

LOAD A           =DIV.C2.L2.P5.SC30'.REJECT'
                  +(ADI+SBI)L4.P4+ADDIN.C2.L4.P4
                  +C1.L3.P3(CCA+SFTA+SFTL.IR14'+CPD TST
                  +C3.L3.P4.DIV+LSGA.L2.P3
                  +CCA.C2.L2.P3.IR12.IR13.IR14+MUL.C2.L3.P4
                  +MUL.C2L2.P5(MODE.QO'+MODE'.Q0)
                  +MUL.C1.L4.P3+DIV.C2.L3.P4.SC30'.SC31'
                  +C2.L1.P3(DIV+LDA+PRA)

LOAD AL           HWL.L4.P3,IR12'

LOAD AR          =L4.P3.IR12.HWL+C2.L2.P3.CCA.IR14.IR13.IR12'

LOAD IR (0-14         (ACTUALLY LOADS BITS 0 THRU 11)
AND BIT 23)(1A)  =C1.L1-P3+TP LOAD 1R

LOAD IR (0-14         (ACTUALLY LOADS BITS 12 THRU 14
AND BIT 23)(1B)  =C1.L1.P3(EXT OP PROTECT)'+TP LOAD IR

LOAD IR (15-20)  =C1.L1.P3.INOP'+TP LOAD IR

LOAD IR (21-22)  =C1.L1.P3.INX'+TP LOAD IR

LOAD LPC         =C1.L2.P2.(CLR+C1.L3.IR23')(ZELO1').
                  INHIBIT LOAD LPC+LOAD LPC DDT

LOAD PC          =BCHI.P1.TCP(L3.IR18.ZELO1'+L4(IBP+IBN)
                  +C2.L1.P4.BSP+CLK'.LDPCL.TP POWER ON
                  +L2.P3(BRR+BUN+HLT+RTN)+TP LOAD PC

LOAD S           =RTR.L2.P3+(RPA+XAM+SAMQ)C2.L1.P3
                  +SMP.C2.L3.P3+ADX IN1.C1.L2.P5
                  +(AOM+ADM+SOM)C2.P4
                  +DIV.C2.L2.REJECT'.SC30
                  +C2.L3.P4.SREJECT.SC31
```

| | |
|---|---|
| LOAD SC | L2.PE(CCA+SFTA+SFTL) |
| LOAD Q | =RTR.L3.P3.IR7(IR12+IR13)+RTR.L4.P3.IR1 +(SFTA.IR13+SFTL.IR13')C1.L3.Pe+LDQ.C2.L1.P3 +DIV.C2.L1.P3+DIV.C3.L1.P3 +DIV.C2.L3.P4.SC30'.SC31'+MUL.C2.L3.P2 |
| LOAD XL | =RTR.L3.P2.IR8.IR12.IR13+RTR.L4.P3.IR2 +X1(L4.P3(ADX+SBX+CAX+CSX)+L3.P4(IBP+IBN) +C2.L4.P3.SMP) |
| LOAD X2 | =RTR.L3.P2.IR9.IR12.IR13+RTR.L4.P3.IR3 +X2(L4.P3(ADX+SBX+CAX+CSX)+L3.P4(IBP_IBN) +C2.L4.P3,SMP) |
| LOAD X3 | =RTR.L3.P2.IR10,IR12.IR13+RTR.L4.P3.IR4 +X3(L4.P3(ADX+SBX+CAX+CSX)+L3.P4(IBP+IBN) +C2.L4.P3.SMP) |
| LOAD Y | =C1.L1.P3+SAMQ.C2.L2.P3+ADDIN2.C2.L1.P3 +(ANA+ORA+ERA)C2.L1.P3 +(ADI+SBI+HWL+HWS)C1.L2.P3 +(ADM+AOM+SAMQ+SOM+SANG+SANE)C1.L4.P3 |
| LPC-DSO | =(CLK+DBPB)(L3+L4)C1.BSP |
| MADD (S) | =C2.L2.P3.MUL |
| MADD (R) | =L3.P5.MUL+CLR |
| MDR-DSO | =(CLK+DBPB)(C1.L1.P5'(EXPB+XH)'+C2.L1.P5' (C2.MDR=DSO INHIBIT)'(+TPMDR=DSO+BDIS.MDPB |
| MMDLL (S) | =DLP7.CLR'.MMWRITE |
| MMDLL (R) | =DLP7'(CLR+MMWRITE') |
| MMREAD (S) | =(C3.L4+C1(L3+L4)C13INST+C1(L3+L4)MRI.PRA'+ C2(L3+L4)C23 INST+C1.L4.C14 INST+ C2.L4.C24 INST)(PC-ASO.BCHI'+P3.BCHI+S-ASO) |

(EXCTP')CLK

MMREAD (R) =DAP7.CLK'+DAP7.L1.P2.CLK+CLR

MMWRITE =MMDLL'(C2.L3(ADM+AOM+XAM+RPA+SOM)+
C1.L3(STX+STA+STQ)+C1(L3+L4)BSP+

MODE (J) =MUL.C2.L3.Q1.Q0.

(K) =MUL.C2.L3(Q1'+Q0')

(C) =P3

(S)' =MODE'

(R)' =MUL.C1.L4.P3

MRI =STX+IR20+IR23

OVF (S) =SBI.L4.P3(A23.Y23'.AD23'+A23'.Y23.AD23)
+ADI.L4.P3(A23'.Y23'.AD23+A23.Y23.AD23').
+SUB.C2.L4.P3(A23.Y23'.AD23'+A23'.Y23.AD23)

OVF (S) =ADD.C2.L4.P3(A23'.Y23'.AD23+A23.Y23.AD23')
+DIV(C2.L1.P2(A23.A22'+A23'.A22)+C1.L3.P3.
IR14'.IR12'.SFTA+C2.L2.P5.DIV.SCO.DOVF
+BRR.L3.P3.AD20

OVF (R) =BAO.L4.P3+CLR

PCINH (S) =L4.P4(IR23+XH+XEC+IA-ASO+TA-ASO

PCINH (R) =L4.P2.PC-ASO

PC-ASO =(DMEME+ENMEME+PCPB)TP POWER ON.CLK'
+((CLK+ABPB+TP AB)(C3.L4+C13INST.C1(L3+L4)
+C23INST.C2(L3+L4)+C14INST.C14INST.C1.L4
+C24INST.C2.L4)+(CLK')(TP ENTER MEM
+TP DIS MEM)

PBRM (S) =MMREAD.DRP7 25.C2.L1.P2

PBRM (R) =MMREAD.DRP7 25'.C2.L1.P2

PC-DSO =RTR.L2.IR11+TP PC-DSO

```
P7 ERR               =PORT 7 ERROR CCP'S PORT IN MEMORY CONTROL
P7 ERR           (S) =PEP7
P7 ERR           (R) =MIS.IR4+CLR
QO(S)                =DIV.C2.L2.P5.REJECT'.SC30'
Q-DSK                =LDQ+C3.L1.DIV+RTR
                     =(CLK+DBPB)(RTR.L2.IR7+RTR.L3.IR1.IR13
                      +DIV.C2.L4+STQ.L3+SAMQ.C2.L2)
                      +BDIS.TP POWER ON'QPB+TP Q-DSO
Q(0-22)-DSO          =Q-DSO+Q22-DSO
Q22-DSO              =DIV.C1.L4(CLK+DBPB)
Q(23)-DSO            =Q-DSO
Q0IN                 =SFTL.A23.IR12'.IR13'.IR14'
Q23IN                =A0.(IR14.SFTL)'
QZ                    INDICATES THAT RQ(0-22) IS ZERO
QZ    ( )            =C1.L4.P4.DIV.DBZ
QZ    (R)            =C1.L4.P2.DIV+CLR
REI                  =MIS.L2.IR4
RS1B-DSO             =RSSEL'.CRS1'.PRA-C2.L1
RS1A-DSO             =RSSEL'.CRS1.PRA.C2.L1
RS2A-DSO             =RSSEL.CRS2.PRA.C2.L1
RS2B-DSO             =RSSEL.CRS2'.PRA.C2.L1
RSSEL    (S)         =L3.P3.AB12(PAR+PRA)
RSSEL    (R)         =L4.P4.PC-ASO+CLR
RST ERR WD           =MIS.L2.IR14             (WATCHDOG TIMER)
RSREAD               =PRA.C1.L4(S12+S12')     (S12=RS2;S12'=RS1)
RSWRITE              =PAR.L3-P1'(S12+S12')    (S12=RS2;S12'=RS1)
RST MEM REQ          =C1.L2.CCP ON LINE
RST WD                (WDCNT1+WDCNT2+WDCNT3)RST ERR WD+RWD
```

```
RWD                     =MIS.L2.P3.IR12
SCAN    (S)             =L1.P1
SCAN    (R)             =L4.P4.INTS'.ZEL01'
SC(R)                   =CLR+L4.P3.PC-ASO
SC-DSO                  =(CLK+DBPB)C2.L1.SMP+BDIS.SCPB
SG-DSO                  =BDIS.SGPB+(CLK+DBPB)(LSGA+SSNT)L2
SMP                     =SFTA.IR14
SREJECT     (S)         =DIV.C2(SC30.DBZ+SC30.ADX'.Q23'-A23.Y23.SC=0
                         +A23'.Y23'.SC=0+Y23'.AD23(SC0+SC30)'
                         +Y23.AD23'(SC0+SC30)'L3.P2
SREJECT     (R)         =DIV.C2.L2.P2+CLR
SSTROBE1                =SEL.L2(P4+P5)
SSTROBE2                =SEL.L3(P4+P5)
START                    TP POWER ON(RUN+INC+STEP+EXPB)+TP INC+
                         TP STEP+TP RUN
STL                     =CCA.C1.L3+C1.L3(SFTA+SFTL).IR12'
                         +DIV.C2.L1+DIV.C2.L3(P3+P4+P5)SC31'
STP CLK                 =P3(INC+TP INC)+P3.PC-ASO.L4.((TP POWER ON)
                         (STEP+ADDRESS MATCH+EXPB)+HLT+TP STEP)
STR                     =MUL.C2.L3(P3+P4+P5)+C1.L3.IR12(SFTA+SFTL)
SW TO STDBY RT
                (S)     =MIS.L2.P3.IR9
SW TO STDBY RT
                (R)     =MIS.L2.P3.IR10+CLR
S-ASO                   =(CLK+ABPB+TP AB)(MMDLL')(C1(L3+L4)MRI+
                         C1(L3+L4)BSP+C1.L3(PAR+STA+STX+STQ)+
                         C1.(L3+L4)(PAR+STC))
S-DSK                   =(C2.L3)+(C2.L1(RPA+XAM))+(RTR.L2)
```

```
S(0-14)-DSO      =(CLK+DBPB)(XH.C1.L1.P5')+IBP+IBN)L3.P1'
                  +C2.L3(ADM+AOM+SOM+SAMQ)+L4(CSX+RTR)
                  +C2.BSP+DIV.C3.L1+C2.L4(XAM+SMP)
                  +L4(ADX+SBX))
S(15-23)-DSO     =S(0-14)-DSO + RPA.C2.L3
TA-ASO           =C3.ZEL01
TID              =LPR.IR14
TOVF    (S)      =MUL(INV.A23.Y23.C24'+INV.A23.Y23.C24
                  +INV'.A23'.Y23.C24'+INV'.A23.Y23'C24'
                  +INV.A23.Y23'.C24+INV.A23'.Y23'.C24').
                  C2.L2.P5.MUL
TOVF    (R)      =MUL.L3.P5+CLR
TP CPD           =IR-DSO.CPD
TP DSTROBE       =(CCA.IR14'+LDC)(C2.L1(P3+P4+P5).CCP ON LINE)
TP TRAP DISF(S)  =DB0(CPD TRAP(CLOCKED))
TP TRAP DISF(R)  =DB1(CPD TRAP(CLOCKED))+CLR
TST CPD (S)      =MIS.L2.IR2
TST CPD (R)      =MIS.L2.IR3+CLR
WAIT(R)          =MIS.L2.IR13
WMPB    (S)      =MIS.L2.IR5
WMPB    (R)      =MIS.L2.IR6+CLR
XH      (J)      =C1.L4.INDEX.(IR20+IR23)'
        (K)      =C1.L4
        (C)      =P4.TCP
        (S)'     =XH'
        (R)'     =CLR+L4.P4.PC-ASO
XINST            =IR20'.IR19
                  +C2.L1.P3.SMNN.DB23'+C2.L3.P4.ADZ'.SAMQ
```

```
X1        =IR21.IR22'
X1-DSO    =RTR(L2.IR8+L3.IR2.IR13)
           +X1(STX.L3+L2.P5'(BPX+BNX+BZX)
           +C1(L1.P5+L2+L3.P1)(INDEX+ADX+SBX+IBP+IBN))
X2        =IR21'.IR22
X2-DSO     RTR(L2.IR9+L3.IR3.IR13)
           +X2(STX.L3+L2.P5'(BPX+BNX+BZX)
           +C1(L1.P5+L2+L3.P1)(INDEX+ADX+SBX+IBP+IBN))
X3        =IR21.IR22
X3-DSO    =RTR(L2.IR10.L3.IR4.IR13)
           +X3(STX.L3+L2.P5'(BPX+BNX+BZX)
           +C1(L1.P5+L2+L3.P1)(INDEX+ADX+SBX+IBP+IBN))
```

ADM (Add to Memory) Operation

To illustrate latching of the buses, the operation for an ADM instruction will be described. The timing chart is FIG. 16. An octal representation is used in the following description for all data and addresses in the registers and on the buses.

Assume initially that toward the end of the preceding instruction PC-ASO and therefore GPC-ASO become true along with MM read. The program counter PC (FIG. 14) contains some address, for example (13257), which is gated onto the address bus AB (FIG. 9).

During the last cycle, which may be any one of C1, C2 or C3 depending on the instruction, the signal GO from gate 422 becomes false. Therefore at P4, L4, input K of flip-flop SYNC becomes true. The next clock pulse advances the pulse counter to P5 and also resets SYNC. This blocks further pulses from lead TCP and thus prevents the timing generator from advancing further.

In the meantime the memory control circuit causes the data word to be read from the main memory and placed in a data register having outputs on the cable leads DRP7-ϕ to 23. A signal DAP7 becomes true indicating data available at port 7.

The signal GOC1 becomes true in response to the condition (DAP7.PC-ASO.ZELO1'). The element ZELO1 relates to a trap condition and is normally false. GOC1 via gate 422 along with CLK makes the J input of SYNC true so that the next clock pulse sets it. When SYNC-B from the duplicate processor is also true, gate 414 is enabled to supply pulses to lead TCP The next clock pulse then sets the timing to C1.L1.P1. The signal PC-ASO becomes false as the timing is set to L1.

To use the memory data register as a data source, the signal MDR-DSO becomes true in response to the signal condition [C1.L1.P5'(EXPB+XH)'CLK]. The data from leads DRP7-ϕ to 23 is then gated onto the data bus (FIG. 6) during pulses P1–P4 of cycle C1 level L1.

During the second pulse MM READ is reset in response to DAP7.L1.P2.CLK.

During the third pulse the condition (C1.L1.P3) is used to LOAD IR, LOAD Y and COUNT PC. In the equation for COUNT PC, EXPB and PCINH will usually be false. (The signal PCINH may be true in certain instances in which the program counter has already been advanced with indirect addressing indexing, an interrupt or a trap and should not be advanced again.)

The situation now is that the program counter has advanced to (1326ϕ), and the contents of the word at address (13257) have been placed via the data bus into registers IR and Y. Assume this word to be (14621372). The (1)corresponding to bits 23, 22, 21 indicates indexing with register X1, and (46) is the OP code for ADM and (21372) is the operand address.

INDEX is true in response to (IR21.IR19'). During the fifth pulse MDR-DSO becomes false, and index register X1 becomes the data bus, source by X1-DSO=(X1.C1.L1.P5.INDEX), where X1=(IR22-'.IR21). The signal ADS is normally true during cycle C1 unless RTR is true.

As shown in FIG. 11, the input for register S is normally from the adder of FIG. 12, via AND logic 1160 enabled by signal ADS which is normally true except when S-DSK is true. The signal LOAD S is true with (ADX IN1.C1.L2.P5) where ADX INI is true with INDEX true. LOAD S causes register S to be loaded with the output of the adder, which is the sum of the operand address instruction which has been loaded into register Y and the contents of register X1 which appears on the data bus. Assuming for example a value (ϕϕϕ12) from the index register. the address in register S is now (21404).

On the first pulse of the thid leve., MMREAD latch is set on (C1.L3.MRI.PRA'); where MRI is true with bit IR20 true, this bit being true for the ADM code OP46. The signal S-ASO is also true with (CLK.MMDLL'.C1.L3.MRI). The main memory is now accessed via memory control CMC to read the data from the word at address (21404). In the meantime the processor continues other operations.

During level L4 the signal A-DSO becomes true with C1.L4.ADM. During pulse P3 the signal LOAD Y is true with (ADM.C1.L4.P3), and LATCH AB is also set on the same condition. Therefore data from register A via the data bus is placed in register Y, and the address from register S is latched on the address bus. Assume data from A INTO Y is (ϕϕϕϕϕ132).

It is now necessary to wait for the data to be available from the main memory, indicated by the signal DAP7. ADM is a C24 instruction so GOC2 becomes true on the condition C1.L4.C24INST.DAP7. This initiates the cycle C2.

The signal MDR-DSO becomes true on C2.L1.P5'(C2,MDR-DSO Inhibit)'CLK, which gates the data from the memory onto the data bus. Assume data is (23512562).

The latch MMREAD is reset on (DAP7.L1.C2.CLK).

The signal LATCH DB becomes true on (ADM.C2[L1(P3+P4+P5)+L2]) so that the data from memory is latched on the data bus during the last three pulses of level L1 and all of level L2.

During pulse P4 of level L2, LOAD S becomes true on ADM.C2.L2.P4, therefore the sum from the adder is placed in register S. This sum is (ϕϕϕϕϕ132)+(23512562)=(23512724).

During level L3 the signal S-DSO is true on (C2.L3.ADM); and MMWRITE is true on (C2.L3.ADM.MMDLL'.LATCH AB). This signal along with LATCH AB remains true during all of level L3. Therefore a command is given to memory control to write the data from register S at the address of the data word which is latched on the address bus.

The timing stops at C2.L3.P5 while awaiting a signal from the memory control that the data is loaded in memory. This is accomplished by the signal WAIT STATE on the condition (C2.MMDLL'.ADM).

The latch MMDLL is set in response to the signal DLP7 from memory control indicating data loaded at port 7. LATCH AB is reset in response to MMDLL. With MMDLL true, WAIT STATE becomes false and makes GO from gate 422 true. Flip-flop SYNC sets on the next clock pulse, and along with SYNC-B enables gate 414 to provide clock pulses on lead TCP and advance the timing to level L4. MMWRITE becomes false and the latch MMDLL is reset (DLP7 becomes false to remove the set signal). The signal S-DSO becomes false when the level goes to L4.

The last level of the cycle is used to initiate reading the next instruction, whose address is in the program counter, now at 13260. MMREAD sets and PC-ASO becomes true on (C2.L4.C24INST), and GPC-ASO then becomes true. The timing stops at C2.L4.P5 while waiting for the data available signal DAP7.

Other Instructions With Bus Latching

As seen in the equations for LATCH AB(S) and LATCH DB, the instructions AOM for add one to memory and SOM for subtract one from memory, use latching of both the address bus and the data bus; the instructions XAM for exchange contents of register A and memory, and RPA for replace address, use address bus latching; and the instructions SANG for skip an instruction if contents of register A is not greater than memory contents at the effective address, SANE for skip if contents of register A not equal to memory contents, and PRA for place contents of register-sender memory into register A, use data bus latching.

The operation for instructions AOM and SOM is very similar to ADM. Both omit A-DSO during C1.L4 so that the data bus has all zeros when register Y is loaded during C1.L4.P3. For AOM the carry into bit ϕ signal Cϕ is true on (C2.AOM), while for SOM a negative one is effectively added by INVERT = C2.SOM.

The instructions XAM and RPA use latching of the address bus to keep the address available while using the S register for other purposes.

The instructions SANG and SANE use latching of the data bus to retain information read from memory to do arithmetic operations (subtract contents of register A from the data read from memory) during cycle C2, levels L1 and L2.

PAGE REGISTER

Figure 17:
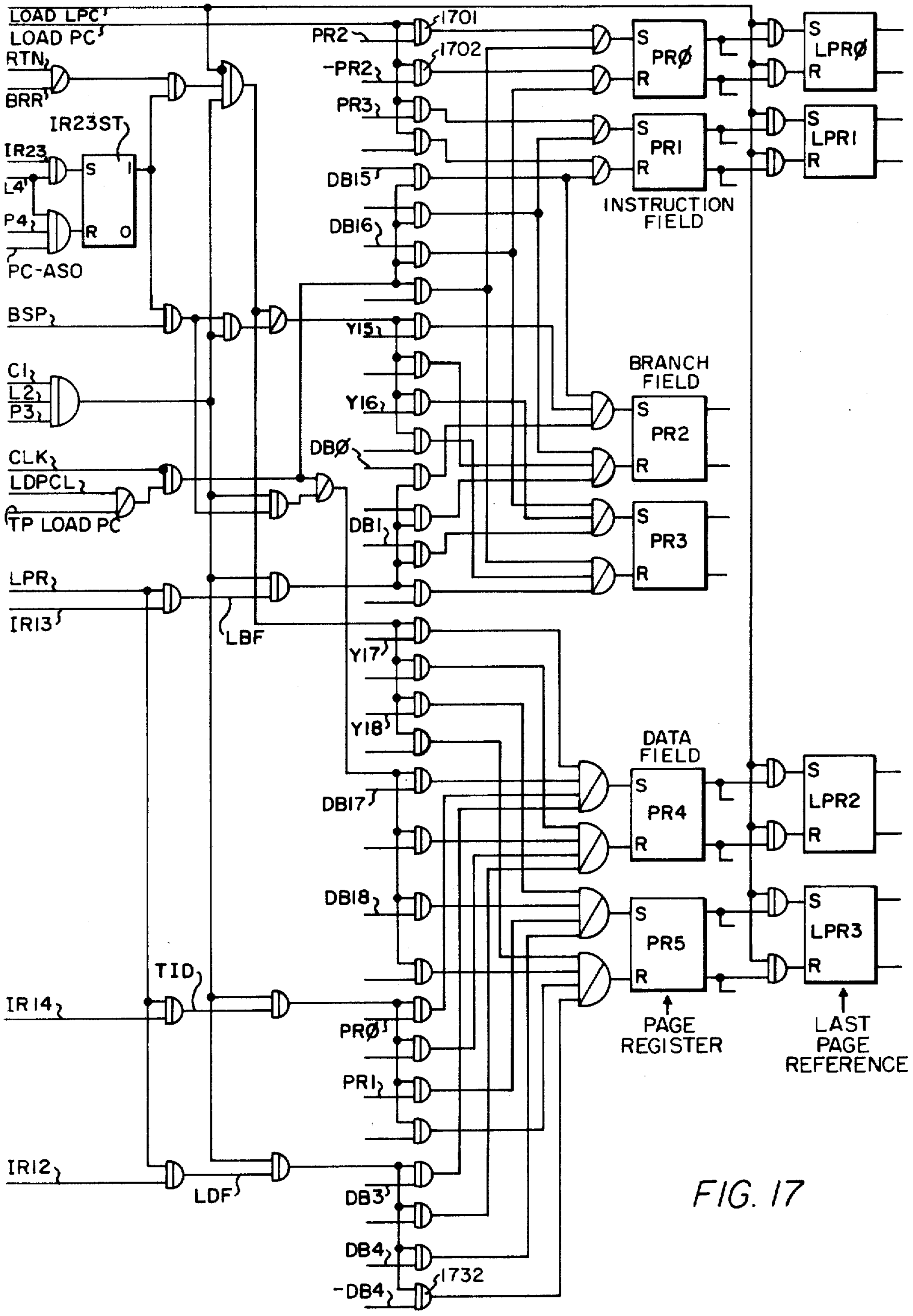
FIG. 17 is a functional block diagram of the page and last page reference registers with associated input logic.

The page register and last page reference register with associated logic are shown in FIG. 17, and logic controlling output of the page register to the address bus is shown in FIG. 9.

Under the description of the Computer Central Processor Section 1 which follows this section, Address Modification is described starting at paragraph 1.3, and paging is described starting at paragraph 1.3.3. That descriptiion covers how paging is used with various instructions, and includes an extensive example.

A six bit register PR is implemented to handle three two-bit fields that are used in memory expansion in the No. 1 FAX system. The three fields are the DATA FIELD, THE BRANCH FIELD, and the INSTRUCTION FIELD. The two-bits in each field have the binary capability of addressing four "PAGES" (00, 01, 10, 11). The LPR register is a four-bit register, and is implemented to handle two fields of two bits each. This register is loaded directly from the PR register. Bits 0 and 1 (the least two significant bits) of the PR register are loaded into bits 0 and 1 of the LPR register and bits 4 and 5 of the PR register are loaded into bits 2 and 3 of the LPR register. The output of this circuit primarily is two bits that are used to form up bits 15 and 16 of the address bits. These two bits are from one of the three fields of the PR bit register.

The data field and the branch field of the Page Register PR are loaded from three sources. These three sources are the DATA BUS (DM), the "Y" register and the page register itself. The "Y" register is used during the processing of instructions BRR, RTN and BSP if they were addressed indirect and during C1·L2·P3. The DATA Bus is used during a BSP instruction that has been addressed indirect during C2·L1·P3 or the central processor's clock is not true and the panel pushbutton LOAD PC producing signal LDPCL or the Third Party directive TP LOAD PC is processed. The page register is used as follows. The DATA FIELD (bits 4 and 5) are loaded from the page register instruction field (bits 0 and 1) during the processing of the instruction TID (TRANSFER INSTRUCTION FIELD TO DATA FIELD). The INSTRUCTION FIELD (bits 0 and 1) are loaded from the BRANCH FIELD (bits 2 and 3) during the processing of any action where the program counter is loaded.

The four bit register (last page reference LPR) is used to store the DATA, and INSTRUCTION FIELDS of the page register. This is done during every instruction, and the contents of the register are stored into memory during a BSP instruction to be used for reloading of the Page Register during a RTN or BRR instruction.

The selections of one of the three fields of the Page Register is made whenever an address is to be placed on the address bus. The two bits of the particular field chosen are used as extension bits of the 15 bit address field. They become bits 15 and 16 of the address bus to allow for total core memory of 131K locations.

Note that the decoding logic for BSPS, BUNS, RTNS, BRRS, and HLTS does not use the signal INHIBIT', but is otherwise equivalent to the decoding of the respective instructions BSP, BUN, RTN, BRR, and HLT. Therefore BSPS etc. are true when the indirect address bit IR23 is true, while BSP etc. are inhibited. The decoding equations for BSPS etc. are as follows:

BSPS (62) = IR20 · IR19 · IR18' · IR17' · IR16 · IR15'

BUNS (11) = IR20' · IR19' · IR18 · IR17' · IR16' · IR15'

RTNS (10) = IR20' · IR19' · IR18 · IR17' · IR16' · IR15'

BRRS (16) = IR20' · IR19' · LI18 · IR17 · IR16 · IR15'

HLTS (67) = IR20 · IR19 · IR18' · IR17 · IR16 · IR15

Figure 16:
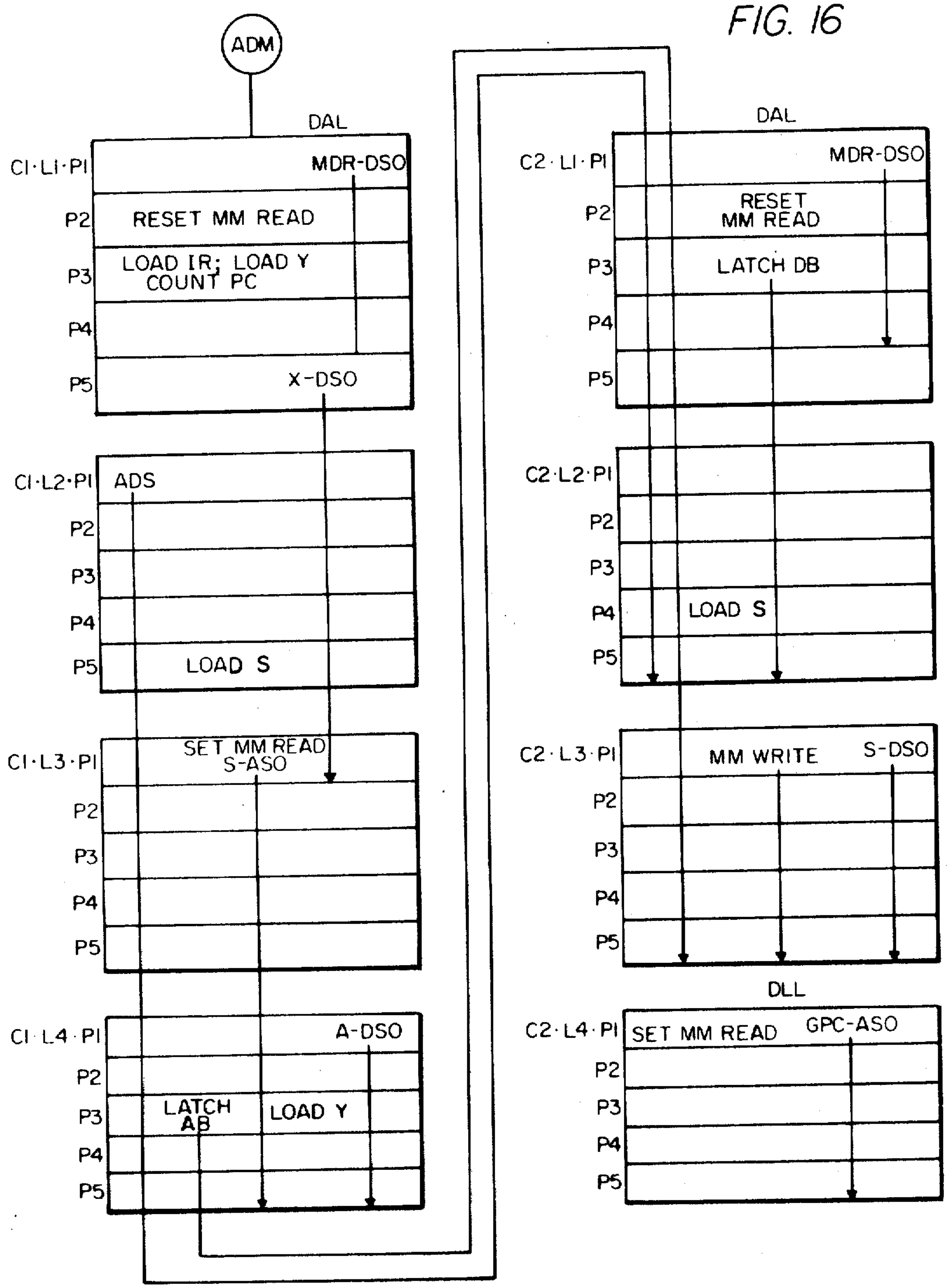
FIG. 16 is a timing diagram for the instruction ADM (add to memory)

Note in FIG. 16 that the series of AND gates 1701–1732 has the inputs labeled for gates supplying the "set" inputs to the page register latches, but only gates 1702 and 1732 for the "reset" inputs are labeled. In each case the "reset" input is the inverse of the signal to the "set" input gate above it on the drawing, in the same manner as gates 1701 and 1702 have respective inputs PR2 and −PR2.

COMPUTER USER'S MANUAL

SECTION 1.0 Computer Central Processor 1.1 Introduction to Computer Organization An understanding of the Computer Central Processor will aid the user to manipulate, maintain and to analyze the system. 1.1.1 WORD FORMATS The memory data word is represented in octal format as follows:

| 23 21 | 20 18 | 17 15 | 14 12 | 11 9 | 8 6 | 5 3 | 2 0 | BIT NO. |
|---|---|---|---|---|---|---|---|---|
| 4 2 1 | 4 2 1 | 4 2 1 | 4 2 1 | 4 2 1 | 4 2 1 | 4 2 1 | 4 2 1 | BINARY WT. FOR OCTAL REPRESENT. |

e.g., a number represented as octal 24176653 has a corresponding binary representation of:

010100001111110110101011

The instruction word format for the central processor is:

| 23 | 21 20 | 15 14 | 0 |
|---|---|---|---|
| TAG | OPERATION CODE | OPERAND OR ADDRESS FIELD | |

Bits φ – 14 contain the address for memory reference instruction or micro-instructions for non-memory reference operations.

Bits 15 – 20 contain the code representing the operation to be performed.

Bits 21 & 22 are coded to represent any of three index registers to be used in address modification.

| 21 | Specify | Bits 22 |
|---|---|---|
| 0 | No Index | 0 |
| 1 | Index 1 | 0 |
| 0 | Index 2 | 1 |
| 1 | Index 3 | 1 |

Bit 23 is the indirect address bit.

(Bits 15 – 23 are referred to as the instruction field.

The single precixion fixed point data word format (24 bits) is represented as an 8 octal digit number with the highest order bit denoting a positive or negative quantity:

| 23 | 22 ... 0 |
|---|---|
| ± | |

The word format for a double precision data word (48 bits) is represented by two separate single precision words with the highest order bit in the word of most significance denoting a positive or negative quantity.

| | 23 | 22 ... 0 |
|---|---|---|
| 1st Word | ± | |

| | 23 ... 0 |
|---|---|
| 2nd Word | |

Fixed point numbers are stored in memory in two's (radix) complement form. Thus, magnitudes of negative numbers are not directly available but must be recomplemented. The Clear A and Subtract instruction has been provided to facilitate this operation. 1.1.2 MAIN MEMORY (CMM).

The Main memory is a high speed random access store capable of a complete read or write cycle time 1 microsecond and a read-modify-write cycle time of 1.6 microseconds. (Slower memories may be substituted with the only penalty being a derating in processing speeds and Drum Transfer rates). Main Memory is expandable in 4096, 8192, 16384 or 32768 word modules to a maximum of 131,072 words or 4 modules, whichever occurs first.

Each memory module contains its own address register, data register, and read-write control circuitry. A set of margin switches is provided with each memory module that can be manually changed to improve fault localization resolution and run preventive amintenance routines. An amber lamp is provided on the memory module front panel to indicate that any one or more of these switches is off-normal.

Each word in Main Memory contains 26 bits: 24 bits are used for storing data, 1 bit is used for storing the parity of the complete word, and 1 bit is used for storing the "protect" status of the word.

A 17 bit address bus allows any word in main memory to be directly addressable. Each word can be read out of or "written" into, or both. However a memory protect system is utilized to protect specified locations in core from being altered. A hard wired section of memory of 512 or 1024 words, within the first 1024 locations, cannot be written unless the memory protect system is inactivated. The memory protect system can only be inactivated by depressing the memory protect inhibit switch, on the Maintenance control center panel. With the memory protect system active, other locations in memory are protected by the setting of a read only memory storage element in the CMC and that particular word having bit 25 set. This read only memory storage element is programmed controlled by a CPD instruction.

A parity check feature is provided for all memory transfer operations (both reading and writing). The parity generation and checking is provided in the CMC and extends over the complete memory word, including the memory protect bit, for additional security.

1.1.3 ADDRESSING ALTERNATES

For most instructions, which reference memory from the operand, the following addressing modes are available.

PAGING

The core memory of the Central Processor is organized into pages. The maximum number of pages is four(4), with the maximum number of location or addresses assigned to a page being 32,768. This totals a maximum of 131,072 words of memory.

Addressing a page is via the hardware page register. Bits 15 and 16 (the 16th and 17th bits of the address bus) are taken from the instruction field or the data field of the Page Register whenever a memory reference occurs. The Page Register can be altered via programmed instructions (refer to section 1.3.3 Paging).

DIRECT ADDRESSING

The operand or address field of an instruction specifies an address within a page on a memory reference instruction. A maximum of 32,768 words of core within any 1 of 4 pages is directly addressable.

INDEXING

The contents of any one of the three 15 bit index registers is added to the contents of the instruction address field to form a new operand address. Indexing does not carry over into a new page, rather a wrap around effect will occur. Indexing does not affect the page register.

INDIRECT ADDRESSING

The address field of an instruction, after modification by indexing if required, specifies a memory location which will contain a new address for the operand. The indirect addressing is multilevel with indexing allowed at each level.

The indexing operations always precede indirect referencing operations. Indirect references proceed until the indirect address bit is false. Instructions which are used to specify index operations are themselves not indexable.

1.1.4 ARITHMETIC

Parallel, binary, fixed point arithmetic is provided in the No. 1 EAX computer. Single precision numbers are stored in memory as 23 bit integers (i.e., binary point at extreme right) with the highest order (leftmost) 24th Bit considered as a sign.

Negative numbers are held in memory in two's complement form and are operated on in the arithmetic unit in a two's complement number system.

Provisions for double length products and dividend are made by using two registers in the multiply and divide operations. The two registers may be shifted logically or arithmetically and may be logically rotated (circular shift).

1.1.5 INPUT/OUTPUT

The EAX processor input/output system is made up of two distinct sections; the Computer Channel Multiplex and Channel Buffers.

The Channel Multiplex (CCX) provides a unique communication path between the central Processor and the Channel Buffer. The CCX can accommodate a maximum of 16 Channel Buffers.

Standard Channel Buffers provided with a EAX Office Switching Unit are: (1) Computer Channel Device Buffer. This buffer provides an interface to the peripheral adapters which provide control features for the operation of the Teletype Model 35ASR, Teletype Model 35KSR, Paper Tape Punch and Paper Tape Reader. (2) Computer Communications Register. This shift register provides the serial communication link between th Central Processor and the Originating or Terminating Markers. (3) Maintenance Device Buffer. This buffer provides a store and forward interface between the Central Processor and the Maintenance and Control Center. (4) Automatic Toll Ticketer. A channel buffer provides the interface between the Central Processor and the Automatic Toll Ticketer.

1.1.6 PRIORITY INTERRUPT

Since the operation of the No. 1 EAX system is dictated by events occurring external to the central Processor, provision is made to alert the CP to these external occurrences; this provision is called the Priority Interrupt system.

The interrupt system is a true multi-level system, eight levels of interrupt are available, and the program of highest active priority is always being processed.

The eight general categories of interrupts and their priorities are listed below.

1. Manual Requests and Power Failures
2. Major Alarm Errors
3. Real Time Clock
4. Communication Register and Drum Control Unit Ready Interrupts
5. Register-Sender Requests for Translation
6. Minor Alarm Errors
7. Input/Output and Originating Marker Interrupts
8. Clock Errors and Register-Sender Minor Errors.

Additional program control is provided by separate instructions which either DISABLE the interrupt system or ENABLE the interrupt system.

1.1.7 TRAPS

Failures that could disrupt the No. 1 EAX system require immediate attention. The priority interrupt system has a time lag of at least 1 cycle time before recognition for service can be processed, also a program disable feature can delay recognition for any length of time. Because of these features, a trap system is used to accommodate failure recognition. There are two trap levels, and both have a higher priority than the interrupt system but only at the time of failure. Once the trap has been recognized, and the BSP instruction at the trap address has been processed, an interrupt can occur. The recognition of the interrupt can be delayed, however, by processing a disable interrupt (DSI) instruction.

Trap level 1 has a higher priority than trap level 2. Trap level 1 is called the third party trap. It is triggered whenever the duplicated central processors, while running in sync, do not agree with each other. Recognition of this trap is immediate. However, the instruction in process is allowed to be completed before a force is made to the trap location. (Refer to section 1.6 for further detail).

Trap level 2 is called the computer error trap. It is triggered when an error, internal to a central processor or its associated computer memory control, occurs. Recognition of this trap is immediate, and the instruction in process is aborted. (Refer to section 1.6 for further detail).

1.1.8 COMPUTER REGISTERS

In addition to the registers shown in FIG. 3A, the computer operates in conjunction with Memory Registers. Each memory module contains its own data, or information register and its own address register. Data registers are 26 bits (one parity and one protect bit). Address registers may be 12 to 14 bits for module sizes of 4096 to 16,384 respectively. These registers are time multiplexed as required between the central processor and a direct access I/O device (optional). The memory registers are not accessible for program control.

1.1.8.8 Register "PR" is a 6 bit register used to specify bits 15 and 16 of the address bus. The 6 bits are assigned to a data field (2 bits); a branch field (2 bits); and an instruction field (2 bits). Program access to this register is via the instruction set.

SECTION 1.2 Central Processor Instruction Set 1.2.1 Introduction

This section contains the description of the Central Processor Circuit instructions. The descriptions are separated into funtional groupings.

All instruction execution times are expressed in terms of memory cycles unless otherwise noted. The timing indicated includes instruction access time and address modification time. Where indirect addressing is specified, one additional memory cycle is required.

Indexing and indirect addressing apply to every instruction unless otherwise noted.

A timing cycle is equal to 2 μsec plus time for memory reference in some instructions. Refer to section 8.12.

The term "effective address," EA, is used to describe the final operand field of the instruction after all indirect references and modification. For memory reference instructions, the effective address denotes the location of the memory cell containing the actual operand. For non-memory reference instructions, the effective address is used literally as the operand.

(EA) = Contents of Main Memory at the Effective Address within a memory page.

(A) = Contents of Register A.

EA = Effective Address — Indicates Direct or Literal Operation Using Modified Address Field.

: = Colon Defined as Notation "if: then."

(nn) = Octal representation of Op code.

1.2.2 Arithmetic Group

ADD (40) Add Memory to A $(A)_{0-23} + (EA) \underset{0-23}{\rightrightarrows} (A)_{0-23}$ The contents of the memory location at the effective address are added to the contents of Register A. The sum replaces the contents of the A register. If an overflow occures, the overflow indication will be set. A carry out of bit position 23 will be recorded by setting the carry indicator.

Register affected: A

Timing 2 cycles

SUB (41) Subtract Memory From A $(A)_{0-23}(EA) \underset{0-23}{\rightrightarrows} (A)_{0-23}$ The contents of the memory location at the effective address are subtracted from the contents of Register A. The difference replaces the contents of the A register. If an overflow occurs, the overflow indicator will be set. A carry out of bit position 23 will be recorded by setting the carry indicator.

Register affected: A

Timing: 2 cycles

MUL (42) Multiply Memory by Register Q $(EA)_{0-23} \times (Q) \underset{0-23}{\rightrightarrows} (AQ)_{0-47}$ Register A is reset, the contents of the memory location at the effective address are multiplied by the contents of register Q. The produce will replace the contents of the double precision registers A-Q; bits 0–47.

Register affected: A and Q

Timing: 7.5 cycles min., 10.5 cycles max.

DIV (43) Divide A–Q by Memory $(AQ)_{0-47} \div (EA) \underset{0-23}{\rightrightarrows} (A)$ Quotient (Q) Remainder The contents of the double precision registers A and Q are divided by the contents of memory at the effective address. The quotient will replace the contents of Register A. The remainder will replace the contents of register Q and will be signed as dividend. If a division overflow occurs, the overflow indicator will be set. Division by zero will result in a computer error TRAP (LEVEL 2).

Registers affected: A and Q

Timing: 15 cycles

ADI (φ1) Add Immediate $(A)_{0-23} + EA \underset{0-14}{\rightrightarrows} (A)_{0-23}$ The effective address is added directly to the contents of register A. If indirect addressing is specified, only bits φ thru 14 at the indirect address are added to register A. A carry out of bit position 14 will propagate. If an overflow occurs, the overflow indicator will be set. A carry out of bit position 23 will be recorded by setting the carry indicator.

Register affected: A

Timing: 1 cycle; 2 cycles if Indexed

SBI (φ2) Subtract Immediate $(A)_{0-23} - EA \underset{0-14}{\rightrightarrows} (A)_{0-23}$ The effective address is subtracted directly from the contents of register A. If indirect addressing is specified, bits φ thru 14 at the indirect address take part in the subtraction process. Borrows from bit positions of higher order than 14 will propagate. If an overflow occurs, the overflow indicator will be set. A carry out of bit position 23 will be recorded by setting the carry indicator.

Register affected: A

Timing: 1 cycle; 2 cycles if Indexed

AOM (44) Add One to Memory $(EA)_{0-23} + 1 \rightarrow (EA)_{0-23}$

The contents of the memory at the effective address are incremented and stored back in memory at the same address. Overflow and carry indicators are not affected.

Register affected: None

Timing: 2 cycles

SOM (45) Subtract One from Memory $(EA_{0-23} - 1 \rightarrow (EA)_{0-23}$

The contents of the memory at the effective address are decremented, and stored back in memory at the same address. Overflow and carry indicators are not affected.

Register affected: None

Timing: 2 cycles

ADM (46) Add A Register to Memory $(A)_{0-23} + (EA) \underset{0-23}{\rightrightarrows} (EA)_{0-23}$ The contents of the A register are added to the contents of the memory at the effective address. The result is stored back in memory at the same address. Overflow and carry indicators are not affected.

Registers Affected: None

Timing: 2 cycles 1.2.3 Indexing Operations (Multilevel Indirect Addressing is allowed but the loading of the index bits of the tag field is suppressed)

ADX (2φ) Add to Index $(XR)_{0-14} + EA \underset{0-14}{\rightrightarrows} (XR)_{0-14}$ (Not Indexable). Add the effective address directly to the specified index register. If no index register is specified, ADX will be treated as a no-op. Overflow not affected.
Register affected: $XR_n$
Timing: 1 cycle SBX (21) Subtract from Index $(XR)_{0-14} - EA \xrightarrow[0-14]{} (XR)_{0-14}$ (Not Indexable). Subtract the effective address directly from the index register specified in the tag field of the instruction. If no index register is specified, SBX will be treated as a no-op. Overflow is not affected.
Registers affected: $XR_n$
Timing: 1 cycle CAX (22)Clear and Add Index $EA \xrightarrow[0-14]{} (XR)_{0-14}$ (Not Indexable). Load the effective address bits 0 thru 14, directly into the specified index register. If no index register is specified, the CAX will be treated as a no-op.
Register affected: $XR_n$
Timing: 1 cycle CSX (23) Clear and Subtract Index $2^{15} - EA \xrightarrow[0-14]{} (XR)_{0-14}$ (Not Indexable). The effective address is loaded in two's complement form into the specified index register. If indirect addressing is specified, the effective address portion of the memory word at the indirect address is loaded in two's complement form to the specified index register. If no index register is specified, the CSX will be treated as a no-op.
Register affected: $XR_n$
Timing: 1 cycle STX (26) Store Index $(XR) \xrightarrow[0-14]{} (EA)_{0-14}$ $0 \rightarrow (EA)_{15-23}$ (Not Indexable). Store the contents of the specified index register in the memroy location at the effective address.
Register affected: None
Timing:1 cycle IBP (24)Increment Branch Positive $(XR)_{0-14} + 1 \rightarrow (XR)_{0-14}$ $(XR)_{14} = 0{:}EA \xrightarrow[0-14]{} (PC)_{0-14}$ (Not Indexable). The contents of the specified index register are incremented. If bit 14 of that index register is zero, a branch to the effective address will be executed.
Register affected: $XR_n$:PC if Branch Occurs
Timing: 1 cycle IBN (25) Increment Branch Negative $(XR)_{0-14} + 1 \rightarrow (XR)_{0-14}$ $(XR)_{14} = 1{:}EA \xrightarrow[0-14]{} (PC)_{0-14}$ (Not Indexable). The contents of the specified index register are incremented. If bit 14 of that index register is not zero, a branch to the effective address will be executed.
Register affected: $XR_n$; PC if Branch Occurs
Timing: 1 cycle BPX (3φ) Branch Positive Index $(XR)_{14} = 0{:}EA \xrightarrow[0-14]{} (PC)_{0-14}$ (Not Indexable). A branch to the effective address will be executed if bit 14 of the specified index register is zero.
Register affected: PC if Branch Occurs
Timing: 1 cycle BNX (31) Branch Negative Index $(XR)_{14}=1{:}EA \xrightarrow[0-14]{} (PC)_{0-14}$ (Not Indexable). A branch to the effective address will be executed if bit 14 of the specified index register is not zero. If no index register is specified, or if the test fails, the BNX will be treated as a no-op.
Register affected: PC if Branch Occurs
Timing: 1 cycle BZX (32) Branch Zero Index $(XR)_{0-14}=0{:}EA_{0-14} \rightarrow (PC)_{0-14}$ (Not Indexable). A branch to the effective address will be executed if the contents of the specified index register are equal to zero.
Register affected: PC if Branch Occurs
Timing: 1 cycle 1.2.4 Load and Store Group CSA (56) Clear and Subtract from A $2^{24}-(EA)_{0-23} \rightarrow (A)_{0-23}$ The contents of the memory at the effective address are loaded in two's complement form into the A register. Overflow and carry indicator are not reset.
Register affected: A
Timing: 2 cycles RPA (57) Replace Address $(EA)_{15-23} \rightarrow (EA)_{15-23}$ $(A)_{0-14} \rightarrow (EA)_{0-14}$ The address portion of register A (bits 0 thru 14) replaces the address portion of the memory word at the effective address. Bits 15 thru 23 of the memory word at the effective address are not affected.
Register affected: None
Timing: 2 cycles LDA (54) Load A $(EA)_{0-23} \rightarrow (A)_{0-23}$ The contents of memory at the effective address are loaded into the A register. The overflow and carry indicators are not reset.
Register affected: A
Timing: 2 cycles STA (55) Store A $(A)_{0-23} \rightarrow (EA)_{0-23}$ The contents of register A are stored in memory at the effective address.
Register affected: None
Timing: 1 cycle LDQ (64) Load Q $(EA)_{0-23} \rightarrow (Q)_{0-23}$ Interrupt ignored during instruction. The contents of the memory at the effective address are loaded into the Q register.
Register affected: Q
Timing: 2 cycles STQ (65) Store Q $(Q) \xrightarrow[0-23]{} (EA)_{0-23}$ The contents of the Q register are stored in memory at the effective address.
Register affected: None
Timing: 1 cycle PRA (60) Place RS Memory into "A" Register (Register Sender $(EA)_{0-23} \rightarrow (A)_{0-23}$ The contents of the Register Sender Memory at the effective address are loaded into the A register of the CP. The overflow and carry indicators are not reset.
Register affected: A
Timing: 2 cycles
PAR (61) Place "A" Register into RS Memory $(A)_{0-23} \rightarrow (\text{Register Sender } (EA))_{0-23}$ The contents of register A are stored in the Register Sender Memory at the effective address.
Register affected: None
Timing: 1 cycle
LPR (66) Load Page Register
Interrupts Ignored During Instruction This Op-Code with its extended field allows the loading of the data field and branch field of the page register. This instruction is not indexable. A zero extended OP code will be treated as a no-op.
LPD (661) Load Data Field $EA_{3,4} \rightarrow (PR)_{4,5}$
(Not Indexable)

The effective address bits 3 and 4 are loaded directly and respectively into bits 4 and 5 of the Page Register. (DATA FIELD).
Register affected: Page Register
Timing: 1 cycle
LPB (662) Load Branch Field $EA_{0,1} \rightarrow (PR)_{2,3}$
(Not Indexable)

The effective address bits 0 and 1 are loaded directly and respectively into bits 2 and 3 of the Page Register. (BRANCH FIELD).
Register affected: Page Register
Timing: 1 cycle
LPDB (663) Load Data and Branch Fields
(Not Indexable) $EA_{3,4\ \&\ 0,1} \rightarrow (PR)_{4,5,\ \&\ 2,3}$ The effective address bits 3,4,0 and 1 are loaded directly and respectively into the Page Register bits 4,5 (DATA FIELD) and 0,1 (BRANCH FIELD).
Register affected: Page Register
Timing: 1 cycle
TID (664) Transfer Instruction Field to Data Field
(Not Indexable) $(PR)_{0,1} \rightarrow (PR)_{4,5}$ This instruction will allow data storage reference within the memory page of the running program.
Register Affected: Page Register
Timing: 1 cycle
LDC (74) Load Output Channel $(EA)_{0-23} \rightarrow (OC)_{0-23}$ The contents of the memory at the effective address are loaded on the output channel. A separate sampling level is extended to external devices to indicate when data is stable.
Register affected: None
Timing: 2 cycles
STC (75) Store Input Channel $(IC)_{0-23} \rightarrow (EA)_{0-23}$ The contents of the input channel are stored in memory at the effective address. A separate sampling level is extended to the external devices to acknowledge storage.
Register affected: None
Timing: 2 cycles
1.2.5 Miscellaneous Control Group (37) (Non-Indexable)
DSI Disable Interrupt (SET INIT)
(3700001)

Interrupts are accepted into the WAIT STATE. Interrupts will not be scanned and therefore not acknowledged by the Central Processor, while in this state.
Register affected: None
Timing: 1 cycle
ENI Enable Interrupt (RESET INIT)
(3700002)

All Interrupts are accepted into a WAIT STATE and interrupt break will be acknowledged during the next sequential instruction providing it allows interrupt recognition. Thus this instruction resets the DSI storage and will allow the interrupt system access at the end of next processed instruction if that instruction allows it.
Registers affected: None
Timing: 1 cycle
ECR Enable CPD Routine (Refer to Section 8.5 Maintenance) (3700004)

This instruction sets a storage element, the output of which will allow loading of the data bus into the "A" register of the Central Processor during level 3 of a CPD instruction. The format of the "A" register after loading is as follows:

| CPD "C" STROBE | 23 22 — 8 BIT ENCODE OF 32 CPD SIGNALS | 15 14 — 0 INSTRUCTION REGISTER BITS 9 THRU 14 |
|---|---|---|

BIT 15 = CPD00 + CPD11 + CPD22 + CPD33
BIT 16 = CPD01 + CPD12 + CPD23 + CPD34
BIT 17 = CPD02 + CPD13 + CPD24 + CPD35
BIT 18 = CPD03 + CPD14 + CPD25 + CPD36
BIT 19 = CPD04 + CPD15 + CPD26 + CPD37
BIT 20 = CPD05 + CPD16 + CPD27 + CPD30
BIT 21 = CPD06 + CPD17 + CPD20 + CPD31
BIT 22 = CPD07 + CPD10 + CPD21 + CPD32
Register affected: RA
Timing: 1 cycle
DCR Disable CPD Routine
(3700010)

This instruction resets the storage element set by ECR.
Register affected: None
Timing: 1 cycle
REI Reset Error Indicators
(3700020)

All internal Central Processing Unit stored error indicators will be cleared. These include: Memory Even Parity Error, Invalid OP Error, Division by Zero Error, Error Trap and CMC Errors.
Register affected: None
Timing: 1 cycle
MPS Memory Protect Set
(3700040)

The WMPB indicator is set. This becomes bit 25 of the data bus.
Register affected: None
Timing: 1 cycle
MPR Memory Protect Reset
(3700100)
The WMPB indicator is reset.
Register affected: None
Timing: 1 cycle
BPS Set Bad Parity
(3700200)

This instruction generates bad parity to main memory in the following manner.

Whenever this storage element is set by the above execution, the succeeding memory reference instructions will generate bad parity. The Store Register A (STA) instruction or Place A in Register-Sender (PAR) instruction or character copy out (CCO) instruction or load channel (LDC) will generate bad data parity to either Main memory (STA) or Register-Sender memory (PAR) or to the channel multiplexor (CCO or LDC). Any other memory reference instruction will generate bad address parity. PRA will generate bad address parity to the Register-Sender memory while all the others (Operation Code = 26 or 40 through 77 except 55 (STA) and 61 (PAR) will generate bad address parity to the Main Memory. Indirect addressing will also cause bad address parity.
Registers affected: None
Timing: 1 cycle
BPR Reset Bad Parity
(3700400)
Resets the Bad Parity storage element.
Registers affected: None
Timing: 1 cycle
SSRTC SWITCH TO STANDBY REAL TIME CLOCK
(3701000)
This instruction sets a storage element, the output of which switches the MAIN REAL TIME CLOCK output off thus allowing the STANDBY REAL TIME CLOCK to run. A simulated MAIN REAL TIME CLOCK ERROR is created causing a level 8 interrupt. Register affected: None
Timing: 1 cycle
SMRTC SWITCH TO MAIN REAL TIME CLOCK
(3702000)
This instruction resets the above storage element. The MAIN REAL TIME CLOCK takes over and the error indication caused by the previous action (SSRTC) is removed.
Register affected: None
Timing: 1 cycle
ENWD Enable Watch Dog Timer (3704000)
This instruction enables the Watch Dog Timer so that it can reset. (See 8.6) Register affected: None
Timing: 1 cycle
RIW Reset Interrupt Waits
(3720000)
This instruction resets the Wait States of the eight Interrupt Levels.
Register affected None
Timing: 1 cycle
NOTE: Simultaneous selection of separate operators is allowed, e.g., 3700021 will effect the DSI and the REI operation. Ambiguous selections attempting to specify two states of a single operator (e.g 3700014) result in unpredictable operation.
RWD Reset Watch Dog Timer
(3710000)
This instruction resets the Watch Dog Timer.
(See 8.6)
Register Affected: None
Timing: 1 cycle
SYNC Resync Watch Dog Timer
(3740000)
This instruction resynchronizes the Watch Dog Timer.
(See 8.6 for operation).
Register affected: None
Timing: 1 cycle
1.2.6 Branch and Skip Group
RTN (10) Branch Unconditional $EA_{0-14} \rightarrow (PC)_{0-14}$
The next instruction in the program sequence is at the effective address in the page specified by the instruction field of the Page Register.
INDIRECT ADDRESSING of this instruction will load the Page Register from the contents of the effective address as follows. When returning the data contents of the locations specified by the operand bits 0–14 will be loaded into the IR register in the normal manner and then loaded into the program counter; bits 15 thru 18 will be loaded into the branch and data fields of the Page Register. This return linkage to a different page other than the one where the RTN resides is possible. (refer to section 1.3.3 Paging).
Register affected: PC; PR if indirect
Timing: 1 cycle; 2 cycles if indirect
BUN (11) Branch Unconditional $EA_{0-14} \rightarrow (PC)_{0-14}$
The next instruction in program sequence is at the effective address in the page specified by the instruction field of the Page Register.
Register affected: PC
Timing: 1 cycle
BAO (35) Branch A Register Overflow OVF = $1{:}EA_{0-14} \rightarrow (PC)$
(Not Indexable)
If the A register overflow indicator is set, the next instruction is taken from the location specified by the effective address. The overflow indicator is reset. Register affected: PC if Branch Occurs
Timing: 1 cycle
BZA (13) Branch if A Register Zero $(A)_{0-23} = 0{:}EA_{0-14} \rightarrow (PC)$
The next instruction is taken from the location specified by the effective address if the A register contents are zero.
Register affected: PC if Branch Occurs
Timing: 1 cycle; 2 if Indexed
BNA (14) Branch if A Register Negative $A_{23} = 1{:}\ EA_{0-14} \rightarrow (PC)$
The next instruction is taken from the location specified by the effective address if the contents of register A are negative.
Register affected: PC if Branch Occurs
Timing: 1 cycle; 2 if Indexed BPA (15) Branch if A Register Positive $A_{23} = 0{:}EA_{0-14} \rightarrow (PC)$
The next instruction is taken from the location specified by the effective address if the contents of register A are positive. Register affected: PC if Branch Occurs
Timing: 1 cycle; 2 if Indexed
BSP (62) Branch and Store Program Linkage
$OVF \rightarrow (EA)_{20}$, $CARRY \rightarrow (EA)_{19}$,
$(LPR)_{0-3} \rightarrow (EA)_{15-18}$,
$(LPC)_{0-14} \rightarrow (EA)_{0-14}$
The current contents of the program counter and the page register as stored in the last program count register and the last page reference register and the overflow indicator and the carry indicator, replaces the contents of the memory word at the effective address. The next instruction is taken from the effective address plus one. This instruction will delay an interrupt by one instruction.
This instruction facilitates real time sub-routine linkages. The interrupt delay feature provides a safeguard against inadvertent sub-routine re-entry; the interrupt system may be disabled by the first instruction in the sub-routine.
Register affected: PC
Timing: 2 cycles
BRR (16) Branch Return Reset $EA_{0-14} \rightarrow PC$; 0 $\rightarrow$ INT. ACTIVE
if indirect
$(EA)_{20}$ V OVF $\rightarrow$ OVF, $(EA)_{19}$ V CARRY $\rightarrow$ CARRY
$(EA)_{15-18} \rightarrow (PR)_{2-5}$ $(EA)_{0-14} \rightarrow (IR)_{0-14}$
The next instruction is executed at the effective address. The highest active interrupt is reset.
Register affected: PC Timing: 1 cycle; 2 if Indexed This instruction is used to exit from an interrupt subroutine and should be an indirect reference to the subroutine link location to properly restore the interrupted program.

SMNT (7φ) Skip Memory Not True, i.e., if A and Memory Do not Compare Ones.

$$(A)_{0-23} \cdot (\overline{EA})_{0-23} \neq 0: (PC)+1 \rightarrow (PC)$$

Contents of the memory at the effective address are compared with register A. If they do not match in positions that contain a one in register A, skip one instruction. Register affected: PC if Skip Timing: 2 cycles SMNZ (71) Skip if A and Memory Do Not Compare Zeros $$(A)_{0-23} \cdot (EA)_{0-23} \neq 0: (PC)+1 \rightarrow (PC)$$

Contents of the memory at the effective address are compared with register A. If the memory operand does not contain zeros in bit positions corresponding to "ones" in register A, skip one instruction. Register affected: PC if Skip Timing: 2 cycles SMNN (77) Skip if Memory Not Negative $$(EA)_{23} = 0: PC + 1 \rightarrow (PC)$$

If bit 23 of the memory location at the effective address is a zero, skip one instruction.

Register affected: PC if Skip

Timing: 2 cycles

SSNT (φ7) Skip if Sense Group Not True $$(\overline{SG_n}) \cdot EA_{0-7} \neq 0: (PC) + 1 \rightarrow (PC)$$

A portion of the effective address (bits 9 thru 7) form a mask. This mask is compared to eight sense line inputs in any of 128 possible groups as specified by bits 8 thru 14 of the effective address. If the selected sense line group and the mask do not compare one's, skip one instruction.

Register affected: PC if Skip

Timing: 1 cycle; 2 cycles if Indexed The word format of the SSNT is as follows:

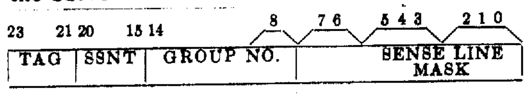

The SSNT instruction can be used to test the condition of a maximum of 1024 individual input lines.

The sense group numbering, by nature of the position in the computer instruction follows the sequence (000, 010, 020, .......760, 770,004,014,024,....764,774).

See Section 1.5.3 for explanation of sense lines.

See Section 8.3 for sense line assignments. SANE (72) Skip if A Register Not Equal to Memory $$(EA)_{0-23} - (A)_{0-23} \neq 0: (PC) + 1 \rightarrow (PC)$$

The contents of the memory at the effective address are compared with the A register. If the A register is not algebraically equal to the contents of the memory location at the effective operand address, skip one instruction.

Register affected: PC if Skip

Timing: 2 cycles LSGA (φ6) Load Sense Group Into "A" Register $0 \rightarrow (A)_{8-23}$ Selected SG $\rightarrow (A)_{0-7}$ The upper seven bits of the effective address defines the desired sense group. The assignment of sense group numbers for the seventy-one (71) standard sense groups given in the SSNT instruction also applies to this instruction. The contents of the selected sense group is placed in the lower eight bit positions of the A register.

Register affected: A

Timing: 1 cycle SAMG (76) Skip if Register A and Memory Do Not Compare Equal as Masked by Register Q $$(Q)_{0-23} \cdot \left[(A)_{0-23} \oplus (EA)_{0-23}\right] \neq 0: (PC) + 1 \rightarrow (PC)$$

Register A and the contents of memory at the effective address are compared in positions extracted by the mask bits of Register Q. If they do not compare identically, skip one instruction.

Example:

| | |
|---|---|
| Register A | 6 7 4 0 6 1 5 3 |
| (EA) | 1 2 7 3 6 0 1 2 |
| Register Q | 0 0 0 0 7 0 0 0 |
| $(A)_{0-23} \oplus (EA)_{0-23}$ | 7 5 3 3 0 1 4 1 |

$$(Q)_{0-23} \cdot (A)_{0-23} \oplus (EA)_{0-23} = 0\,0\,0\,0\,0\,0\,0\,0 \quad \text{Do Not Skip}$$

Registers affected: PC if Skip

Timing: 2 cycles

Registers affected: PC if Skip

Timing: 2 cycles

Half Word Skips (φ4) Indexing will not affect extended Op code

This is an extended operation provided for half word immediate (or literal) tests of the A Register. The effective address field bits 12, 13 and 14 are used to specify the following skip tests: The execution time is 1 cycle.

SLNT (φ4φ) Skip Left Not True $(\overline{A})_{12-23} \cdot EA_{0-11} \neq 0: (PC)+1 \rightarrow (PC)$ Skip one instruction if bits 12–23 of rigister A do not compare one's as masked by bits 0–11 of the effective address.

SRNT (φ41) Skip Right Not True $(\overline{A})_{0-11} \cdot EA_{0-11} \neq 0: (PC) + 1\ (PC)$ Skip one instruction if bits 0–11 of register A do not compare one's as masked by bits 0–11 of the effective address.

SLNZ (φ44) Skip Left Not Zeros $(A)_{12-23} \cdot EA_{0-11} \neq 0: (PC) + 1\ (PC)$ Skip one instruction if bits 12–23 of Register A do not contain zeros as masked by bits 0–11 of the effective address.

SRNZ (φ45) Skip Right Not Zeros $(A)_{0-11} \cdot EA_{0-11} \neq 0: (PC) + 1\ (PC)$ Skip one instruction if bits 0–11 of register A do not contain zeros as masked by bits 0–11 of the effective adress.

SLNE (φ42) Skip Left Not Equal $(A)_{12-23} - EA_{0-11} \neq 0: (PC) + 1\ (PC)$

Skip one instruction if bits 0–11 of the effective address and bits 12–23 of register A are not equal.

SRNE (φ43) Skip Right Not Equal $(A)_{0-11} - EA_{0-11} \neq 0: (PC) + 1\ (PC)$

Skip one instruction if bits 0–11 of the effective address and bits 0–11 of register A are not equal. 1.2.7

Shift Group

The execution time for all shift instructions is (N+3/4) cycles; N is specified in the effective address of the instruction.

The notation convention utilized in the following descriptions are iteration formulas. Termination occurs after N iterations unless otherwise specified.

SAL (34φ) Shift Register A Left Arithmetic $$(A)_i \rightarrow (A)_{i+1}$$
$$0 \rightarrow (A)_0$$
$$(A)_{22} \oplus (A)_{23} :1 \rightarrow OVF$$

(Not Indexable) The A register is shifted left N bit positions. Zeros are placed in the N least significant bits of Register A (open end shift). An overflow occurs if the register is shifted when bit 23 does not equal bit 22. N shifts will be completed regardless of overflow.

Registers Affected: A

SAR (341) Shift Register A Right Arithmetic $$(A)_i \oplus {}_1 \rightarrow (A)_i$$
$$(A)_{23} \rightarrow (A)_{22}$$
$$(A)_{23} \rightarrow (A)_{23}$$

(Not Indexable) The A Register is shifted right N positions. Bit 23 is not changed and is shifted to bit 22 for each specified shift.

Registers affected: A

LSL (342) Long Shift Left Arithmetic $$(A)_i \rightarrow (A)_{i+1};$$
$$(Q)_{23} \rightarrow (A)_0; (Q)_i \rightarrow (Q)_{i+1};$$
$$0 \rightarrow (Q)_0; (A)_{22} \oplus (A)_{23}:1 \rightarrow OV$$

(Not Indexable) The double precision register A–Q is shifted left N bit position. Zeros are entered into the least significant N bits of A–Q. An overflow will occur if the double register is shifted when $A_{23}$ does not equal $A_{22}$. Bit 23 of Register Q is shifted. N shifts will be completed regardless of overflow.

Registers affected: A–Q

LSR (343) Long Shift Right Arithmetic $$(A)_{i+1} \rightarrow (A)_i;$$
$$(A)_0 \rightarrow (Q)_{23}; (Q)_{i+1} \rightarrow (Q)_i;$$
$$(A)_{23} \rightarrow (A)_{22}; (A)_{23} \rightarrow (A)_{23}$$

Not Indexable. The double precision register A–Q is shifted right N bit position. Bit $A_{23}$ is not changed, however, its value is copied into Bit $A_{22}$. Bit $Q_{23}$ is shifted. Bits shifted beyond $Q_0$ are lost. Registers affected: A–Q SMP (344) Shift and Mark Position $$(A)_{23} = 1 \text{ Termination}$$
$$0 \quad (Q)_0; (Q)_i \rightarrow (Q)_{i+1}; (Q)_{23} \rightarrow (A)_0;$$
$$(A)_i \rightarrow (A)_{i+1}$$

(Not Indexable) $A_{23}$ is tested to see if it equals one. If $A_{23} \neq 1$, A–Q registers are shifted left until $A_{23} = 1$ or the number of shifts equal the maximum field length has been tested, the number of shifts is placed in the index register specified by the TAG Field. Registers affected: A, Q, X LLR (120) Long Left Rotate $$(A)_i \rightarrow (A)_{i+1}; (Q)_{23} \rightarrow (A)_0;$$
$$(Q)_i \rightarrow (Q)_{i+1}; (A)_{23} \rightarrow (Q)_0$$

The double precision register A–Q is shifted right N bit positions. Bit $Q_0$ is shifted to bit $A_{23}$; and bit $A_0$ is shifted to bit $Q_{23}$.

Registers affected: A–Q

LRR (121) Long Right Rotate $$(A)_{i+1} \rightarrow (A)_i; (A)_0 \rightarrow (Q)_{23};$$
$$(Q)_{i+1} \rightarrow (Q)_i; (Q)_0 \rightarrow (A)_{23}$$

The double precision register A–Q is shifted right N bit positions. Bit $Q_0$ is shifted to bit $A_{23}$; and bit $A_0$ is shifted to bit $Q_{23}$.

Registers Affected: A–Q

LLA (122) Left Shift A Logical $$(A)_i \rightarrow (A)_{i+1}; 0 \rightarrow (A)_0$$

The contents of register A are shifted left N bit positions. Zeros are entered in the least significant N Bits of register A. Bits shifted out of positon $A_{23}$ are lost. No overflow is recorded.

Register affected: A

LLQ (124) Left Shift Q Logical $$(Q)_i \rightarrow (Q)_{i+1}; 0 \rightarrow (Q)_0$$

The contents of register Q are shifted left N bit positions. Zeros are entred in the N least significant bits. Bits shifted out of $Q_{23}$ are lost. No overflow is recorded.

Register affected: Q

LRA (123) Right Shift A Logical $$(A)_{i+1} \rightarrow (A)_i; 0 \rightarrow (A)_{23}$$

The contents of register A are shifted right N bit positions. Zeros are entered in the N most significant bits of register A. Bits shifted out of position $A_0$ are lost.

Register affected: A

LRQ (125) Right Shift Q Logical $$(Q)_{i+1} \rightarrow (Q)_i; 0 \rightarrow (Q)_{23}$$

The contents of register Q are shifted right N bit positions. Zeros are entered into the N most significant bits of Register Q. Bits shifted out of $Q_0$ are lost.

Register affected: Q 1.2.8 Logical Operator Group

ANA (5φ) AND A with Memory $(A)_{0-23} \cdot (EA)_{0-23} \rightarrow (A)_{0-23}$ The contents of memory at the effective address and Register A are compared bit by bit. Register A will contain a one where corresponding bits in both register A and the memory word are one's. The result remains in A.

Register affected: A

Timing: 2 cycles

ORA (51) Or (Merge) Memory with A $$(A)_{0-23} \vee (EA)_{0-23} \rightarrow (A)_{0-23}$$

The contents of the memory at the effective address and Register A are compared bit by bit. Register A will contain a one in bit position corresponding to those in which either Register A or the memory word contain a one. The result remains in A. Register affected: A Timing: 2 cycles ERA (52) Exclusive-Or Memory with A $$(A)_{0-23} \oplus (EA)_{0-23} \rightarrow (A)_{0-23}$$

The contents of the memory location at the effective address and Register A are compared bit by bit. Register A will contain a one where either register A or the memory word, but not both, contain a one in corresponding bit positions. The result remains in A.

Registers affected: A

Timing: 2 cycles

Half Word Logicals (HWL)

This is an extended operation provided for half word immediate logical operation on Register A. Three bits (12, 13 and 14) of the effective address field are used to specify the following logical operations.

Timing: 1 cycle, 2 if Indexed.

$$\text{ANL } (\phi 3\phi) \text{ And Left } (A)_{i+12} \cdot EA_i \rightarrow (A)_{i+12};\quad 11 \geq i \geq 0$$

The effective address bits 0–11 are compared bit by bit with register A bits 12–23. Register A bits 12–23 will contain a one where corresponding bits in both register A and the effective address contain a one.

Register affected: A $$\text{ANR } (\phi 31) \text{ And Right } (A)_i \cdot EA_i \rightarrow (A)_i;\quad 11 \geq i \geq 0$$

The effective address bits 0–11 are compared bit by bit with register A bits 0–11. Register A bits 0–11 will contain a one where corresponding bits in both Register A and the effective address contain a one.

Register affected: A $$\text{ORL } (\phi 32) \text{ Or Left } (A)_{i+12} \vee EA_i \rightarrow (A)_{i+12};\quad 11 \geq i \geq 0$$

The effective address bits 0–11 are compared bit by bit with Register A bit 12–23. Register A will contain a one where corresponding bits in either effective address bits 0–11 or Register A bits 12–23 contain a one.

Register affected: A $$\text{ORR } (\phi 33) \text{ Or Right } (A) \vee EA_i \rightarrow (A)_i\ 11 \geq i \geq 0$$

The effective address bits 0–11 are compared bit by bit with Register A bit 0–11. Register A will contain a one where corresponding bits in either the effective address bits 0–11 or Register A bits 0–11 contain a one.

Register affected: A

ERL ($\phi$36) Exclusive Or Left $$(A)_{i+12} \oplus EA \rightarrow (A)_{i+12};\ 11 \geq i \geq 0$$

The effective address bits 0–11 are compared bit by bit with Register A bits 12–23. Register A will contain a one where corresponding bits in either the effective address bits 0–11 or Register A bits 12–23, but not both, contain a one. Register affected: A ERR (037) Exclusive Or Right $$(A)_i \oplus EA_i \rightarrow (A)_i;\ 11 \geq i \geq 0$$

The effective address bits 0–11 are compared bit by bit with Register A bits 0–11. Register A will contain a one where corresponding bits in either the effective address bits 0–11 or Register A bits 0–11 but not both, contain a one. Register affected: A ADL (034) Add Immediate Left $$EA_{0-11} + (A)_{12-23} \rightarrow (A)_{12-23}$$

The effective address bits 0–11 are added to register A bits 12–23. Register A bits 0–11 are not affected. Overflow and carry indicators are not affected. Register affected: A ADR (035) Add Immediate Right $$EA_{0-11} + (A)_{0-11} \rightarrow (A)_{0-11}$$

The effective address bits 0–11 are added to registry A bits 0–11. Register A bits 12–23 are not affected. Overflow and carry indicators are not affected. Register affected: A 1.2.9 Program Control Group HLT (67) Halt $EA_{0-14} \rightarrow PC$ Processing this instruction will cause the central processor to stop. If the processor is on-line, a timer, after a delay of 1 microsecond, will cause the processor to run. If not on-line, then a signal from the computer programming console or the computer third party, will be required before the processor can start.

Register affected: None

Timing: 1 Cycle

XEC (47) Execute

The instruction at the effective address will be executed. The next instruction will be taken from the location specified by the program counter. Thus, a branch or a skip could change the program counter. The instruction at the effective address may be indexable or indirectly addressable. Register affected: Refer to appropriate instruction being executed. Timing: 1 cycle plus Execution Time of Instruction 1.2.10 Input/Output Group SEL (05) Select Input Output Operation The effective address is interpreted to select an input/output Channel Controller, Peripheral Adapter device and function at the device for subsequent data transfer operations. Bit 14 of the effective address is used to arm the Channel Ready Interrupt. A channel Controller disconnect function will disarm the interrupt. The priorty Interrupt System will be disabled for one instruction execution time. This instruction is also used in selecting third party functions. Register affected: None Timing: 1 cycle CPD (17) Control Pulse Directive The effective address of this instruction is interpreted by external functions as follows:

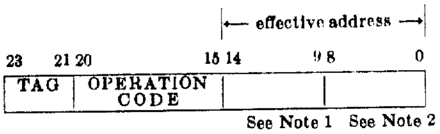

Note 1: bits 9–14 locally decoded address of functional unit selected.

Note 2: bits 0–8 are coded directives to be interpreted independently at the addressed functional unit. Register affected: None Timing: 1 cycle See Section 8.5 for CPD explanation.

CCA Character Copy I/O register A (33)

This is an extended operation provided for versatile input and output word assembly and disassembly under program control. Three bits (12, 13, and 14) of the effective address are interpreted as an operation code extension field to determine register format control. The N field is used in a manner similar to the shift instructions to determine the number of binary positions for rotation. This instruction is not indexable. CCO Character Copy Output (33$\phi\phi\phi$6) Rotate Register A left six binary digit positions (N = 6) and copy bits 0–5 to the output channel.

(331$\phi\phi$1$\phi$) Rotate Register A left eight binary digit positions (N–$10_8$) and copy bits 0–7 to the output channel.

(332$\phi\phi$14) Rotate Register A left 12 binary digit positions (N=$14_8$) and copy 0–11 to the output channel.

(333$\phi\phi\phi\phi$) Copy Register A bits 0–23 to the output channel.

CCI Character Copy Input (334$\phi\phi\phi$6) Rotate Register A left 6 binary digit positions (N=6) and copy bits 0–5 of the input channel into bits 0–5 of Register A.

335φφ1φ) Rotate Register Left eight binary digit positions ($N=10_8$) and copy bits 0–7 of the input channel into bits 0–7 of Register A.

(336φφ14) Rotate Register A left 12 binary digit positions ($N=14_8$) and copy bits 0–11 of the input channel into bits 0–11 of Register A.

(337φφφφ) Copy bits 0–23 of the input channel into bits 0–23 of Register A.

Register affected: A

Timing: (N+7/4) cycles 1.2.11 Transfer and Exchange Group

XAM (53) Exchange Register A and Memory $$(EA)_{0-23} \rightarrow (A)_{0-23}$$

The contents of memory at the effective address are exchanged with the contents of Register A. Register affected: A Timing: 3 cycles RTR (36X) Register to Register This is a non-indexable extended operation provided for operations between registers. Three bits (12, 13, and 14) of the effective address field are interpreted as an operation code extension (OPE) field. The instruction word format for this instruction is as follows: Single cycle.

| 23–21 | 20–15 | 14 13 12 | 11 | 10 | 9 | 8 | 7 | 6 | 5 | 4 | 3 | 2 | 1 | 0 |
|---|---|---|---|---|---|---|---|---|---|---|---|---|---|---|
| TAG | RTR | OPE | PC | $X_3$ | $X_2$ | $X_1$ | Q | A | DIAG | $X_3$ | $X_2$ | $X_1$ | Q | A |
| | | | Source | | | | | | | Sink | | | | |

CRR Copy Register to Register

OPE 000 (SO) → (SK)

Copy selected source register into sink register. Source register is uneffected. Multiple sources selection results in logical "OR" copies. Multiple sink selection results in simultaneous copy to all selected registers.

CCR Copy then Clear Register

OPE 001 (SO) → (SK); 0 → (SO)

Copy selected source register to sink register. Source register is cleared to zeros except PC which remains unaffected. Multiple source selection results in a logical "OR" copies and cleared. Multiple sink selection is allowed.

EXR Exchange Registers

OPE 010 (SO)—(SK); (SK)—(SO)

Exchange selected source register with selected sink register. Multiple selection of source or sink will result in logical "OR" of source or sink registers participating in the exchange. For exchange involving a small register and a large register, non-corresponding bits are zeroed or lost as the case may be.

Bit 0 Reg A is the Sink
1 Reg Q is the Sink
2 Reg X1 is the Sink
3 Reg X2 is the Sink
4 Reg X3 is the Sink
5 Reg Diag is the Source
6 Reg A is the Source
7 Reg Q is the Source
8 Reg X1 is the Source
9 Reg X2 is the Source
10 Reg X3 is the Source
11 Reg PC
is the Source
and PR See Section 8.2 for register to register operation map.

SECTION 1.3 Address Modification

Address modification in the No. 1 EAX computer is accomplished by: Indexing, Indirect Addressing, Paging.

Indexing and Indirect addressing operate directly with the operand portion of the instruction.

Indirect addressing in specific instructions operates also on the Page Register.

Paging operates only on the Page Register.

Indexing and indirect addressing are operators to an instruction while paging in an instruction itself. Indexing and indirect addressing can be used by themselves or in combination. If both are specified, indexing is done first and then indirect addressing. The instructions upon which the address modification is performed is retained in memory in its unaltered form. 1.3.1 Address Modification Using Index Registers Three hardware index registers are provided in the basic standard mainframe for address modification. Any of the three registers ($X_1$, $X_2$, $X_3$) can be specified by the programmer by encoding the appropriate bits in the tag field of the instruction. The instruction is then executed as if its address field contained in the specified address of the instructions plus the contents of the index register (additive indexing).

EXAMPLE:

Instruction = ADD 47631,2 (Note: 2 specifies index register No. 2)

of $X_2$= 00135

Address of Data = 47766

Address Modification is accomplished by using binary radix complement (2's complement) arithmetic modulo $2^{15}$. The algorithm may be stated as follows:

$EA = (Y + X_n)$ modulo $2^{15}$

EA = Effective Address

Y = Specified Instruction Address $X_n$ = Specified Index Register

A powerful set of instructions is provided for index register modification. These instructions operate on the index registers using 2's complement arithmetic modulo $2^{14}$. Thus, the index registers may be incremented or decremented and tested for terminal condition by examination of the highest order bit. The incrementing and decrementing operations may be explained as follows:

1. Index register in "positive" range — Index Register may be incremented or decremented and terminal test is for a "one" in the 15th bit position (negative index).

2. Index Register in the "negative" number range. — Index register may be incremented or decremented in this range and the terminal test is for a "zero" in the 15th bit position (positive index).

This method of indexing allows the programmer complete flexiblity in his choice of address manipulation.

Literal Add (ADX) and Subtract (SBX) operations on the specified index register, coupled with individual conditional Branch Instructions provide yet another degree of programming freedom.

Programming flexibility is further enhanced by the provision of literal clear and subtract index (CSX) and the clear and add index (CAX) instructions. By the use of these instructions, an index register is easily initialized. The literal index operator instructions are unique in the use of the indirect reference bit. These instructions are normally used to load the index register directly from the operand field of the instruction, however, if the indirect addressing bit is set, the index register is loaded from memory at an effective address specified by the address field of the instruction.

Register transfer instructions (RTR) provide the capability of transferring the index registers to any other operating register and conversely, from the operating registers to the index registers. 1.3.2 Indirect Addressing The concept of providing alternatives for addressing is extended by the use of indirect addressing. In very much the same manner as the index registers are specified by 2 bits in the tag field, indirect addressing also is specified by a separate bit in the tag field, thus allowing an instruction to have index modification and indirect addressing by a single tag field specification.

If an instruction operation calls for an operand to be retrieved from memory, and if that same instruction has its indirect addressing tag bit set, the address field of the instruction after modification by the indexing operations refers to the memory location at which the address of the operand will be found. Further, if that location also has the indirect bit tag set, the contents of that location after modification by indexing, is interpreted as the address at which the address of the operand will be found. Thus, the indirect addressing and indexing process is iterative. Instruction execution time is increased by one cycle for each level of indirect addressing. The following example will further illustrate the concept of indirect addressing (*will be used to indicate the indirect address tag field bit):

| Location | Contents | Remarks |
|---|---|---|
| 00345 | *ANA 43217 | Instruction to be executed. |
| 43217 | * 0037416 | Location of next indirect address. |
| 37416 | 00037500 | Location of operand address. |
| 37500 | 77777777 | Operand location. |

1.3. Paging

In order to increase the memory addressing capabilities of the Central Processor beyond the 32K of directly-addressable core memory that is possible with its 15 bit address field, a paging technique is employed. A page consists of no more than 32K of core memory. No more than four pages are to be implemented under present design. This limits the size of core memory to 131K. To implement paging, a page register, a last page reference, and paging instructions are described as follows.

1.3.3.1 The Page Register will be a six-bit storage register:

The Page Register is sectioned into three fields:

a. The DATA FIELD is bits 4 and 5, b. The BRANCH FIELD IS bits 2 and 3.

c. The INSTRUCTION FIELD is bits 0 and 1.

The format for the Page Register is as follows:

| 5 4 | 3 2 | 1 0 |
|---|---|---|
| FIELD DATA | BRANCH FIELD | INSTRUCTION FIELD |

1.3.3.2 Last Page Reference

The Last Page Reference is a 4-bit register, sectioned into two 2-bit fields, called the LAST DATA FIELD, and the LAST INSTRUCTION FIELD.

The format for the last page Reference is as follows:

| 3 2 | 1 0 |
|---|---|
| LAST DATA FIELD | LAST INSTRUCTION FIELD |

The LAST DATA FIELD is loaded during every Cycle One, Level Two, except when a trap occurs. The LAST DATA FIELD is loaded from the DATA FIELD of the Page Register.

The LAST INSTRUCTION FIELD is loaded during every Cycle One, Level Two (except when a trap occurs), from the INSTRUCTION FIELD of the Page Register. 1.3.3.3 The Paging instructions are as follows:

LOAD PAGE REGISTER GROUP (66)

(Not indexable)

This is an extended operation, provided for the loading of the Page Register.

The effective address field, bits 12 and 13, is used to specify which field of the Page Register is to be loaded. Bit 14 of the effective address is used to specify a transfer of INSTRUCTION FIELD information bits into the DATA FIELD.

Bits 0, 1, 3, and 4 of the operand will specify the page number to be loaded into the selected field, except during a transfer of the INSTRUCTION FIELD into the DATA FIELD. In this latter case bits 0, 1, 3, and 4 are ignored.

Simultaneous selection of the extended OP codes is allowed. E.g. 06630011 will load both the BRANCH FIELD and the DATA FIELD and the Page Register with page 01.

This is a single-cycle instruction.

Interrupts will be ignored during this instruction.

(Refer to Section 1.5.2.2.)

LPD (661): LOAD DATA FIELD $EA_{3,4} \longrightarrow (PR)_{4,5}$ (Not Indexable)

The effective address, bits 3 and 4, is loaded directly and respectively into bits 4 and 5 of the Page Register (DATA FIELD).

Register affected: Page Register

Timing: 1 cycle

LPB (662): LOAD BRANCH FIELD $EA_{0,1} \longrightarrow (PR)_{2,3}$ (Not Indexable)

The effective address, bits 0 and 1, is loaded directly and respectively into bits 2 and 3 of the Page Register (BRANCH FIELD).

Register affected: Page Register

Timing: 1 cycle LPDB (663): LOAD DATA AND BRANCH FIELD $$EA_{3,4\& 0,1} \longrightarrow (PR)_{4,5\& 2,3}$$

(Not Indexable)

The effective address, bits 3, 4, 0 and 1 is loaded directly and respectively into bits 4, 5 (DATA FIELD) and 2, 3 (BRANCH FIELD) of the Page Register. Register affected: Page Register Timing: 1 cycle

TID (664): TRANSFER INSTRUCTION FIELD TO DATA FIELD (Not indexable) $(PR_{0,1} \longrightarrow (PR)_{4,5}$ This instruction will allow referencing data storage within the instruction storage references of the running program. Register affected: Page Register Timing: 1 cycle RTN (10)..RETURN $EA_{0-14} \longrightarrow (PC)$ (Indexable)

This instruction is an unconditional branch, the same as BUN with the following exception:

When RTN is processed indirect, bits 15 through 18 of the indirect location will be loaded into the BRANCH FIELD and the DATA FIELD of the Page Register, bits 2 through 5 respectively.

BRR (16) BRANCH RETURN RESET

When this instruction is processed indirect it will load bits 15 thru 18 of the indirect location into the branch field and the data field, bits 2 thru 5, respectively, of the Page Register (Refer to instruction set section 1.2 for further information on this instruction).

BSP (62) BRANCH AND STORE PROGRAM LINKAGE

BSP will store the LAST DATA FIELD and the LAST INSTRUCTION FIELD of the Last Page Reference Register into bits 18 and 17 and bits 16 and 15 of the location referenced by the operand. Bits 0 through 14 therefore, contain the Last Program Count Register (LPC); bits 15 and 16 contain the LAST INSTRUCTION FIELD: and bits 17 and 18 contain the LAST DATA FIELD. Bits 19 and 20 will contain the carry and overflow indicators.

Whn processed indirect, BSP will inhibit loading of address bits 15 and 16 onto the Address Bus, thus forcing the memory reference to page 00. The data word read from the indirect location is stored in the processor's logic and appears at the output of the Y register, Y bits 15 and 16 are loaded into the BRANCH FIELD of the Page Register. The BRANCH FIELD becomes the address source and specifies the page where the Last Page Reference Register and Last Program Count Register is to be stored.

The Exact location within that page is specified by the "S" register. After storage of the information, the Y output, bits 17 and 18, are loaded into the DATA FIELD of the Page Register, and the BRANCH FIELD is transferred to the INSTRUCTION FIELD of the Page Register.

RTR..REGISTER-TO-REGISTER TRANSFER

The Page Register will become a source whenever the Program Counter becomes a source. Thus when used in this way with Register A or Register Q, the address plus the six bits of the Page Register can be transferred to these programmable registers so that the Page Register can be interrogated for maintenance purposes. PR0–5 to (A+Q) 15–20.

1.3.3.4

The Address bus of the Central Processor contains the 15 bits of the "S" register or the program counter, depending whether a data reference or an instruction reference is in process, and two bits from the output of the Page Register. These two bits, (15 and 16) are the controlled "OR" (ed) output of the DATA FIELD, BRANCH FIELD and INSTRUCTION FIELD of the Page Register.

1.3.3.5

Definition of DATA AND INSTRUCTION storage 1.3.3.5.1

DATA storage is defined as those locations of memory where references are made for the purpose of:

1.3.3.5.1.1.

Loading information into programmable registers Instructions that do this are: ADD (40), SUB (41), MUL (42), DIV (43), CSA (56), LDA (54), LDQ (64), ANA (50), ORA (51), ERA (52), XAM (53), PRA (60).

1.3.3.5.1.2

Modifying locations: Instructions that do this are: AOM (44), SOM (45), ADM (46), STX (26), RPA (57), STA (55), STQ (65), STC (75).

1.3.3.5.1.3

Executing an instruction out of sequence with the running program. Such an instruction is XEC (47).

1.3.3.5.1.4

Comparing such storage. Instructions that do this are SMNT (70), SMNZ (71), SANE (72), SANG (73), SAMQ (76), SMNN (77).

1.3.3.5.1.5

Distributing data to the input-output path. Instructions that do this are LDC (74) and PAR (61).

1.3.3.5.1.6

Modifying the address or operand of any instruction, except BUN (11), BSP (62), HLT (67) and RTN (10), BRR (16).

1.3.3.5.2

INSTRUCTION storage is defined as those applications of memory whre references are made for the purpose of:

1.3.3.5.2.1

Obtaining the next instruction to be processed, except XEC (47)

1.3.3.5.2.2.

Modifying the address of a BUN (11), HLT (67), RTN (10), BRR (16) instruction.

1.3.3.5.2.3.

storing the Last Page Register and LPC (Last Program Count) Register, and then branching to the following location, where the storage took place. The instruction that does this is a BSP (62). In this case the BRANCH FIELD will be the page source.

1.3.3.6

Modification 1.3.3.6.1

Indexing is accomplished over the 15-bit operand field of the instruction. Indexing will not be extended to the Page Register. Thus, if indexing modifies the operand beyond the 15-bit capacity, a "wrap-around" effect will occur within the page referenced.

1.3.3.6.2

Indirect modification of the operand of an instruction will be via the DATA FIELD of the Page Register, except in the BRR, BUN, HLT, and RTN instructions. These instructions will use the Instruction Field as memory references. An additional exception will be the BSP instruction. BSP indirect will inhibit the output of the Page Register, forcing the indirect reference to page ϕϕ. The location referenced will point to the page and location where the Last Page Reference Register and LPC are to be stored. During the BSP instruction the Page Reference Register LAST DATA FIELD and LAST INSTRUCTION FIELD are stored at the location specified, and the Page Register is loaded with the data and branch information that was stored in the indirect reference.

1.3.3.7

Features of Page Register and Last Page Reference Register Operation 1.3.3.7.1

Whenever any branch instruction is executed, the BRANCH FIELD of the Page Register will transfer its contents into the INSTRUCTION FIELD.

1.3.3.7.2

During data storage references, the DATA FIELD of the Page Register will be gated onto the Address Bus of the CCP.

1.3.3.7.3

During instruction storage references, the INSTRUCTION FIELD of the Page Register will be gated onto the Address Bus of the CCP, except during the BSP instruction. For this instruction the BRANCH FIELD is used as the page source.

1.3.3.7.4

During each Cycle One, Level Two, Pulse Three, the LAST DATA FIELD and the LAST INSTRUCTION FIELD of the Last Page Reference Register will be loaded from the DATA FIELD and INSTRUCTION of the Page Register, except when a trap occurs.

1.3.3.8 Example of Page Register Operation

| Location | Page 00 Machine Language | Assembler Language | Location | Contents of Page 01 Machine Language | Assembler Language |
|---|---|---|---|---|---|
| 00100 | 00000104 | A NDS 00000000+E | 00100 | 06200102 | A BSP C |
| 00101 | | | 00101 | 01100105 | B BUN F |
| 00102 | | | 00102 | 00100101 | C NDS |
| 00103 | | | 00103 | 04700112 | D XEC L |
| 00104 | 00100106 | E NDS | 00104 | 41000102 | E RTN*C (=RTN B) |
| 00105 | 06610010 | LPD 01 | 00105 | 46200100 | F BSP*A (=BSP E) |
| 00106 | 05400112 | LDA K | 00106 | 41100112 | G BUN*K (−BUN J) |
| 00107 | 41000104 | RTN*E (=RTN G) | 00107 | | |
| 00110 | | | 00110 | | |
| 00111 | 00000005 | NDS 05 | 00111 | 06700111 | J HLT $ |
| 00112 | 05400111 | L NDS 054 | 00112 | 00000111 | K NDS 0111 |

INITIAL CONDITIONS FOR THE EXAMPLE

The initial condition of the Page Register is DATA FIELD = 00, BRANCH FIELD = 01, INSTRUCTION FIELD = 01, and the Program Counter of the CCP = 00100.

This initial condition allows the processing of the instruction located in page 01, address 00100. The BSP to location C references instruction storage. The BRANCH FIELD of the Page Register indicates the page in which location C resides. The BSP instruction will store contents of the DATA FIELD and the INSTRUCTION FIELD of the Page Register into location C (Bits 18 thru 15). Condition of the Page Register after this instruction is:

| DF | BF | IF |
|---|---|---|
| 00 | 01 | 01 |

Since the INSTRUCTION FIELD of the Page Register is set to 01, and the Program Counter of the CCP now equals 00103, the next instruction to be processed will be XEC. XEC references data storage and since the DATA FIELD of the Page Register is set to 00, the data in location L (00112) in page 00, will be processed as an instruction, and will in this case, load Register A of the CCP from location 00111 in page 00. This is because the LDA instruction references data storage and the DATA Field still is set to 00. Condition of the Page Register after this instruction is:

| DF | BF | IF |
|---|---|---|
| 00 | 01 | 01 |

The INSTRUCTION FIELD is at 01 and the Program Counter of the CCP is at 00104, therefore the next instruction to be processed resides in page 01 location 00102. RTN*C references instruction storage. Location C (00102) is in page 01 as indicated by the INSTRUCTION FIELD of the Page Register, and contains the return location (00101) and the stored DATA FIELD and INSTRUCTION FIELD. The stored values for DATA FIELD and INSTRUCTION FIELD are loaded respectively into the DATA FIELD and the BRANCH FIELD of the Page Register. The BRANCH FIELD's contents are then transferred into the INSTRUCTION FIELD, so that the return can be complete. Condition of the Page Register after this instruction is:

| DF | BF | IF |
|---|---|---|
| 00 | 01 | 01 |

The Program Counter of the CCP now reads 00101, and the INSTRUCTION FIELD of the Page Register reads 01. The next instruction is read from page 01, location 00101. The BUN F is processed as an instruction storage. No changes are made to the Page Register and the next instruction is read from Page 01, location F (00105).

The instruction BSP*A inhibits the output of the Page Register, so that location A (00100) in page 00 will be referenced. The BSP instruction will temporarily store not only bits 9 through 14 of the referenced location, but also, bits 15 through 18. These bits will contain information for the BRANCH FIELD and the DATA FIELD of the Page Register respectively. Before loading the information into the Page Register, however, the DATA FIELD and the INSTRUCTION FIELD contents of the Page Register will be stored. After storage, the Page Register will be loaded, and then the BRANCH FIELD will transfer its contents to the INSTRUCTION FIELD. Processing of the instruction has now changed the Page Register so that the INSTRUCTION FIELD is now 00 or pointed to page 00. The next instruction therefore will be read out of Page 00, location 00105. These changes in the Page Register occur during the BSP* instruction:

| DF | BF | IF | DF | BF | IF | DF | BF | IF |
|---|---|---|---|---|---|---|---|---|
| 00 | 01 | 01 | 00 | 00 | 01 | 00 | 00 | 00 |

The next instruction to be processed is in Page 00, location 00105. An LPD (Load Data Field) instruction is inserted at this point, because the next instruction to be processed references data storage in page 01. (LDA K requires data from page 01 location K (00112). The LPD 01 will load the Page Register's DATA FIELD = 01. There will be no change in the other fields. The next instruction processed, then, would be the LDA K. Since LDA K references data storage and the DATA FIELD is equal to 01, Register A will be loaded with 00000111. Since the next instruction to be processed, RTN*E, does not use the DATA FIELD for memory references, and since the RTN*E will pick up new DATA FIELD information, it is not necessary to use a LPD to alter the DATA FIELD of the Page Register.

RTN*E references instruction storage. Location E (00104) is in page 00 as indicated by the INSTRUCTION FIELD of the Page Register. This storage contains the return location (00106) and the stored DATA FIELD and INSTRUCTION FIELD. The stored DATA FIELD and INSTRUCTION FIELD are loaded into the DATA FIELD and BRANCH FIELD of the Page Register. The BRANCH FIELD contents are then transferred into the INSTRUCTION FIELD, so that the return can be complete.

Conditions of the Page Register during this instruction are:

| DF | BF | IF | DF | BF | IF |
|---|---|---|---|---|---|
| 00 | 01 | 00 | 00 | 01 | 01 |

The INSTRUCTION FIELD points to page 01 and the Program Counter of the CCP reads 00106. The BUN*K references instruction storage and goes to location K, (00112) in page 01 for the address where the next instruction resides. The Page Register is not changed at this time. Condition of the Page Register after this instruction is:

| DF | BF | IF |
|---|---|---|
| 00 | 01 | 01 |

Page 01 and location 00111 hold the instruction HLT $. This is an instruction storage reference. The address of the next instruction is in Page 01, location 00111. No change to the Page Register.

1.4 ARITHMETIC

The Computer performs binary, fixed point, arithmetic computations on basic single precision (24 bits) data words. For certain arithmetic operations, (e.g. MUL. DIV. SHIFT) register Q is provided for some degree of extended precision. The extended register Q facilitates double precision operations but it is emphasized that the basic accumulation of an arithmetic process is single precision only. Extensive shifting and exchange operations on registers A and Q are provided to simplify programmed multiple precision subroutines. Extended precision is provided for multiply operations in that the product of two single precision numbers can result in a double precision product which in turn appears in registers A and Q as if they were a single register. Division on the other hand, is basically an inverse of multiplication and register A–Q is now used for a double precision divident; the resultant remainder appears in register Q and the quotient in register A.

Negative numbers are represented in 2's complement form. The arithmetic shifting operations are consistent with this notation $$\left(N = -X_{23}2^{23} + \sum_{0}^{22} X \cdot 2^{i}\right)$$

An overflow indicator is provided for the following:

a. a Sum or a difference (resulting from ADD, ADI, SUB or SBI operations) that cannot be contained within the A register.

b. A Division operation which would result in a quotient exceeding the capacity of the A register (Division by zero is a special case resulting in a trap level 2)

c. The results of arithmetic left shift operations (SAL, LSL,) which would exceed the number range of the original data words (for example a negative number that is shifted into a positive number range).

A CAR storage element is set whenever a carry out of bit 23 of the adder is true during an ADD, SUB ADI or SBI instruction. The storage element is reset when a carry is not true out of bit 23 of the adder during an ADD, SUB, ADI or SBI instruction.

The CAR storage element is also set during a BRR instruction indirect, if the indirect location contained bit 19 true.

SECTION 1.5 Priority Interrupt and Sense Line System 1.5.1 Introduction

The Computer Central Processor is equipped, with a real time, priority Interrupt and Sense Line System, to handle external requests and abnormal conditions.

All external signals that require immediate service are assigned to one of the eight levels of interrupt priority. Each of these signals are also assigned to a unique Sense Line as are other external signals not requiring immediate attention. Some internal indicators of the Central Processor are also assigned to Sense Lines.

1.5.2 Interrupt System 1.5.2.1 Description

There are eight levels of Interrupt. Priority is hard wired and the highest level is assigned to Interrupt One, the next highest level of priority is assigned to Interrupt No. 2 and so on down to the lowest level which is assigned to Interrupt No. 8.

The Interrupt System is scanned each instruction cycle to see if a signal, with a higher priority than the program running, requires servicing. If such a signal exists the Central Processor is forced to execute an instruction from the dedicated location of the interrupt involved. If linkage to the interrupt program is to be saved a BSP instruction should reside in the dedicated location. After processing the signal, the use of a BRR instruction indirect will take you back into the program where the interrupt occurred, and into the next sequence of instructions. The BRR will have also reset the highest Active Interrupt.

1.5.2.2 Interrupt Control: Enable and Disable

There are two control instructions which allow the programmer to exercise some influence over the interrupt system. The enable Interrupt (ENI) is provided to allow interrupts to break into the running program. The disable interrupt (DSI) is provided, so that the running program will not be bothered with an Interrupt Break.

Certain instructions will ignore interrupt requests during their process time. This will enable at least one more instruction to be processed before being forced to an interrupt address. These instructions are the, BSP (Branch and Store Last Program Count), thus protecting the loss of its re-entry capability. ENI (enable Interrupts), thus allowing programming to enable the interrupts, and to process at least one more instruction without interrupt. LDQ (Load Register Q), thus allowing the program time to process a sense line instruction (SSNT or LSGA) for the purpose of interrogating the sense line indication of the 25th bit of the memory location referenced by the LDQ. An interrupt between the processing of these two instructions can lose the indication. LPR (Load Page Register), thus allowing the Last Page Register to reflect the updated Page Register and maintain correct linkage. SEL (Select an I/O Channel or Third Party), thus allowing a subsequent data transfer. 1.5.2.3 Priority Interrupt Assignments to levels and their unique Sense Lines (See Section 8.4).

1.5.2.4 Priority Interrupt Operation

Any given priority interrupt level may be in one of three states: Inactive, Wait, Active.

The inactive state is completely neutral; no interrupts are awaiting service and none are being serviced.

The wait state stores the fact that an external signal requires servicing. The wait state will persist until all higher level interrupts which are waiting or are active, have been processed. When all higher level interrupts have been serviced the wait condition will be transferred to the active state.

The active state indicates that the Central Processor has recognized that level of interrupt, has caused an automatic transfer to the levels dedicated location and is being processed. Interruptions by higher level interrupts, or traps will not change this state, but will defer the completion of the processing associated with it. The active state is reset by the execution of a BRR instruction when no other interrupt of higher priority is active.

Disabling the Interrupt system does not affect the state of any level. New signals will be allowed into wait states, Active interrupts could be reset with BRR instructions. During a Disable period no interrupt breaks will be formed.

The active state of each level can be interrogated via the Sense Line group 52 the individual assignments are as follows:

64001 INTERRUPT 1 ACTIVE
64002 INTERRUPT 2 ACTIVE
64004 INTERRUPT 3 ACTIVE
64010 INTERRUPT 4 ACTIVE
64020 INTERRUPT 5 ACTIVE
64040 INTERRUPT 6 ACTIVE
64100 INTERRUPT 7 ACTIVE
64200 INTERRUPT 8 ACTIVE 1.5.3 Sense Line System 1.5.3.1 Description Certain conditions within the Central Processor and within the subsystems external to the Central Processor must be available for immediate decision making. The Sense Line system is the concentration point of these signals and its output is controlled by the Two Sense Line Instructions SSNT (Skip Sense Line not true) and LSGA (Load Sense Group into Register A).

These two instructions present the following format:

| 23 21 | 20 15 | 14 8 | 7 0 |
|---|---|---|---|
| TAG | OP CODE FIELD | GROUP FIELD | SENSE LINE FIELD |

The tag field is for indirect addressing or indexing as explained in section 1.3. Both SSNT and LSGA, instructions can be indexed and are capable of indirect addressing.

The op code field specifies the instruction.

The octal numeral representation for LSGA is 06.

The octal numeral representation for SSNT is 07.

The group specifies one of a possible 128 sense groups. Each group contains eight Sense Lines. All groups are not implemented. Some groups are specified for maintenance use, others are for future expansion.

The group field, (numeral representation,) by nature of it's bit position in the instruction follows the sequence (000, 010, 020, ... ..., 760, 770, 004, 014, 024, ... ..., 764, 774). Each group is assigned a decimal numeral. The decimal numeral is not directly translatable to the octal representation of it's associated group, however a translation is obtainable by the following algorithm. 1. Convert the decimal to three octal digits. 2. Rotate answer left one octal digit. 3. Multiply the right most digit by 4.

Examples:

decimal 52 converts to octal 064
rotate left one equals 640
multiply right most digit by 4 equals 640
decimal 71 converts to octal 107
rotate left one equals 071
multiply right most digit by 4 equals 074

The Sense Line Field is useful only with the SSNT instruction. During the SSNT instruction the 8 bits of the field are used as a mask, to indicate which of the sense lines, are to be tested. The LSGA instruction ignores the Sense Line Field.

1.5.3.2 Operation

When the condition of a sense line is required, a SSNT or a LSGA instruction must be used. The SSNT instruction, via its group field, selects a group of eight sense lines and signals the sense line system to invert their output. The mask of the SSNT instruction is then "and" (ed) with the eight sense lines, and the results checked.

If the results are all zeros, then the Sense lines that were true corresponded with bits of the mask that were true. No action will take place and the program will proceed to the next instruction.

If the result is not zero then the masked and true bits of the sense lines did not match and the program counter will be incremented by one. This will result in the program skipping the next sequential instruction.

The LSGA instruction like the SSNT instruction selects a group of eight sense lines, however, it does not want the eight lines inverted. Instead it loads the eight lines, as is, into the "A" register of the Central Processor. The eight lines can then be processed in whatever manner the program chooses.

1.5.3.3 Sense Line Assignments

As stated previously Sense lines are assigned to groups, and that certain groups are specified for maintenance. The reason for the maintenance assignment is for routining Sense Group Cards (See section 1.5.4).

The assignments of all implemented signals are as follows:

Maintenance Groups (NUMERIC REPRESENTATION)

| DECIMAL | OCTAL |
|---|---|
| 0 | 000 |
| 8 | 100 |
| 16 | 200 |
| 24 | 300 |
| 32 | 400 |
| 40 | 500 |
| 48 | 600 |
| 56 | 700 |
| 64 | 004 |
| 72 | 104 |
| 80 | 204 |
| 88 | 304 |
| 96 | 404 |
| 104 | 504 |
| 112 | 604 |
| 120 | 704 |

1.5.4 Maintenance 1.5.4.1. Tools (Hardware and Software)

For efficiency in routining, 16 CPD instructions were implemented for the Computer line Processor system.

The CPD instruction for the CLP has the following format.

| 23 21 | 20 15 | 14 9 | 8 0 |
|---|---|---|---|
| TAG | 1 $7_8$ | 0 1 | DIRECTIVE FIELD |

The tag field defines address modification (Indexing and indirect addressing are allowed).

The Directive field and a description is as follows. (Octal representation).

000 LOCKOUT ALL EXTERNAL SIGNALS

Inhibits all external signals from entering system.

001 RESET LOCKOUT

002 SET TEST SIGNALS TRUE

This simulates a true condition on all external signals that normally enter the system. It does not simulate the signals from the CCP.

003 SET TEST SIGNALS FALSE

This simulates a false condition on all external signals that normally enter the system. It does not simulate the signals from the CCP.

004 RESET: CONTROL SIGNAL ERRORS, PSEUDO CLP CPD SIGNALS, GATE GROUP SIGNALS AND GATE CARD SIGNALS

Control Signals Errors are:

CPD CLP ERR 1 SENSE LINE 04420
CPD CLP ERR 2 SENSE LINE 04440
SYNC ERR 1 SENSE LINE 04404
SYNC ERR 2 SENSE LINE 04410
CLS CONT ERR 1 SENSE LINE 04500
CLS CONT ERR 2 SENSE LINE 04600

005 CLS CLEAR:

This signal clears all Sync Hold Storage Elements.

006 INHIBIT IS SYNC 1

This CPD will not allow a sync pulse into unit 1 of the CLP. The affect will be a CLS CONT ERR 1 and 2 (sense lines 04500 & 04600).

007 INHIBIT IS SYNC 2

This CPD will not allow a sync pulse into unit 2 of the CLP. The affect will be a CLS CONT ERR 2 and 1. (sense lines 04600 & 04500).

010 PSEUDO IS SYNC 1 (from CCPA)

This CPD will extend the normally 100 nanosecond IS Sync Pulse into a 500 nanosecond pulse. This will simulate a stuck true condition. The affect will be a SYNC ERR 2 (SENSE LINE 04410) and an inhibit of the IS SYNC 1 signal.

011 PSEUDO IS SYNC 2 (from CCPB)

This CPD will extend the normally 100 nanosecond IS SYNC Pulse into a 500 nanosecond pulse. This will simulate a stuck true condition. The affect will be SYNC 2 signal.

012 PSEUDO pl 1

This CPD will expand the normal 100 nanosecond Pl, from CCPA, to 500 nanoseconds. This will result in a simulated stuck true condition for Pl. The affect will be to set SYNC ERR 2 (sense line 04410). The possibility also exists that one or both of the CLS CONT ERR flops will set (sense lines 04500 and 04600).

014 SET PSEUDO CLP CPD 1

This storage element will provide a signal that will create a CPD CLP ERR 2 on the next non CPD instruction. It simulates a stuck true condition. The affect will inhibit the CLP CPD 1 signal.

015 SET PSEUDO CLP CPD 2

This storage element will provide a signal that will create a CPD CLP ERR 1 on the next non CPD instruction. It simulates a stuck true condition. The affect will inhibit the CLP CPD 2 signal.

016 GATE GROUPS

This CPD will set a storage element that will gate the decode of the 7 groups assigned to each card and card 9 onto the sense line bus for use by the CCP during a SSNT or LSGA instruction. The groups are to be selected during the selection of card 16 and card 9 is selected with group 1. This storage element is reset with 004.

017 GATE CARDS

This CPD will set a storage element that will gate the decode of the first 8 cards onto the sense line bus for use by the CCP during an SSNT or LSGA instruction. The cards are to be selected along with group 1. This storage element is reset with 004.

1.5.4.2 Operation 1.5.4.2.1 Routining of the Sense Line System requires either both CCP(s) on line or both CCP(s) off line. So that routining will not be interrupted the Interrupt System must be disabled, and all external signals locked out via CCP, 01, 0. A CPD, 01, 02 will place a true signal on all sense lines in all groups except the following Groups 1, 2, 52, 60, 67, 68, 69, 70 and 71. A true signal will be placed on lines 1 thru 6 of group 60, and on lines 1, 2 and 5 and 6 of group 67; by selecting each group via an LSGA or SSNT instruction it can be verified whether the intended result exist. After exercising as stated above the simulated signal can be set to a false condition (CPD, 01, 03) and again the results can be verified as above. Those Sense lines not included in the above test are to be routined individually.

1.5.4.2.2 Routining of the Interrupt System.

With the Interrupt System Disabled, the MIS Instruction RIW (reset interrupt waits) is executed along with 8 BRR (branch return reset) instructions to initialize the interrupt system. The external signals are locked out (CPD, 01, 00) and simulated to a true condition (CPD 01, 02). The MIS instruction ENI (enable interrupts) is executed. Only the Highest Priority level should request servicing. Upon acknowledging the request and with the issue of a BRR instruction the Highest level will be reset and the next highest will request service and this will continue until all interrupts have been serviced in succession. Any deviation indicates a fault, and this fault can be isolated and localized.

1.5.4.2.3 Routining of the Control Circuitry

The CLP receives its control signals from the duplicated CCP(S). The signals are "OR"(ed) together only when the two CCP(S) are on-line. When this condition does not exist then only the on line CCP(S) signals are used. A failure in three of these control signals at point where they are common to both halves of the CLP system could bring the system down therefore hardware to detect such an error is implemented. Hardware controlled by software (CPD instructions) has also been implemented to exercise the error detection circuitry. When such an error occurs (control signal fault) the error detection hardware will lock out the signal from bringing down the system and will set a storage element. A latent fault could also exist in the control signal IS sync within a CLP Power Module that would lock out all external signals to that half of the system. Hardware will detect such a fault and the hardware is exercised via a CPD instruction.

Test one would inhibit a sync pulse in one half of the system and then the other half. (CPD 01, 06 and CPD 01, 07) an error should occur in each instance (CLS CONT ERR 1 and CLS CONT ERR 2).

Test two would simulate the IS sync pulse stuck true first from one CCP and then the other (CPD 010 and CPD 011) in each case the storage elements SYNC ERR 1 and SYNC ERR 2 will be set.

Test three would set storage elements in both halves of the CLP. (CPD 01, 014; CPD 01, 015). These storage elements would simulate the CLP CPD signal stuck true and would be programmed such that first one would be set and tested and then the other. In each case subsequent instruction executions which were other than CPD would set the error storage elements. CPD CLP ERR1 and then CPD CLP ERR 2.

Test four would gate the group decode circuitry outputs on to the Sense Line Bus for monitoring. (CPD, 01, 016). This is necessary to catch a latent fault on the input to the decode circuitry. The use of an LSGA or SSNT instruction can then determine if the correct group is being selected and that only one group is being selected. Group 1 does not exist on a card. SL 1 = group 2; SL2 = group 3; SL3 = Group 4; SL4 = group 5; SL5=group 6; SL6=group 7; SL7=group i; SL8 = CARD 9.

Test five would gate the Card decode circuitry outputs on to the Sense line bus for monitoring. (CPD 01, 017) As in the case of the group decode, this method is used to catch a latent falult. The LSGA and SSNT instructions can determine if the correct card is being selected and that only one card is selected. SL1=Card 1; SL2=Card 2; CL3=Card 3; SL4=Card 4; SL5=Card 5; SL6=Card 6; SL7=Card 7; SL8=Card 8.

Card 9 was placed in group SENSE LINE 8. All faults in the system can be isolated with the tools provided.

The block diagram of FIG. 17 shows the interfacing of the computer line processor CLP with other subsystems for processing of sense line and interrupt signals, for a duplicated system. The computer line processor comprises duplicate units CLP-A and CLP-B. The principal inputs and data sense lines in cables designated DSL. The data sense lines from drum control units DCU-1, DCU-3 and DCU-5 are routed via computer memory control CMC-A to line processor CLP-A; while the data sense lines from drum control units DCU-2, DCU-4 and DCU-6 are routed via computer memory control CMC-B to line processor CLP-B. The data sense lines from the channel multiplex units CCX-A and CCX-B are routed to their respective line processor units CLP-B and CLP-B. The register-senders RS1-A and RS-1B have data sense lines to line processor CLP-A, while RS-1B and RS-2B data sense lines go to CLP-B. There are up to four pairs of originating markers OM-A1 to OM-A4 and OM-B1 to OM-B4. The terminating markers have a pair TM-A1 and TM-B1 for office section 1, a pair TM-A2 and TM-B2 for office section 2, and a pair TM-AS and TM-BS for a selector section. The data sense lines from the markers are cabled through the communication registers CCR-A and CCR-B as shown to the respective line processors CLP-A and CLP-B. There are also data sense lines from the computer central processors CCP-A and CCP-B to the respective line processors CLP-A and CLP-B. Control signal lines from the central processors CCP-A and CCP-B are supplied to the line processors CLP-A and CLP-B There are also data sense lines from the maintenance routine logic MRL to both line processors CLP-A and CLP-B. The eight merged sense line leads SLϕ-7 and address signals are supplied from the line processors CLP-A and CLP-B to the computer central processors CCP-A and CCP-B. Since the computer line processor receives many external signals, and many of these signals are required by the maintenance and control circuit, the specified signals are cabled directly to the maintenance display and control circuit MDC.

Section 1.6 Trap System of the Computer Central Processor 1.6.1 Introduction

The trap system for the Computer Central Processor was devised to handle those events that directly affect the internal operation of the Processor, and to facilitate recovery from programming errors. There are two trap levels.

TRAP LEVEL ONE THIRD PARTY TRAP
TRAP LEVEL TWO COMPUTER INTERNAL ERRORS 1.6.2 Traps: Description, Operation 1.6.2.1. Trap level One (Third Party Trap)

1.6.2.1.1 Description:

Should a mismatch occur between the duplicated Central Processors, while they are in sync, a Third Trap signal will be initiated by the Third Party Circuitry.

This event is given the highest priority of any event asociated with the Central Processor and is assigned to trap level one.

1.6.2.1.2. Operation:

When a third Party Trap signal is initiated the Central Processor will allow the instruction in process to finish and then process the trap. The Central Processor's timing generator will proceed to cycle three where the trap address will be formed, and used, as an address source. Thus the next instruction read from memory will be located in the address specified. The address of where this trap occurred plus one has been stored in the Last Program count register and last page register. To Store this information a BSP (Branch and Store Last Program Count) instruction must reside in the trap address. No other trap can break in to a program while the Third Party Trap is true. However Interrupts can occur from the Interrupt system, unless a DSI (Disable Interrupt) Instruction is implemented as the first instruction in the trap program.

1.6.2.2 Trap Level Two (Computer Internal Error Trap)

1.6.2.2.1 Description:

Should one of the following events occur in one or both of the duplicated Central Processors, that Processor will initiate an error trap signal.

1.6.2.2.1.1 Instruction Even Parity Error is true when even parity is detected while reading a new instruction from memory.

1.6.2.2.1.2 Data Even Parity Error is true when even parity is detected during the transfer of data from main memory, the Register-Sender or the Channel Multiplexor.

1.6.2.2.1.3 Division by zero is true when during a division instruction the divisor is detected as being all zeros.

1.6.2.2.1.4 Invalid Operation Code is true when the decode of the Instruction operation field detects one of the following invalid Codes. 00; 27; 63.

1.6.2.2.1.5 Memory Reference Time Out is true when one of the memory reference signals remain true for more than 140 microseconds. Memory reference signals are Main Memory read, Main Memory Write; Register-Sender, Read or Register-Sender Write. Reason for failure is signal failure or lack of a feedback from the Main Memory or Register-Sender.

1.6.2.2.1.6 Port 7 error is true when the Central Processor attempts to access memory out of range, or when it attempts to write into "Read Only" memory.

1.6.2.2.2 Operation

When an error trap signal is initiated the Central Processor will abort the instruction in process, from the point of recognition. If a read or write signal to memory is true the abort will be delayed until the signals are removed.

The Central Processors timing generator will proceed to cycle three where the error trap address will be formed and used as the address source.

Note the error trap signal will be ignored if a Third Party trap signal is present.

The address of where this trap occurred plus one has been stored in the Last Program Count register and last page register. To store this information a BSP (Branch and Store Last Program Count) instruction must reside in the trap address.

Interrupts can occur from the interrupt system, unless a DSI (Disable Interrupt) instruction is implemented as the first instruction in the trap program.

The errors that caused the error trap signal as well as the error trap signal itself can be reset by a REI instruction or a master clear. An indication of which error caused the trap resides in the Sense Line system under groups 1 and 2. Refer to section 8.3 for Sense Line Assignments. Should an error signal that would usually initiate an error trap occur, while in the error trap program, the sense line associated with that signal will be the only indication of its being active. Unless, therefore, that signal is scanned after it becomes true, it is possible to lose it when the REI instruction is executed.

SECTION 1.7 MEMORY PROTECT SYSTEM 1.7.1 INTRODUCTION

The Program Protect System of the Computer provides hardware protection for Computer Main Memdory (CMM). The Program Protect System is activated by releasing the INHIBIT MEMORY PROTECT Switch on the Maintenance Display and Control Panel (MDCF). All memory protection is disabled when the Inhibit Memory Protect pushbutton is operated.

Hardware in the Computer Memory Controller (CMC) allows four types of protection for the main memory. The four are: Switch-Protected Read Only Memory, Software-Protected Read Only Memory, Initialization Table Protection and Block Transfer Area (Non-Resident Area) Protection.

1.7.2 Switch-Protected Read Only Memory.

This block of words in core may only be written into when the INHIBIT MEMORY PROTECT pushbutton on the MCC is operated (Inhibit position). Protection is in effect both for the Drum Control Units (DCU's) and the computer Central Processor (CCP), regardless of their status.

Bit 25 of each word in this block may be written into when the INHIBIT MEMORY PROTECT pushbutton on the MDFC is operated and the PCROM flip-flop is reset (CPD 012, 066). Bit 25 will be written true if the MIS instruction MPS (03700040) has set the Write Memory Protect Bit (WMPB) storage element. Bit 25 will be written False if the MIS instruction MPR (03700100) has reset the WMPB storage element.

Switch-Protected Read Only Memory is strappable to 512 or 1,024 words and may start at location 0 or 512 but does not extend beyond location 1023.

1.7.3 Software-Protected Read Only Memory

Program protection of individual words is available via the 26th bit (Bit 25) of the word as written in core. This protection is in effect for the Central Processor only. Drum Control Units may overwrite Software-Protected Read Only Memory.

The Computer Maintenance Panel (PNL) or the Computer Programming Console (PRC) write through the Central Processor and therefore protection is in effect for these units. Software Protection, Bit 25 written True in core, may be applied to any location in core. Protection however is redundant in Switch-Protected Read Only Memory. A software Read Only Memory Error will be generated when trying to write into a software-protected location in Switch-Protected Read Only memory.

When the Program-Controlled Read Only Memory (PCROM) Active FF is set and the INHIBIT MEMORY PROTECT pushbutton has not been operated (Memory Protect System "ACTIVE" state) the Central Processor, PNL or PRC can write into all core locations except Switch Protected Read Only Memory. Bit 25 will be written into Core as a One if the WMPB flip-flop is set or as a Zero if WMPB flip-flop is reset. If the PCROM Active flip-flop is reset and INHIBIT MEMORY PROTECT pushbutton has been operated (Memory Protect System 'INHIBITED ' state) the CCP, PNL OR PRC can write into any core location.

When the INHIBIT MEMORY PROTECT pushbutton has been operated (Memory Protect System "Inhibited" state) the CCP can write into any core location. However if the PCROM Active flip-flop is set and the Control Processor writes into core, Bit 25 in core will always be written as Zero regardless of the state of WMPB and correct parity will be provided by CMC.

The PCROM Active flip-flop is a S/R latch located in the Computer Memory Controller. The state of this latch is controlled by CPD instructions and can be interrogated via sense line. The PCROM Active latch is reset ("inactive state") by CLEAR.

1.7.4 Initialization Table Protection

A 64-word block of main memory is dedicated to each DCU as its initialization table. When a DCU is being initialized (Init lead to CMC True) it may access only its own initialization table. Otherwise a DRUM TABLE ERROR occurs and write operation is aborted.

A DCU may write into another DCU's initialization table only when it is "privileged," i.e., its PT lead to the CMC is true.

In summary, a DCU may access only its own initialization table when it is in the initialization sequence and a DCU may not write outside of its own initialization table or the Block Transfer Area unless it is privileged or the INHIBIT MEMORY PROTECT pushbutton is operated. All DCU initialization tables are contiguous within a 512-word block of main memory. The starting location of the first DCU (DCU1) Initialization Table is strapped to the last word (word 511) of the 512-word initialization tables block minus $(n+1)+64$, where $n=2,4,6$ is the TOTAL number of DCU's attached to the CMC. In this way the DCU Initialization Tables occupy the highest-numbered addresses in the 512-word block leaving the last 64 words at the end of the block for other usage (trap and interrupt addresses). The 512-word block may be strapped in increments of 512 words to any location in core. However the trap and Interrupt addresses generated by CCP are not relocatable.

1.7.5 Block Transfer Area Check

With initialization Table Protection this check may be considered to be 'Bound Checking' on DCU access to main memory. A DCU may not write outside of its own initialization table or the Block Transfer AREA ("non-resident" Area) unless it is privileged. If a DCU attempts to write outside these areas a DRUM TABLE ERROR will be generated and write operation will be aborted. A DCU which is privileged may write in any core location except Switch Protected ROM. When the INHIBIT MEMORY PROTECT button is operated any DCU may write in any location in core.

What is claimed is:

1. A memory expansion arrangement in a computer central processor of a digital computing system which comprises said processor and a memory, said processor comprising a plurality of registers, an arithmetic logic unit, control logic and an address bus;

wherein said registers include a program counter, an instruction register, and a page register which is part of the memory expansion arrangement;

wherein the information stored in the memory includes instruction words and data words, an instruction set having a format comprising given bit positions for an operation code, and M given bit position for an operand which for some instructions is an address;

means to supply an instruction address from the program counter and the page register via the address bus to the memory to read the instruction word and place it in the instruction register;

wherein said page register comprises N bistable devices for an instruction field, N bistable devices for a branch field and N bistable devices for a data field;

one of the instructions of the set being a "load page register" instructions in which the operand has some bit positions which designate which field or fields of the page register to load or to transfer from one field to another, and other bit positions of the operand comprise information to be loaded;

and means responsive to the "load page register" instruction in the instruction register to load or transfer information in the page register in accordance with the instruction.

2. A memory expansion arrangement according to claim 1, further including a "last page reference" register comprising N bistable devices for an instruction field and N bistable devices for a data field, with coupling gates from outputs of the page register instruction and data field devices to respective inputs of the instruction and data field devices of the "last page reference" register;

wherein the computer central processor further includes a "last program count" register having inputs connected via coupling gates to respective outputs of the program counter;

means effective during the execution of each instruction to enable said coupling gates to transfer the address information in the program counter and page registers to the "last program count" and "last page reference" registers;

and means responsive to a "branch and store program" instruction to store the address information from the "last program count" and "last page reference" registers into the memmory.

3. A memory expansion arrangement according to claim 1, wherein the format of the "load page register" instruction extends the operation code by using a group of bit positions of the operand with respective codes for "load data field," "load branch field," "load data and branch field," and "transfer instruction field to data field;" and other bit positions for data field and branch field data;

and wherein said means responsive to the "load page register" instruction in the instruction register comprises gating means coupling the data field and branch field bit position from the instruction register via a data bus to respective inputs of the data and branch field devices of the page register, and outputs of the instruction field devices to inputs of the data field devices; and logic means with inputs from the instruction register to enable the gating means to load the page register in accordance with the instruction.

4. A memory expansion arrangement according to claim 3, wherein for branch instructions the control logic includes means to supply a "load program counter" signal which is effective to enable gate means to load an effective address corresponding to the operand of the branch instruction into the program counter;

and wherein there are gate means coupling the output of the branch field devices to inputs of the instruction field devices, and the last said gate means is enabled by the "load program counter" signal.

5. A memory expansion arrangement according to claim 4, including gate means coupling outputs of the page register branch field to the address bus, and means to enable the last said gate means during the execution of a "branch and store program" instruction.

6. A memory expansion arrangement according to claim 4 wherein said instruction set format further includes a bit position for an indirect address bit which causes a word for address modification to be read from the operand location, and indirect address paging bistable device with means to set it responsive to the indirect address bit being true in the instruction register and to reset it responsive to the program counter becoming an address source;

means responsive to branch return instructions in which the indirect address paging bistable device is set to load address information from the word read from the operand location via another register, with 2N bit positions beyond the low order M bit positions into the page register, N bits into the branch field devices and other N bits into the data field devices; the low order M bits being loaded into the program counter.

7. A memory expansion arrangement according to claim 6, in which the branch return instructions include a return instruction and a branch return reset instruction which are both unconditional branch instructions, and the latter said instruction causes reset of the highest active interrupt.

8. A memory expansion arrangement according to claim 6, further including a "last page reference" register comprising N bistable devices for an instruction field and N bistable devices for a data field, with coupling gates from outputs of the page register instruction and data field devices of the "last page reference" register;

wherein the computer central processor further includes a "last program count" register having inputs connected via coupling gates to respective outputs of the program counter;

means effective during the execution of each instruction to enable said coupling gates to transfer the address information in the program counter and page register to the "last program count" and "last page reference" registers;

and means responsive to a "branch and store program" instruction to store the address information from the "last program count" and "last page reference" registers into the memory.

9. A memory expansion arrangement according to claim 8, wherein means responsive to the indirect address bit in the instruction register being true with the branch and store program instruction inhibits gating page address bits to the address bus to thereby provide an address reference to page zero, means responsive to the indirect address paging bistable device being set with the branch and store program instruction to gate information from the word at the operand location via said another register to the branch field devices of the page register, means effective with the indirect address bit no longer true in the instruction register with the branch and store program instruction to gate the information from the branch field of the page register to the address bus, while the M low order bits of the word read from the operand location and also gated to the address bus, to thereby provide the address of the location where the information from the "last program count" and "last page reference" registers is to be stored.

10. A memory expansion arrangement according to claim 9, wherein means effective after storage of the "last program count" and "last page reference" information enables a load program counter signal, which enables gate means coupling the output of the branch field devices to inputs of the instruction field devices of the page register.

11. A memory expansion arrangement according to claim 10, wherein means responsive to certain branch instructions with the indirect address bit true, when the program counter is enabled as an address source, cause the page instruction field output of the page register to be gated to the address bus; and means responsive to instructions other than said certain branch instructions or the branch and store program instruction, with the indirect address bit true, to gate the outputs of the data field of the page register to the address bus.

12. An address modification arrangement according to claim 11, wherein said certain branch instructions comprise a branch return reset, a return, a branch unconditionally, and a branch then halt instruction.

* * * * *

UNITED STATES PATENT OFFICE
CERTIFICATE OF CORRECTION

Patent No. 3,786,436 Dated January 15, 1974

Inventor(s) PAUL A. ZELINSKI/LEO V. JONES

It is certified that error appears in the above-identified patent and that said Letters Patent are hereby corrected as shown below:

[75] Paul Z. Zelinski, should be Paul A. Zelinski

Signed and sealed this 14th day of May 1974.

(SEAL)
Attest:

EDWARD M.FLETCHER,JR.
Attesting Officer

C. MARSHALL DANN
Commissioner of Patents